US007755998B2

(12) United States Patent
Sugi et al.

(10) Patent No.: US 7,755,998 B2
(45) Date of Patent: Jul. 13, 2010

(54) OPTICAL PICKUP SYSTEM, OPTICAL HEAD, OPTICAL DISK APPARATUS, AND OBJECTIVE LENS

(75) Inventors: Yasuyuki Sugi, Ibaraki (JP); Yoshiaki Minakawa, Ibaraki (JP); Mitsuhiro Miyauchi, Ibaraki (JP); Koichiro Wakabayashi, Ibaraki (JP)

(73) Assignee: Hitachi Maxell, Ltd., Ibaraki-Shi (JP)

( * ) Notice: Subject to any disclaimer, the term of this patent is extended or adjusted under 35 U.S.C. 154(b) by 851 days.

(21) Appl. No.: 11/183,776

(22) Filed: Jul. 19, 2005

(65) Prior Publication Data

US 2006/0018237 A1   Jan. 26, 2006

(30) Foreign Application Priority Data

Jul. 22, 2004   (JP)   ............................. 2004-214461
Mar. 24, 2005   (JP)   ............................. 2005-086127

(51) Int. Cl.
*G11B 7/135*   (2006.01)

(52) U.S. Cl. ................................. 369/112.26

(58) Field of Classification Search ........................ None
See application file for complete search history.

(56) References Cited

U.S. PATENT DOCUMENTS

| 6,091,691 | A * | 7/2000 | Yoo et al. | 369/112.11 |
| 6,118,594 | A | 9/2000 | Maruyama | |
| 6,285,646 | B1 * | 9/2001 | Yoo et al. | 369/112.26 |
| 6,678,096 | B2 * | 1/2004 | Sugi et al. | 359/719 |
| 2003/0227859 | A1 * | 12/2003 | Hirai | 369/112.12 |
| 2004/0022164 | A1 * | 2/2004 | Nishioka et al. | 369/112.05 |
| 2004/0032815 | A1 * | 2/2004 | Kim et al. | 369/112.26 |
| 2004/0257958 | A1 * | 12/2004 | Kimura et al. | 369/112.03 |

FOREIGN PATENT DOCUMENTS

| JP | A 3-115139 | 5/1991 |
| JP | A 4-181902 | 6/1992 |
| JP | A-09-145995 | 6/1997 |
| JP | A-2000-081566 | 3/2000 |
| JP | A 2001-43559 | 2/2001 |
| JP | A 2003-67972 | 3/2003 |
| JP | A 2003-270528 | 9/2003 |
| JP | A-2004-006005 | 1/2004 |
| JP | A 2004-79146 | 3/2004 |
| JP | A 2004-185797 | 7/2004 |
| JP | A-2005-038581 | 2/2005 |
| JP | A 2005-209250 | 8/2005 |

OTHER PUBLICATIONS

Notice of Reasons for Rejection issued in Japanese Patent Application No. 2005-208897; Feb. 2, 2010; with English-language translation.
Notice of Reasons for Rejection issued in Japanese Patent Application No. 2005-208898; Feb. 2, 2010; with English-language translation.

* cited by examiner

*Primary Examiner*—Christopher R Lamb
(74) *Attorney, Agent, or Firm*—Oliff & Berridge, PLC

(57) ABSTRACT

An optical pickup system for reading information of three kinds of optical recording media. The optical pickup system has a wavelength selective filter that includes an outer area for shielding one light beam of light beams having three kinds of wavelengths and an inner area for allowing all the light beams to pass through. The optical pickup system also has an objective lens that focuses each light beam having passed through the wavelength selective filter on each light recording medium. An optical head and an optical disk apparatus have the optical pickup system.

21 Claims, 62 Drawing Sheets

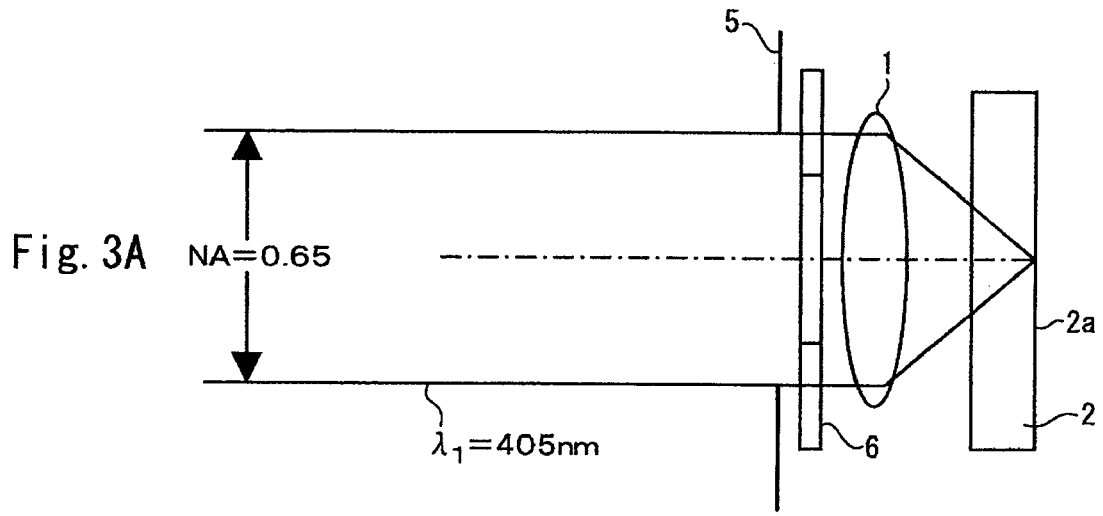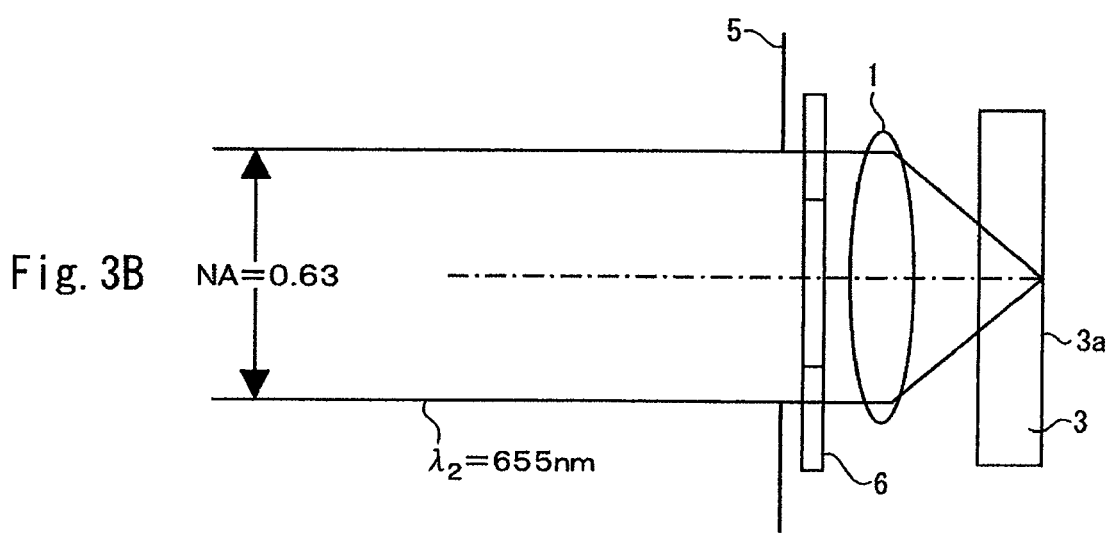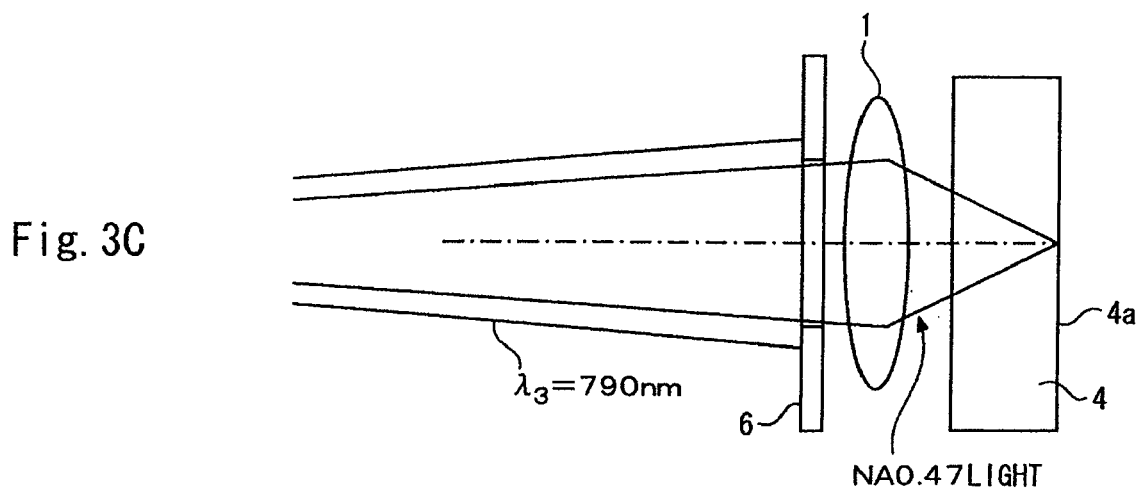

SIDE A

| ZONE j | | 1 | 2 | 3 | 4 | 5 |
|---|---|---|---|---|---|---|
| RANGE OF h | LOWER LIMIT | 0 | 0.542467 | 0.792615 | 1.014927 | 1.249884 |
| | UPPER LIMIT | 0.542467 | 0.792615 | 1.014927 | 1.249884 | 1.740929 |
| B | | 0 | -0.001473477 | -0.002946954 | -0.004420431 | -0.005893908 |
| C | | 0.509478595 | 0.5104812 | 0.511012577 | 0.510002683 | 0.510089832 |
| K | | -1.3369195 | -0.8287777 | -0.8105968 | -0.7537146 | -0.7469151 |
| A4 | | -4.16576E-05 | 0.003116516 | 0.003289505 | 0.004372048 | 0.004157114 |
| A6 | | 0.258242912 | 0.0004761572 | 0.00191368 | 0.000112694 | 0.000283638 |
| A8 | | -2.171510837 | -0.000539419 | 0.001174357 | 0.000166003 | 5.499882E-05 |
| A10 | | 9.398682567 | -0.004428822 | -0.001259228 | 3.098863E-05 | -3.950521E-06 |
| A12 | | -19.60835322 | 0.003469841 | -0.001086548 | -4.170906E-05 | -1.297888E-05 |
| A14 | | 13.07840955 | -0.003183954 | 0.00149111 | -6.216377E-06 | 5.481453E-06 |
| A16 | | 6.844157513 | 0.003264944 | -0.000424563 | 5.927209E-06 | -6.448557E-07 |

| ZONE j | | 6 | 7 | 8 | 9 |
|---|---|---|---|---|---|
| RANGE OF h | LOWER LIMIT | 1.740929 | 1.850763 | 1.92125 | 1.975027 |
| | UPPER LIMIT | 1.850763 | 1.92125 | 1.975027 | 2.2 |
| B | | -0.004420431 | -0.002946954 | -0.001473477 | 0 |
| C | | 0.508291764 | 0.518471856 | 0.51922374 | 0.513715431 |
| K | | -0.7212068 | -0.7734512 | -0.7752421 | -0.7540451 |
| A4 | | 0.005173403 | 0.004007756 | 0.003997983 | 0.004280322 |
| A6 | | -8.23490E-05 | -0.000307572 | -0.000302425 | -0.000136405 |
| A8 | | -3.19440E-05 | 5.267685E-06 | 4.8548173E-06 | 2.5114717E-05 |
| A10 | | 4.50425E-06 | 3.460593E-05 | 3.3523674E-05 | 2.7589154E-05 |
| A12 | | -6.74502E-06 | -1.429376E-06 | -2.6102373E-06 | -5.8345645E-06 |
| A14 | | 6.84527E-06 | 3.389613E-06 | 3.3068712E-06 | 2.6646516E-06 |
| A16 | | -1.13608E-06 | -7.976428E-07 | -6.9376700E-07 | -4.5308929E-07 |

Fig. 7

SIDE B

| C   | -0.118642624    |
|-----|-----------------|
| K   | -95.56799       |
| A4  | 0.00129653      |
| A6  | 4.329123 7E-05  |
| A8  | -1.1572493E-05  |
| A10 | -2.0639003E-06  |

Fig. 8

FIRST EMBODIMENT HDDVD (BLUE; 405nm) OBJECTIVE LENS FOCAL LENGTH 3.1015mm NA0.650

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 4.032 |
| 3 | LENS SURFACE; OBJECT SIDE | ASPHERICAL SURFACE | 1.94 | RESIN OR EQUIVALENT | 1.54972 | — |
| 4 | LENS SURFACE; IMAGE SURFACE SIDE | ASPHERICAL SURFACE | 1.59296 | AIR | 1 | — |
| 5 | DISK SURFACE; OBJECT SIDE | ∞ | 0.6 | PC | 1.6235 | — |
| 6 | DISK INFORMATION RECORDING SURFACE | ∞ | — | — | — | — |

Fig. 9A

FIRST EMBODIMENT DVD (655nm) OBJECTIVE LENS FOCAL LENGTH 3.2116mm NA0.628

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 4.032 |
| 3 | LENS SURFACE; OBJECT SIDE | ASPHERICAL SURFACE | 1.94 | RESIN OR EQUIVALENT | 1.53 | — |
| 4 | LENS SURFACE; IMAGE SURFACE SIDE | ASPHERICAL SURFACE | 1.741631 | AIR | 1 | — |
| 5 | DISK SURFACE; OBJECT SIDE | ∞ | 0.6 | PC | 1.58 | — |
| 6 | DISK INFORMATION RECORDING SURFACE | ∞ | — | — | — | — |

FIRST EMBODIMENT CD (790nm) OBJECTIVE LENS FOCAL LENGTH 3.2327mm, NA0.470

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | 49.4 | AIR | 1 | — |
| 2 | APERTURE SURFACE | ∞ | 0 | AIR | 1 | 3.15 |
| 3 | LENS SURFACE; OBJECT SIDE | ASPHERICAL SURFACE | 1.94 | RESIN OR EQUIVALENT | 1.5263653 | — |
| 4 | LENS SURFACE; IMAGE SURFACE SIDE | ASPHERICAL SURFACE | 1.59296 | AIR | 1 | — |
| 5 | DISK SURFACE; OBJECT SIDE | ∞ | 1.2 | PC | 1.57163 | — |
| 6 | DISK INFORMATION RECORDING SURFACE | ∞ | — | — | — | — |

DIFFERENCE IN OPTICAL PATH LENGTH($\lambda$)
BETWEEN ZONE 1 AND ZONE 2 TO 9

| ZONE j | OPTICAL PATH LENGTH DIFFERENCE FROM ZONE 1 | | |
|---|---|---|---|
| | WAVELENGTH 405nm, HDDVD | WAVELENGTH 655nm, DVD | WAVELENGTH 790nm, CD |
| 1 | REFERENCE | REFERENCE | REFERENCE |
| 2 | 2 | 1 | 1 |
| 3 | 4 | 2 | 2 |
| 4 | 6 | 3 | 3 |
| 5 | 8 | 4 | 4 |
| 6 | 6 | 3 | 3 |
| 7 | 4 | 2 | 2 |
| 8 | 2 | 1 | 1 |
| 9 | 0 | 0 | 0 |

Fig. 11

SIDE A: ZONE j=1 TO 6

| ZONE j | | | | | | | |
|---|---|---|---|---|---|---|---|
| BLU-RAY /DVD COMMON USE AREA 1 | R | 1.452864 | C | 0.68829567 | K | -11.13817 | |
| | A4 | 0.06646855 | A6 | 34.47225 | A8 | -1552.963 | A10 | 31931.42 |
| | A12 | -248870.6 | A14 | 2.016486 | A16 | 0.2784295 | |
| | | | B | 0 | | | |
| | | RANGE OF h | SMALL | 0 | | | |
| | | | LARGE | 0.202346 | | | |
| BLU-RAY /DVD COMMON USE AREA 2 | R | 1.442098 | C | 0.693434149 | K | -3.02541 | |
| | A4 | -0.008186124 | A6 | 1.33109 | A8 | 2.765864 | A10 | -174.465 |
| | A12 | -468.2288 | A14 | 31346.47 | A16 | -179034.6 | |
| | | | B | -0.000973979 | | | |
| | | RANGE OF h | SMALL | 0.202346 | | | |
| | | | LARGE | 0.289741 | | | |
| BLU-RAY /DVD COMMON USE AREA 3 | R | 1.447296 | C | 0.690943663 | K | -1.714515 | |
| | A4 | 0.03441157 | A6 | -0.05859795 | A8 | 0.3488139 | A10 | 5.326697 |
| | A12 | 0.8872806 | A14 | -387.4022 | A16 | 1405.46 | |
| | | | B | -0.001947958 | | | |
| | | RANGE OF h | SMALL | 0.289741 | | | |
| | | | LARGE | 0.359911 | | | |
| BLU-RAY /DVD COMMON USE AREA 4 | R | 1.430321 | C | 0.699143759 | K | -2.292213 | |
| | A4 | 0.0129148 | A6 | -0.07704655 | A8 | 1.431743 | A10 | 10.77500 |
| | A12 | -18.11912 | A14 | -642.5188 | A16 | 2182.917 | |
| | | | B | -0.002921937 | | | |
| | | RANGE OF h | SMALL | 0.359911 | | | |
| | | | LARGE | 0.422437 | | | |
| BLU-RAY /DVD COMMON USE AREA 5 | R | 1.403155 | C | 0.71267964 | K | -3.023571 | |
| | A4 | -0.009439812 | A6 | -0.002444696 | A8 | 1.481634 | A10 | 6.132152 |
| | A12 | -15.28571 | A14 | -216.8429 | A16 | 602.3758 | |
| | | | B | -0.003895916 | | | |
| | | RANGE OF h | SMALL | 0.422437 | | | |
| | | | LARGE | 0.48152 | | | |
| BLU-RAY /DVD COMMON USE AREA 6 | R | 1.449731 | C | 0.689783139 | K | -1.614642 | |
| | A4 | 0.04004518 | A6 | 0.004864501 | A8 | 0.06055667 | A10 | 0.06327539 |
| | A12 | -0.7934222 | A14 | -3.623215 | A16 | 13.15235 | |
| | | | B | -0.004869895 | | | |
| | | RANGE OF h | SMALL | 0.48152 | | | |
| | | | LARGE | 0.540151 | | | |

Fig. 12

SIDE A: ZONE j=7 TO 12

| ZONE j | | | | | | | | |
|---|---|---|---|---|---|---|---|---|
| BLU-RAY /DVD COMMON USE AREA 7 | R | 1.465183 | C | 0.682508601 | K | −1.209382 | | |
| | A4 | 0.04189799 | A6 | 0.003042637 | A8 | 0.01239711 | A10 | −0.04691002 |
| | A12 | −0.4820431 | A14 | −1.389654 | A16 | 5.490768 | | |
| | | | B | −0.005843874 | | | | |
| | | RANGE OF h | SMALL | 0.540151 | | | | |
| | | | LARGE | 0.601857 | | | | |
| BLU-RAY /DVD COMMON USE AREA 8 | R | 1.497529 | C | 0.667766701 | K | −0.2636307 | | |
| | A4 | 0.04816469 | A6 | −0.03285523 | A8 | −0.1304645 | A10 | −0.2188387 |
| | A12 | 0.3546703 | A14 | 1.950679 | A16 | −2.685101 | | |
| | | | B | −0.006817853 | | | | |
| | | RANGE OF h | SMALL | 0.601857 | | | | |
| | | | LARGE | 0.681364 | | | | |
| BLU-RAY /DVD COMMON USE AREA 9 | R | 1.451697 | C | 0.688848982 | K | −1.526474 | | |
| | A4 | 0.04116413 | A6 | 6.63077E-05 | A8 | 0.003644628 | A10 | 0.000808626 |
| | A12 | −0.0016948 | A14 | −0.002234693 | A16 | 0.0015451 | | |
| | | | B | −0.007791832 | | | | |
| | | RANGE OF h | SMALL | 0.681364 | | | | |
| | | | LARGE | 0.885179 | | | | |
| BLU-RAY /DVD COMMON USE AREA 10 | R | 1.412014 | C | 0.708208276 | K | −1.58977 | | |
| | A4 | 0.0342354 | A6 | −0.01041381 | A8 | −0.000792472 | A10 | 0.00701932 |
| | A12 | 0.02025544 | A14 | 0.01798688 | A16 | −0.03202835 | | |
| | | | B | −0.006817853 | | | | |
| | | RANGE OF h | SMALL | 0.885179 | | | | |
| | | | LARGE | 0.932581 | | | | |
| BLU-RAY /DVD COMMON USE AREA 11 | R | 1.407132 | C | 0.710665382 | K | −1.631541 | | |
| | A4 | 0.0342231 | A6 | −0.01054141 | A8 | 0.000512931 | A10 | 0.01440142 |
| | A12 | 0.009329735 | A14 | 0.006135766 | A16 | −0.01637014 | | |
| | | | B | −0.005843874 | | | | |
| | | RANGE OF h | SMALL | 0.932581 | | | | |
| | | | LARGE | 0.964545 | | | | |
| BLU-RAY /DVD COMMON USE AREA 12 | R | 1.477124 | C | 0.676991234 | K | −1.420435 | | |
| | A4 | 0.04344266 | A6 | 0.001178248 | A8 | 0.002890162 | A10 | 0.000169676 |
| | A12 | −0.000524148 | A14 | −0.000838883 | A16 | −0.001111756 | | |
| | | | B | −0.004869895 | | | | |
| | | RANGE OF h | SMALL | 0.964545 | | | | |
| | | | LARGE | 0.989576 | | | | |

Fig. 13

SIDE A: ZONE j=13 TO 18

| ZONE j | | | | | | | |
|---|---|---|---|---|---|---|---|
| BLU-RAY /DVD COMMON USE AREA 13 | R | 1.472551 | C | 0.679093627 | K | -1.474817 | |
| | A4 | 0.04286711 | A6 | 0.001223663 | A8 | 0.003137876 | A10 | 0.00100637 |
| | A12 | 0.000376189 | A14 | -0.00027401 | A16 | -0.002176412 | |
| | | | B | -0.003895916 | | | |
| | RANGE OF h | | SMALL | 0.989576 | | | |
| | | | LARGE | 1.010537 | | | |
| BLU-RAY /DVD COMMON USE AREA 14 | R | 1.479586 | C | 0.675864735 | K | -1.479376 | |
| | A4 | 0.04342354 | A6 | 0.001816119 | A8 | 0.003664101 | A10 | 0.001093464 |
| | A12 | 0.000266176 | A14 | -0.00059659 | A16 | -0.001962815 | |
| | | | B | -0.002921937 | | | |
| | RANGE OF h | | SMALL | 1.010537 | | | |
| | | | LARGE | 1.028706 | | | |
| BLU-RAY /DVD COMMON USE AREA 15 | R | 1.478826 | C | 0.676212076 | K | -1.517098 | |
| | A4 | 0.04317621 | A6 | 0.001526801 | A8 | 0.003972736 | A10 | 0.00186178 |
| | A12 | 0.001132504 | A14 | -0.000262064 | A16 | -0.002771862 | |
| | | | B | -0.001947958 | | | |
| | RANGE OF h | | SMALL | 1.028706 | | | |
| | | | LARGE | 1.044816 | | | |
| BLU-RAY /DVD COMMON USE AREA 16 | R | 1.487809 | C | 0.672129285 | K | -1.502858 | |
| | A4 | 0.04302065 | A6 | 0.002339277 | A8 | 0.004401671 | A10 | 0.001988357 |
| | A12 | 0.001054724 | A14 | -0.000447515 | A16 | -0.002656759 | |
| | | | B | -0.000973979 | | | |
| | RANGE OF h | | SMALL | 1.044816 | | | |
| | | | LARGE | 1.059373 | | | |
| BLU-RAY /DVD COMMON USE AREA 17 | R | 1.490775 | C | 0.670792038 | K | -1.518012 | |
| | A4 | 0.04357986 | A6 | 0.002311069 | A8 | 0.004485633 | A10 | 0.001973824 |
| | A12 | 0.001019069 | A14 | -0.00041868 | A16 | -0.002449741 | |
| | | | B | 0 | | | |
| | RANGE OF h | | SMALL | 1.059373 | | | |
| | | | LARGE | 1.072659 | | | |
| BLU-RAY /DVD COMMON USE AREA 18 | R | 1.49491 | C | 0.668936592 | K | -1.512174 | |
| | A4 | 0.04303999 | A6 | 0.002567525 | A8 | 0.004827089 | A10 | 0.002098906 |
| | A12 | 0.001056827 | A14 | -0.0003381 | A16 | -0.002472669 | |
| | | | B | 0.000973979 | | | |
| | RANGE OF h | | SMALL | 1.072659 | | | |
| | | | LARGE | 1.084911 | | | |

Fig. 14

SIDE A:ZONE j=19 TO 22

| ZONE j | | | | | | | | |
|---|---|---|---|---|---|---|---|---|
| BLU-RAY /DVD COMMON USE AREA 19 | R | 1.495096 | C | 0.668853371 | K | −1.523511 | | |
| | A4 | 0.04347325 | A6 | 0.002492273 | A8 | 0.004554101 | A10 | 0.001998625 |
| | A12 | 0.001000807 | A14 | −0.000467157 | A16 | −0.002084074 | | |
| | | | B | 0.001947958 | | | | |
| | | RANGE OF h | SMALL | 1.084911 | | | | |
| | | | LARGE | 1.096299 | | | | |
| BLU-RAY /DVD COMMON USE AREA 20 | R | 1.498038 | C | 0.667539809 | K | −1.519756 | | |
| | A4 | 0.04341198 | A6 | 0.002629952 | A8 | 0.004521274 | A10 | 0.001896512 |
| | A12 | 0.000890141 | A14 | −0.000200778 | A16 | −0.002048661 | | |
| | | | B | 0.002921937 | | | | |
| | | RANGE OF h | SMALL | 1.096299 | | | | |
| | | | LARGE | 1.106922 | | | | |
| BLU-RAY /DVD COMMON USE AREA 21 | R | 1.489031 | C | 0.67157769 | K | −1.480843 | | |
| | A4 | 0.0430581 | A6 | 0.002140375 | A8 | 0.003454773 | A10 | 0.000944453 |
| | A12 | 0.000311511 | A14 | −6.29334E-05 | A16 | −0.00122241 | | |
| | | | B | 0.003895916 | | | | |
| | | RANGE OF h | SMALL | 1.106922 | | | | |
| | | | LARGE | 1.113847 | | | | |
| BLU-RAY EXCLUSIVE USE AREA 22 | R | 1.452877 | C | 0.688289511 | K | −1.471891 | | |
| | A4 | 0.04243736 | A6 | −0.000396819 | A8 | 0.001322548 | A10 | −0.000844585 |
| | A12 | 1.94922E-05 | A14 | 0.000190882 | A16 | −9.60884E-05 | | |
| | | | B | −0.000022402 | | | | |
| | | RANGE OF h | SMALL | 1.113847 | | | | |
| | | | LARGE | 1.6 | | | | |

Fig. 15

SIDE B

| | R | 49.99325 | C | 0.0200027 | K | 0 | | |
|---|---|---|---|---|---|---|---|---|
| R2 | A4 | 0.02999406 | A6 | −0.05280596 | A8 | −0.03201307 | A10 | 0.04411468 |
| | A12 | 0.01911437 | A14 | −0.03938952 | A16 | 0.01328156 | | |
| | RANGE OF h | | B | 2.076 | | | | |
| | | | SMALL | 0 | | | | |
| | | | LARGE | 1.6 | | | | |

Fig. 16

SECOND EMBODIMENT BLU-RAY (BLUE;405nm) OBJECTIVE LENS FOCAL LENGTH 1.765mm, NA0.850

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 3.000 |
| 3 | LENS SURFACE;OBJECT SIDE | ASPHERICAL SURFACE | 2.076 | GLASS OR EQUIVALENT | 1.83164 | — |
| 4 | LENS SURFACE;IMAGE SURFACE SIDE | ASPHERICAL SURFACE | 0.558308 | AIR | 1 | — |
| 5 | DISK SURFACE;OBJECT SIDE | ∞ | 0.6 | PC | 1.6235 | — |
| 6 | DISK INFORMATION RECORDING SURFACE | ∞ | — | — | — | — |

Fig. 17A

SECOND EMBODIMENT DVD (655nm) OBJECTIVE LENS FOCAL LENGTH 1.8564mm, NA0.600

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 2.228 |
| 3 | LENS SURFACE;OBJECT SIDE | ASPHERICAL SURFACE | 2.076 | GLASS OR EQUIVALENT | 1.7911 | — |
| 4 | LENS SURFACE;IMAGE SURFACE SIDE | ASPHERICAL SURFACE | 0.325341 | AIR | 1 | — |
| 5 | DISK SURFACE;OBJECT SIDE | ∞ | 0.6 | PC | 1.58 | — |
| 6 | DISK INFORMATION RECORDING SURFACE | ∞ | — | — | — | — |

Fig. 17B

SECOND EMBODIMENT CD (790nm) OBJECTIVE LENS FOCAL LENGTH 1.8745mm, NA0.469

| PLANE | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|
| 1 OBJECT SURFACE | ∞ | 15.5 | AIR | 1 | — |
| 2 APERTURE SURFACE | ∞ | 0 | AIR | 1 | 1.88 |
| 3 LENS SURFACE; OBJECT SIDE | ASPHERICAL SURFACE | 2.076 | GLASS OR EQUIVALENT | 1.783555 | — |
| 4 LENS SURFACE; IMAGE SURFACE SIDE | ASPHERICAL SURFACE | 0.186156 | AIR | 1 | — |
| 5 DISK SURFACE; OBJECT SIDE | ∞ | 1.2 | PC | 1.573 | — |
| 6 DISK INFORMATION RECORDING SURFACE | — | — | — | — | — |

Fig. 17C

DIFFERENCE IN OPTICAL PATH LENGTH($\lambda$)
BETWEEN ZONE 1 AND ZONE 2 TO 22

| ZONE j | OPTICAL PATH LENGTH DIFFERENCE FROM ZONE 1 | | |
|---|---|---|---|
| | WAVELENGTH 405nm, BLU-RAY | WAVELENGTH 655nm, DVD | WAVELENGTH 790nm, CD |
| 1 | REFERENCE | REFERENCE | REFERENCE |
| 2 | 2 | 1 | 1 |
| 3 | 4 | 2 | 2 |
| 4 | 6 | 3 | 3 |
| 5 | 8 | 4 | 4 |
| 6 | 10 | 5 | 5 |
| 7 | 12 | 6 | 6 |
| 8 | 14 | 7 | 7 |
| 9 | 16 | 8 | 8 |
| 10 | 14 | 7 | 7 |
| 11 | 12 | 6 | 6 |
| 12 | 10 | 5 | — |
| 13 | 8 | 4 | — |
| 14 | 6 | 3 | — |
| 15 | 4 | 2 | — |
| 16 | 2 | 1 | — |
| 17 | 0 | 0 | — |
| 18 | −2 | −1 | — |
| 18 | −4 | −2 | — |
| 20 | −6 | −3 | — |
| 21 | −8 | −4 | — |
| 22 | −10 | — | — |

| | AREA1 | AREA2 | AREA3 | AREA4 | AREA5 | AREA6 | AREA7 |
|---|---|---|---|---|---|---|---|
| $\Delta Vd(\lambda 405)(\lambda)$ | 0.112663 | 0.11076 | 0.11228 | 0.113728 | 0.115647 | 0.113824 | 0.106881 |
| $\Delta Vd(\lambda 655)(\lambda)$ | 0.108923 | 0.108855 | 0.108527 | 0.107989 | 0.108017 | 0.107648 | 0.112463 |
| $\Delta Vd(\lambda 655)/\Delta Vd(\lambda 405)$ | 0.966804 | 0.982801 | 0.966575 | 0.949537 | 0.934023 | 0.945741 | 1.052226 |
| $\Delta Vd(\lambda 405)/\Delta Vd(\lambda 655)$ | 1.034336 | 1.0175 | 1.034581 | 1.053144 | 1.070637 | 1.057372 | 0.950366 |

Fig. 20B

| | AREA8 | AREA9 | AREA10 | AREA11 | AREA12 | AREA13 | AREA14 |
|---|---|---|---|---|---|---|---|
| $\Delta Vd(\lambda 405)(\lambda)$ | 0.118205 | 0.077986 | 0.112089 | 0.099994 | 0.099557 | 0.081079 | 0.074496 |
| $\Delta Vd(\lambda 655)(\lambda)$ | 0.116795 | 0.076682 | 0.107916 | 0.104221 | 0.090406 | 0.085492 | 0.076735 |
| $\Delta Vd(\lambda 655)/\Delta Vd(\lambda 405)$ | 0.988072 | 0.983279 | 0.962771 | 1.042273 | 0.908083 | 1.054428 | 1.030055 |
| $\Delta Vd(\lambda 405)/\Delta Vd(\lambda 655)$ | 1.012072 | 1.017005 | 1.038669 | 0.959442 | 1.101221 | 0.948381 | 0.970822 |

Fig. 20C

| | AREA15 | AREA16 | AREA17 | AREA18 | AREA19 | AREA20 | AREA21 |
|---|---|---|---|---|---|---|---|
| $\Delta Vd(\lambda 405)(\lambda)$ | 0.061884 | 0.05554 | 0.042557 | 0.033961 | 0.025566 | 0.022087 | 0.029899 |
| $\Delta Vd(\lambda 655)(\lambda)$ | 0.065213 | 0.051423 | 0.048405 | 0.039528 | 0.040547 | 0.036301 | 0.043709 |
| $\Delta Vd(\lambda 655)/\Delta Vd(\lambda 405)$ | 1.053794 | 0.925873 | 1.137416 | 1.163923 | 1.585974 | 1.643546 | 1.461888 |
| $\Delta Vd(\lambda 405)/\Delta Vd(\lambda 655)$ | 0.948952 | 1.080061 | 0.879186 | 0.859163 | 0.630528 | 0.608441 | 0.684047 |

SIDE A

| ZONE j | | 1 (HDDVD/DVD COMMON AREA) | 2 (HDDVD/DVD COMMON AREA) | 3 (HDDVD/DVD COMMON AREA) | 4 (HDDVD/DVD COMMON AREA) | 5 (HDDVD/DVD COMMON AREA) | 6 (HDDVD/DVD COMMON AREA) | 7 (DVD EXCLUSIVE AREA) |
|---|---|---|---|---|---|---|---|---|
| RANGE OF h | LOWER LIMIT | 0 | 0.638449737 | 0.890527411 | 1.129434779 | 1.70935057 | 1.878647359 | 1.946519408 |
| | UPPER LIMIT | 0.638449737 | 0.890527411 | 1.129434779 | 1.70935057 | 1.878647359 | 1.946519408 | 2.084 |
| B | | 0 | 0.001474416 | 0.002942583 | 0.004408376 | 0.002957205 | 0.001512596 | -7.14171E-05 |
| C | | 0.52590795 | 0.526058409 | 0.526208979 | 0.526359917 | 0.526209609 | 0.526058529 | 0.526624092 |
| K | | -0.40705603 | -0.406804912 | -0.406592578 | -0.406143073 | -0.406099759 | -0.40669695 | -0.408309722 |
| A4 | | 0.002711618 | 0.002709128 | 0.002707203 | 0.002700042 | 0.002695751 | 0.002706514 | 0.002935526 |
| A6 | | -0.001445731 | -0.001447425 | -0.001448762 | -0.00144888 | -0.001445026 | -1.44639E-03 | -0.001662801 |
| A8 | | 0.000329808 | 0.000328816 | 0.000327636 | 0.000324254 | 3.219105E-04 | 3.27356E-04 | 4.123773E-04 |
| A10 | | -6.23626E-05 | -6.15714E-05 | -6.06962E-05 | -5.85948E-05 | -5.756254E-05 | -6.07796E-05 | -9.292706E-05 |
| A12 | | -1.26611E-05 | -1.30457E-05 | -1.34442E-05 | -1.42604E-05 | -1.447367E-05 | -1.33008E-05 | -4.239090E-06 |
| A14 | | 5.68E-06 | 5.76392E-06 | 5.84826E-06 | 6.00572E-06 | 6.022988E-06 | 5.80646E-06 | 4.415430E-06 |
| A16 | | -6.38098E-07 | -6.45806E-07 | -6.53374E-07 | -6.66496E-07 | -6.661790E-07 | -6.48857E-07 | -5.634218E-07 |

SIDE B

| | |
|---|---|
| C | -0.139072037 |
| K | -114.0147181 |
| A4 | 0.005616797 |
| A6 | -0.002269237 |
| A8 | 0.000525999 |
| A10 | 3.76121E-05 |
| A12 | -4.43187E-05 |
| A14 | 8.21847E-06 |
| A16 | -5.02326E-07 |

Fig. 22

THIRD EMBODIMENT HDDVD (408nm) OBJECTIVE LENS FOCAL LENGTH 3.1010mm, NA0.650

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | -93.9 | AIR | 1 | — |
| 2 | APERTURE SURFACE | ∞ | 0 | AIR | 1 | 4.168 |
| 3 | LENS SURFACE; OBJECT SIDE | ASPHERICAL SURFACE | 1.92 | RESIN OR EQUIVALENT | 1.5229 | — |
| 4 | LENS SURFACE; IMAGE SURFACE SIDE | ASPHERICAL SURFACE | 1.552869 | AIR | 1 | — |
| 5 | DISK SURFACE; OBJECT SIDE | ∞ | 0.6 | PC | 1.622 | — |
| 6 | DISK INFORMATION RECORDING SURFACE | ∞ | — | — | — | — |

Fig. 23A

THIRD EMBODIMENT DVD (658nm) OBJECTIVE LENS FOCAL LENGTH 3.2059mm, NA0.650

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 4.168 |
| 3 | LENS SURFACE; OBJECT SIDE | ASPHERICAL SURFACE | 1.92 | RESIN OR EQUIVALENT | 1.5048 | — |
| 4 | LENS SURFACE; IMAGE SURFACE SIDE | ASPHERICAL SURFACE | 1.736136 | AIR | 1 | — |
| 5 | DISK SURFACE; OBJECT SIDE | ∞ | 0.6 | PC | 1.5774 | — |
| 6 | DISK INFORMATION RECORDING SURFACE | ∞ | — | — | — | — |

Fig. 23B

THIRD EMBODIMENT CD(785nm) OBJECTIVE LENS FOCAL LENGTH 3.2246mm, NA0.470

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | 113.0 | AIR | 1 | — |
| 2 | APERTURE SURFACE | ∞ | 0 | AIR | 1 | 3.066 |
| 3 | LENS SURFACE;OBJECT SIDE | ASPHERICAL SURFACE | 1.92 | RESIN OR EQUIVALENT | 1.50176 | — |
| 4 | LENS SURFACE;IMAGE SURFACE SIDE | ASPHERICAL SURFACE | 1.476309 | AIR | 1 | — |
| 5 | DISK SURFACE;OBJECT SIDE | ∞ | 1.2 | PC | 1.57204 | — |
| 6 | DISK INFORMATION RECORDING SURFACE | ∞ | — | — | — | — |

Fig. 23C

| | OBJECT DISTANCE (mm) | COMA ABERRATION (λ RMS) |
|---|---|---|
| FIRST EMBODIMENT | 49.4 | 0.0469 |
| THIRD EMBODIMENT | 113.0 | 0.0177 |

Fig. 26

DIFFERENCE IN OPTICAL PATH LENGTH (λ) BETWEEN ZONE 1 AND ZONE 2 TO 7

| ZONE j | OPTICAL PATH LENGTH DIFFERENCE FROM ZONE 1 | | |
|---|---|---|---|
| | WAVELENGTH 408nm, HDDVD | WAVELENGTH 658nm, DVD | WAVELENGTH 785nm, CD |
| 1 | REFERENCE | REFERENCE | REFERENCE |
| 2 | 2 | 1 | 1 |
| 3 | 4 | 2 | 2 |
| 4 | 6 | 3 | 3 |
| 5 | 4 | 2 | - |
| 6 | 2 | 1 | - |
| 7 | 0 | 0 | - |

Fig. 27

SIDE A: ZONE j =1 TO 6

| ZONE j | | | | | | | | | |
|---|---|---|---|---|---|---|---|---|---|
| BLU-RAY/DVD COMMON USE AREA 1 | R | 1.483996664 | C | 0.673855962 | K | -16.3972459 | | | |
| | A4 | 0.094660411 | A6 | 39.11539292 | A8 | -1505.37515 | A10 | 26018.3113 | |
| | A12 | -170114.543 | A14 | 2.252424464 | A16 | 0.287207077 | | | |
| | | | B | 0 | | | | | |
| | RANGE OF h | SMALL | 0 | | | | | | |
| | | LARGE | 0.21762238 | | | | | | |
| BLU-RAY/DVD COMMON USE AREA 2 | R | 1.53567174 | C | 0.651180831 | K | -6.65802029 | | | |
| | A4 | 0.817293994 | A6 | -9.14557483 | A8 | -17.2690536 | A10 | 979.9972387 | |
| | A12 | 2483.17142 | A14 | -118851.816 | A16 | 524155.6559 | | | |
| | | | B | -0.0015919 | | | | | |
| | RANGE OF h | SMALL | 0.21762238 | | | | | | |
| | | LARGE | 0.31022235 | | | | | | |
| BLU-RAY/DVD COMMON USE AREA 3 | R | 1.599112109 | C | 0.625347025 | K | 1.433878527 | | | |
| | A4 | 0.396330904 | A6 | -0.63776774 | A8 | -18.796398 | A10 | -54.5171068 | |
| | A12 | 636.3429712 | A14 | 5925.017186 | A16 | -32751.9962 | | | |
| | | | B | -0.00318377 | | | | | |
| | RANGE OF h | SMALL | 0.31022235 | | | | | | |
| | | LARGE | 0.3829029 | | | | | | |
| BLU-RAY/DVD COMMON USE AREA 4 | R | 1.434551701 | C | 0.697081882 | K | -7.52479429 | | | |
| | A4 | 0.085767596 | A6 | 0.423482479 | A8 | 2.603767797 | A10 | -3.81841 | |
| | A12 | -69.3580366 | A14 | -133.809602 | A16 | 1225.44831 | | | |
| | | | B | -0.00477565 | | | | | |
| | RANGE OF h | SMALL | 0.3829029 | | | | | | |
| | | LARGE | 0.44551105 | | | | | | |
| BLU-RAY/DVD COMMON USE AREA 5 | R | 1.23702856 | C | 0.808388773 | K | -13.8934328 | | | |
| | A4 | -0.04197071 | A6 | 0.627402525 | A8 | 3.888321541 | A10 | 5.882855892 | |
| | A12 | -59.9644373 | A14 | -237.861474 | A16 | 855.430159 | | | |
| | | | B | -0.00636754 | | | | | |
| | RANGE OF h | SMALL | 0.44551105 | | | | | | |
| | | LARGE | 0.50184088 | | | | | | |
| BLU-RAY/DVD COMMON USE AREA 6 | R | 1.166760899 | C | 0.857073631 | K | -12.1244823 | | | |
| | A4 | -0.07888418 | A6 | 0.308580202 | A8 | 2.682470381 | A10 | 4.183538737 | |
| | A12 | -19.9011704 | A14 | -99.0700446 | A16 | 237.2207005 | | | |
| | | | B | -0.00795942 | | | | | |
| | RANGE OF h | SMALL | 0.50184088 | | | | | | |
| | | LARGE | 0.55384699 | | | | | | |

Fig. 29

SIDE A: ZONE j = 7 TO 12

| ZONE j | | | | | | | | |
|---|---|---|---|---|---|---|---|---|
| BLU-RAY/DVD COMMON USE AREA 7 | | R | 1.244427233 | C | 0.803582542 | K | -8.08545341 | |
| | | A4 | -0.02845717 | A6 | 0.108380327 | A8 | 1.076913034 | A10 | 1.964356292 |
| | | A12 | -3.75981137 | A14 | -31.8120777 | A16 | 53.25002802 | |
| | | | | B | -0.00955131 | | | |
| | | RANGE OF h | | SMALL | 0.55384699 | | | |
| | | | | LARGE | 0.60271631 | | | |
| BLU-RAY/DVD COMMON USE AREA 8 | | R | 1.327355868 | C | 0.753377466 | K | -5.19465131 | |
| | | A4 | 0.010760779 | A6 | 0.039032865 | A8 | 0.364424321 | A10 | 0.240003296 |
| | | A12 | 0.481545028 | A14 | -6.16830235 | A16 | 5.8148765 | |
| | | | | B | -0.01114319 | | | |
| | | RANGE OF h | | SMALL | 0.60271631 | | | |
| | | | | LARGE | 0.64925904 | | | |
| BLU-RAY/DVD COMMON USE AREA 9 | | R | 1.409106927 | C | 0.709669352 | K | -2.38637377 | |
| | | A4 | 0.027844963 | A6 | -0.04544383 | A8 | -0.01694078 | A10 | 0.15663804 |
| | | A12 | 0.5162377 | A14 | 0.721501213 | A16 | -2.66990743 | |
| | | | | B | -0.01273508 | | | |
| | | RANGE OF h | | SMALL | 0.64925904 | | | |
| | | | | LARGE | 0.69409466 | | | |
| BLU-RAY/DVD COMMON USE AREA 10 | | R | 1.338005001 | C | 0.747381362 | K | -3.56445559 | |
| | | A4 | 0.014468192 | A6 | -0.0220885 | A8 | 0.097664239 | A10 | 0.263425333 |
| | | A12 | 0.030096219 | A14 | -0.66685014 | A16 | 0.110657132 | |
| | | | | B | -0.01432696 | | | |
| | | RANGE OF h | | SMALL | 0.69409466 | | | |
| | | | | LARGE | 0.73773231 | | | |
| BLU-RAY/DVD COMMON USE AREA 11 | | R | 1.348930249 | C | 0.741328175 | K | 1.348930249 | |
| | | A4 | 0.019832778 | A6 | -0.03230534 | A8 | 0.023369232 | A10 | 0.12517188 |
| | | A12 | 0.188638209 | A14 | -0.1012241 | A16 | -0.34477055 | |
| | | | | B | -0.01591885 | | | |
| | | RANGE OF h | | SMALL | 0.73773231 | | | |
| | | | | LARGE | 0.7806433 | | | |
| BLU-RAY/DVD COMMON USE AREA 12 | | R | 1.300111546 | C | 0.769164771 | K | -2.6569841 | |
| | | A4 | 0.012719799 | A6 | -0.06037886 | A8 | -0.02185226 | A10 | 0.097939601 |
| | | A12 | 0.252933148 | A14 | 0.208391643 | A16 | -0.58404278 | |
| | | | | B | -0.01751073 | | | |
| | | RANGE OF h | | SMALL | 0.7806433 | | | |
| | | | | LARGE | 0.82330839 | | | |

Fig. 30

SIDE A: ZONE j =13 TO 18

| ZONE j | | | | | | | | |
|---|---|---|---|---|---|---|---|---|
| BLU-RAY/DVD COMMON USE AREA 13 | R | 1.419047629 | C | 0.704697982 | K | -2.08105117 | | |
| | A4 | 0.03516193 | A6 | -0.01799753 | A8 | -0.00592847 | A10 | 0.022874187 |
| | A12 | 0.055942122 | A14 | 0.043145862 | A16 | -0.10882687 | | |
| | | | B | -0.01910261 | | | | |
| | | RANGE OF h | SMALL | 0.82330839 | | | | |
| | | | LARGE | 0.86626825 | | | | |
| BLU-RAY/DVD COMMON USE AREA 14 | R | 1.546115933 | C | 0.646782029 | K | -1.50835739 | | |
| | A4 | 0.052135072 | A6 | 0.010960979 | A8 | 0.003664849 | A10 | -0.01231273 |
| | A12 | -0.02675421 | A14 | -0.01946868 | A16 | 0.041244308 | | |
| | | | B | -0.0206945 | | | | |
| | | RANGE OF h | SMALL | 0.86626825 | | | | |
| | | | LARGE | 0.91020224 | | | | |
| BLU-RAY/DVD COMMON USE AREA 15 | R | 1.555431411 | C | 0.642908452 | K | -1.51093094 | | |
| | A4 | 0.052553858 | A6 | 0.010222417 | A8 | 0.003114724 | A10 | -0.00934616 |
| | A12 | -0.01836561 | A14 | -0.01186149 | A16 | 0.023019799 | | |
| | | | B | -0.02228638 | | | | |
| | | RANGE OF h | SMALL | 0.91020224 | | | | |
| | | | LARGE | 0.95608451 | | | | |
| BLU-RAY/DVD COMMON USE AREA 16 | R | 1.548209197 | C | 0.645907544 | K | -1.557899 | | |
| | A4 | 0.050747145 | A6 | 0.007188213 | A8 | 0.001961623 | A10 | -0.00530843 |
| | A12 | -0.00949987 | A14 | -0.00632247 | A16 | 0.010317907 | | |
| | | | B | -0.0238783 | | | | |
| | | RANGE OF h | SMALL | 0.95608451 | | | | |
| | | | LARGE | 1.00552917 | | | | |
| BLU-RAY/DVD COMMON USE AREA 17 | R | 1.544630001 | C | 0.647404232 | K | -1.587942 | | |
| | A4 | 0.049769271 | A6 | 0.005181299 | A8 | 0.001120656 | A10 | -0.00330778 |
| | A12 | -0.00510844 | A14 | -0.0029516 | A16 | 0.004507299 | | |
| | | | B | -0.02547015 | | | | |
| | | RANGE OF h | SMALL | 1.00552917 | | | | |
| | | | LARGE | 1.061859 | | | | |
| BLU-RAY/DVD COMMON USE AREA 18 | R | 1.580184659 | C | 0.632837431 | K | -1.19506424 | | |
| | A4 | 0.052025599 | A6 | -0.00032127 | A8 | -0.00515099 | A10 | -0.00463934 |
| | A12 | 0.000134763 | A14 | 0.002926451 | A16 | -0.00064826 | | |
| | | | B | -0.02706204 | | | | |
| | | RANGE OF h | SMALL | 1.061859 | | | | |
| | | | LARGE | 1.13567132 | | | | |

Fig. 31

SIDE A: ZONE j = 19 TO 24

| ZONE j | | | | | | | |
|---|---|---|---|---|---|---|---|
| BLU-RAY/DVD COMMON USE AREA 19 | R | 1.555954904 | C | 0.642692148 | K | -1.34639801 | |
| | A4 | 0.050919564 | A6 | -0.00350483 | A8 | -0.00416339 | A10 | -0.00096262 |
| | A12 | 0.001201134 | A14 | 0.000745264 | A16 | -0.00036526 | |
| | | | B | -0.02865392 | | | |
| | RANGE OF h | | SMALL | 1.13567132 | | | |
| | | | LARGE | 1.33034626 | | | |
| BLU-RAY/DVD COMMON USE AREA 20 | R | 1.44416631 | C | 0.692441025 | K | -1.80761473 | |
| | A4 | 0.042529601 | A6 | -0.00258023 | A8 | -0.00093988 | A10 | 0.000261275 |
| | A12 | 0.000673281 | A14 | 0.000111189 | A16 | -0.00013072 | |
| | | | B | -0.02706204 | | | |
| | RANGE OF h | | SMALL | 1.33034626 | | | |
| | | | LARGE | 1.38585801 | | | |
| BLU-RAY/DVD COMMON USE AREA 21 | R | 1.49455004 | C | 0.669097704 | K | -1.76648975 | |
| | A4 | 0.045003624 | A6 | -0.00045278 | A8 | -0.000255 | A10 | 2.25736E-05 |
| | A12 | 0.00024333 | A14 | -8.7995E-05 | A16 | 5.22662E-06 | |
| | | | B | -0.02547015 | | | |
| | RANGE OF h | | SMALL | 1.38585801 | | | |
| | | | LARGE | 1.42287845 | | | |
| BLU-RAY/DVD COMMON USE AREA 22 | R | 1.566237953 | C | 0.638472588 | K | -1.66992176 | |
| | A4 | 0.048479042 | A6 | 0.001490439 | A8 | -2.1408E-05 | A10 | -0.00028489 |
| | A12 | -2.1435E-05 | A14 | -0.00016441 | A16 | 7.00167E-05 | |
| | | | B | -0.02387827 | | | |
| | RANGE OF h | | SMALL | 1.42287845 | | | |
| | | | LARGE | 1.45193712 | | | |
| BLU-RAY/DVD COMMON USE AREA 23 | R | 1.647620951 | C | 0.606935715 | K | -1.58171714 | |
| | A4 | 0.052010933 | A6 | 0.003244997 | A8 | 0.000258507 | A10 | -0.00051211 |
| | A12 | -0.00019464 | A14 | -0.0002237 | A16 | 0.000107794 | |
| | | | B | -0.02228638 | | | |
| | RANGE OF h | | SMALL | 1.45193712 | | | |
| | | | LARGE | 1.47627483 | | | |
| BLU-RAY/DVD COMMON USE AREA 24 | R | 1.575125725 | C | 0.634869956 | K | -1.65403728 | |
| | A4 | 0.049162687 | A6 | 0.001405863 | A8 | -0.00010388 | A10 | -0.00027842 |
| | A12 | 6.52617E-06 | A14 | -0.00015409 | A16 | 6.11741E-05 | |
| | | | B | -0.0206945 | | | |
| | RANGE OF h | | SMALL | 1.47627483 | | | |
| | | | LARGE | 1.49740483 | | | |

Fig. 32

SIDE A: ZONE j =25 TO 29

| ZONE j | | | | | | | | |
|---|---|---|---|---|---|---|---|---|
| BLU-RAY/DVD COMMON USE AREA 25 | | R | 1.479508128 | C | 0.675900308 | K | -1.76273653 | |
| | | A4 | 0.04538464 | A6 | -0.00073096 | A8 | -0.00041136 | A10 | -3.5704E-05 |
| | | A12 | 0.000224223 | A14 | -8.5864E-05 | A16 | 1.51987E-05 | |
| | | | | B | -0.01910261 | | | |
| | RANGE OF h | SMALL | 1.49740483 | | | | | |
| | | LARGE | 1.51618144 | | | | | |
| BLU-RAY/DVD COMMON USE AREA 26 | | R | 1.552307326 | C | 0.644202332 | K | -1.69655271 | |
| | | A4 | 0.048007259 | A6 | 0.000678304 | A8 | -0.00015887 | A10 | -0.00013321 |
| | | A12 | 0.000117908 | A14 | -0.00012678 | A16 | 3.42952E-05 | |
| | | | | B | -0.01751073 | | | |
| | RANGE OF h | SMALL | 1.51618144 | | | | | |
| | | LARGE | 1.5331406 | | | | | |
| BLU-RAY/DVD COMMON USE AREA 27 | | R | 1.596231378 | C | 0.626475594 | K | -1.65825971 | |
| | | A4 | 0.049354083 | A6 | 0.001377076 | A8 | -3.2511E-05 | A10 | -0.0001617 |
| | | A12 | 7.20323E-05 | A14 | -0.0001368 | A16 | 3.84509E-05 | |
| | | | | B | -0.01591885 | | | |
| | RANGE OF h | SMALL | 1.5331406 | | | | | |
| | | LARGE | 1.54864802 | | | | | |
| BLU-RAY/DVD COMMON USE AREA 28 | | R | 1.548556394 | C | 0.645762727 | K | -1.71865614 | |
| | | A4 | 0.047508066 | A6 | 0.000450203 | A8 | -0.0001415 | A10 | -5.7179E-05 |
| | | A12 | 0.000165962 | A14 | -0.00011379 | A16 | 2.16564E-05 | |
| | | | | B | -0.01432696 | | | |
| | RANGE OF h | SMALL | 1.54864802 | | | | | |
| | | LARGE | 1.56296219 | | | | | |
| BLU-RAY/DVD COMMON USE AREA 29 | | R | 1.581540106 | C | 0.632295062 | K | -1.68511463 | |
| | | A4 | 0.048533047 | A6 | 0.000963999 | A8 | -6.4664E-05 | A10 | -8.9982E-05 |
| | | A12 | 0.000128895 | A14 | -0.00012105 | A16 | 2.61297E-05 | |
| | | | | B | -0.01273508 | | | |
| | RANGE OF h | SMALL | 1.56296219 | | | | | |
| | | LARGE | 1.57627745 | | | | | |

Fig. 33

SIDE A: ZONE j = 30 TO 31

| ZONE j | | | | | | | | | |
|---|---|---|---|---|---|---|---|---|---|
| BLU-RAY EXCLUSIVE USE AREA 30 | R | 1.443125977 | C | 0.692940198 | K | -2.02113842 | | | |
| | A4 | 0.045697032 | A6 | 0.000804706 | A8 | -0.00021843 | A10 | -9.9119E-05 | |
| | A12 | 0.000217028 | A14 | -7.8061E-05 | A16 | 8.11143E-06 | | | |
| | | | B | -0.0111852 | | | | | |
| | | RANGE OF h | SMALL | 1.57627745 | | | | | |
| | | | LARGE | 1.779083 | | | | | |
| BLU-RAY EXCLUSIVE USE AREA 31 | R | 1.440992543 | C | 0.693966117 | K | -2.0128819 | | | |
| | A4 | 0.045497326 | A6 | 0.000855015 | A8 | -0.0001979 | A10 | -0.0001015 | |
| | A12 | 0.000215442 | A14 | -7.7924E-05 | A16 | 8.13734E-06 | | | |
| | | | B | -0.00640955 | | | | | |
| | | RANGE OF h | SMALL | 1.779083 | | | | | |
| | | | LARGE | 2.016 | | | | | |

Fig. 34

SIDE B

| R 2 | R | -2.66955809 | C | -0.37459383 | K | -20.6486848 | | |
|---|---|---|---|---|---|---|---|---|
| | A4 | 0.068007176 | A6 | -0.06053298 | A8 | 0.029587666 | A10 | -0.00861265 |
| | A12 | 0.001454018 | A14 | -0.00012305 | A16 | 3.35E-06 | | |
| | | | B | 2.642468 | | | | |
| | | RANGE OF h | SMALL | 0 | | | | |
| | | | LARGE | 1.6473 | | | | |

Fig. 35

FOURTH EMBODIMENT BLU-RAY (BLUE, 408nm) OBJECTIVE LENS FOCAL LENGTH 2.3721mm, NA0.850

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 4.032 |
| 3 | LENS SURFACE; OBJECT SIDE | ASPHERICAL SURFACE | 2.642 | GLASS OR EQUIVALENT | 1.5126 | — |
| 4 | LENS SURFACE; IMAGE SURFACE SIDE | ASPHERICAL SURFACE | 0.8867 | AIR | 1 | — |
| 5 | DISK SURFACE; OBJECT SIDE | ∞ | 0.0875 | PC | 1.6205 | — |
| 6 | DISK INFORMATION RECORDING SURFACE | ∞ | — | — | — | — |

Fig. 36A

FOURTH EMBODIMENT DVD (655nm) OBJECTIVE LENS FOCAL LENGTH 2.4262mm, NA0.650

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | ∞ | AIR | 1 | — |
| 2 | APERTURE SURFACE | ∞ | 0 | AIR | 1 | 3.153 |
| 3 | LENS SURFACE; OBJECT SIDE | ASPHERICAL SURFACE | 2.642 | GLASS OR EQUIVALENT | 1.4987 | — |
| 4 | LENS SURFACE; IMAGE SURFACE SIDE | ASPHERICAL SURFACE | 0.60873 | AIR | 1 | — |
| 5 | DISK SURFACE; OBJECT SIDE | ∞ | 0.6 | PC | 1.5794 | — |
| 6 | DISK INFORMATION RECORDING SURFACE | ∞ | — | — | — | — |

FOURTH EMBODIMENT CD(790nm) OBJECTIVE LENS FOCAL LENGTH 2.4378mm, NA0.510

| PLANE | | CURVATURE RADIUS (mm) | INTERPLANAR DISTANCE (mm) ON OPTICAL AXIS | MATERIAL BETWEEN PLANES | REFRACTIVE INDEX | EFFECTIVE DIAMETER (mm) |
|---|---|---|---|---|---|---|
| 1 | OBJECT SURFACE | ∞ | 19.35 | AIR | 1 | — |
| 2 | APERTURE SURFACE | ∞ | 0 | AIR | 1 | 2.794 |
| 3 | LENS SURFACE;OBJECT SIDE | ASPHERICAL SURFACE | 2.642 | GLASS OR EQUIVALENT | 1.4958 | — |
| 4 | LENS SURFACE;IMAGE SURFACE SIDE | ASPHERICAL SURFACE | 0.5557 | AIR | 1 | — |
| 5 | DISK SURFACE;OBJECT SIDE | ∞ | 1.2 | PC | 1.5725 | — |
| 6 | DISK INFORMATION RECORDING SURFACE | ∞ | — | — | — | — |

DIFFERENCE IN OPTICAL PATH LENGTH (λ) BETWEEN ZONE 1 AND ZONE 2 TO 31

| ZONE j | OPTICAL PATH LENGTH DIFFERENCE FROM ZONE 1 | | |
|---|---|---|---|
| | WAVELENGTH 405nm, BLU-RAY | WAVELENGTH 655nm, DVD | WAVELENGTH 790nm, CD |
| 1 | REFERENCE | REFERENCE | REFERENCE |
| 2 | 2 | 1 | 1 |
| 3 | 4 | 2 | 2 |
| 4 | 6 | 3 | 3 |
| 5 | 8 | 4 | 4 |
| 6 | 10 | 5 | 5 |
| 7 | 12 | 6 | 6 |
| 8 | 14 | 7 | 7 |
| 9 | 16 | 8 | 8 |
| 10 | 18 | 9 | 9 |
| 11 | 20 | 10 | 10 |
| 12 | 22 | 11 | 11 |
| 13 | 24 | 12 | 12 |
| 14 | 26 | 13 | 13 |
| 15 | 28 | 14 | 14 |
| 16 | 30 | 15 | 15 |
| 17 | 32 | 16 | 16 |
| 18 | 34 | 17 | 17 |
| 19 | 36 | 18 | 18 |
| 20 | 34 | 17 | 17 |
| 21 | 32 | 16 | 16 |
| 22 | 30 | 15 | 15 |
| 23 | 28 | 14 | — |
| 24 | 26 | 13 | — |
| 25 | 24 | 12 | — |
| 26 | 22 | 11 | — |
| 27 | 20 | 10 | — |
| 28 | 18 | 9 | — |
| 29 | 16 | 8 | — |
| 30 | 14 | — | — |
| 31 | 8 | — | — |

Fig. 37

| | MATERIAL | REFRACTIVE INDEX | THICKNESS (nm) |
|---|---|---|---|
| 1 | SiO2 | 1.4538 | 70.2 |
| 2 | Ta2O5 | 2.12 | 89.76 |
| 3 | SiO2 | 1.4538 | 144.23 |
| 4 | Ta2O5 | 2.12 | 95.08 |
| 5 | SiO2 | 1.4538 | 135.86 |
| 6 | Ta2O5 | 2.12 | 93.14 |
| 7 | SiO2 | 1.4538 | 133.93 |
| 8 | Ta2O5 | 2.12 | 92.16 |
| 9 | SiO2 | 1.4538 | 134.42 |
| 10 | Ta2O5 | 2.12 | 91.38 |
| 11 | SiO2 | 1.4538 | 136.65 |
| 12 | Ta2O5 | 2.12 | 91.19 |
| 13 | SiO2 | 1.4538 | 140.11 |
| 14 | Ta2O5 | 2.12 | 91.52 |
| 15 | SiO2 | 1.4538 | 152.03 |
| 16 | Ta2O5 | 2.12 | 104.38 |
| SUBSTRATE | BK 7 | 1.51164 | |

|  | MATERIAL | REFRACTIVE INDEX | THICKNESS (nm) |
|---|---|---|---|
| 1 | SiO2 | 1.45325 | 239.03 |
| 2 | Ta2O5 | 2.11727 | 107.85 |
| 3 | SiO2 | 1.45325 | 141.84 |
| 4 | Ta2O5 | 2.11727 | 92.21 |
| 5 | SiO2 | 1.45325 | 141.92 |
| 6 | Ta2O5 | 2.11727 | 89.34 |
| 7 | SiO2 | 1.45325 | 144.57 |
| 8 | Ta2O5 | 2.11727 | 90.17 |
| 9 | SiO2 | 1.45325 | 150.14 |
| 10 | Ta2O5 | 2.11727 | 106.81 |
| SUBSTRATE | BK 7 | 1.51111 | | nL=1.462 (SiO₂)   nS=1.54 (APPEL REFLECTANCE : 4.5)

|        | SINGLE LAYER | 1.55 | 1.65 | 1.75 | 1.85 | 1.95 | 2.05 | 2.15 | 2.25 | 2.35 |
|--------|--------------|------|------|------|------|------|------|------|------|------|
| 405±5  | 3.08 | 2.85 | 1.50 | 0.77 | 0.61 | 0.85 | 1.18 | 1.58 | 2.12 | 2.79 |
| 655±20 | 2.84 | 2.75 | 1.73 | 1.00 | 0.63 | 0.44 | 0.34 | 0.57 | 1.20 | 2.03 |
| 790±20 | 3.06 | 2.93 | 1.88 | 1.33 | 1.15 | 1.45 | 2.30 | 3.56 | 5.14 | 6.98 |

Fig. 44A nL=1.462 (SiO₂)   nS=1.70 (REFLECTANCE : 6.7)

|        | SINGLE LAYER | 1.75 | 1.85 | 1.95 | 2.05 | 2.15 | 2.25 | 2.35 |
|--------|--------------|------|------|------|------|------|------|------|
| 405±5  | 2.28 | 1.65 | 1.05 | 0.89 | 1.06 | 1.37 | 1.78 | 2.30 |
| 655±20 | 2.14 | 1.72 | 0.94 | 0.48 | 0.28 | 0.30 | 0.72 | 1.36 |
| 790±20 | 2.79 | 2.49 | 2.02 | 1.94 | 2.29 | 3.11 | 4.26 | 5.69 |

Fig. 44B nL=1.462 (SiO₂)   nS=1.85 (REFLECTANCE : 8.9)

|        | SINGLE LAYER | 1.95 | 2.05 | 2.15 | 2.25 | 2.35 | 2.45 |
|--------|--------------|------|------|------|------|------|------|
| 405±5  | 1.98 | 1.37 | 1.23 | 1.36 | 1.68 | 2.11 | 2.64 |
| 655±20 | 1.92 | 1.31 | 0.91 | 0.75 | 0.81 | 1.17 | 1.78 |
| 790±20 | 2.96 | 2.70 | 2.76 | 3.19 | 4.00 | 5.11 | 6.46 |

Fig. 44C nS=1.54   nL=1.385

|        | SINGLE LAYER | 1.55 | 1.65 | 1.75 | 1.85 | 1.95 | 2.05 | 2.15 | 2.25 | 2.35 | 2.45 |
|--------|--------------|------|------|------|------|------|------|------|------|------|------|
| 405±5  | 1.78 | 1.57 | 0.79 | 0.59 | 0.79 | 1.13 | 1.60 | 2.24 | 3.04 | 3.96 | 4.97 |
| 655±20 | 1.65 | 1.61 | 0.75 | 0.33 | 0.11 | 0.31 | 0.87 | 1.66 | 2.65 | 3.84 | 5.19 |
| 790±20 | 2.06 | 2.01 | 1.38 | 1.22 | 1.60 | 2.55 | 3.89 | 5.56 | 7.49 | 9.62 | 11.89 |

Fig. 44D nS=1.70   nL=1.385

|        | SINGLE LAYER | 1.75 | 1.85 | 1.95 | 2.05 | 2.15 | 2.25 | 2.35 | 2.45 |
|--------|--------------|------|------|------|------|------|------|------|------|
| 405±5  | 1.42 | 1.09 | 0.91 | 1.06 | 1.41 | 1.98 | 2.52 | 3.28 | 4.14 |
| 655±20 | 1.40 | 1.11 | 0.68 | 0.55 | 0.73 | 1.16 | 2.00 | 2.95 | 4.06 |
| 790±20 | 2.18 | 2.05 | 2.03 | 2.47 | 3.37 | 4.57 | 6.13 | 7.90 | 9.86 |

Fig. 44E nS=1.85   nL=1.385

|        | SINGLE LAYER | 1.95 | 2.05 | 2.15 | 2.25 | 2.35 | 2.45 |
|--------|--------------|------|------|------|------|------|------|
| 405±5  | 1.50 | 1.33 | 1.48 | 1.85 | 2.35 | 2.98 | 3.71 |
| 655±20 | 1.57 | 1.25 | 1.19 | 1.39 | 1.87 | 2.59 | 3.50 |
| 790±20 | 2.67 | 2.81 | 3.33 | 4.23 | 5.44 | 6.89 | 8.56 |

|  | REFRACTIVE INDEX | OPTICAL FILM THICKNESS | PHYSICAL FILM THICKNESS |
|---|---|---|---|
| $SiO_2$ | 1.46 | 0.25 $\lambda$ | 85.5nm |
| $Al_2O_3+ZrO_2$ | 1.85 | 0.50 $\lambda$ | 135.1nm |
| SUBSTRATE | 1.53 |  |  |

Fig. 48B

|  | REFRACTIVE INDEX | OPTICAL FILM THICKNESS | PHYSICAL FILM THICKNESS |
|---|---|---|---|
| $SiO_2$ | 1.46 | 0.25 $\lambda$ | 85.5nm |
| $Y_2O_3$ | 1.80 | 0.50 $\lambda$ | 139.0nm |
| SUBSTRATE | 1.53 |  |  |

Fig. 48C

|  | REFRACTIVE INDEX | OPTICAL FILM THICKNESS | PHYSICAL FILM THICKNESS |
|---|---|---|---|
| $SiO_2$ | 1.46 | 0.25 $\lambda$ | 85.5nm |
| SiN | 2.04 | 0.50 $\lambda$ | 122.5nm |
| SUBSTRATE | 1.53 |  |  |

EXAMPLE 4

|  | MATERIAL | REFLACTIVE INDEX | OPTICAL FILM THICKNESS |
|---|---|---|---|
| LOW REFLACTIVE INDEX LAYER | SiO$_2$ | 1.46 | 129.3 |
| HIGH REFLACTIVE INDEX LAYER | Al$_2$O$_3$+ZrO$_2$ | 1.83 | 256.3 |
| OBJECTIVE LENS | ZEONEX | 1.525 | |

EXAMPLE 5

| | MATERIAL | REFLACTIVE INDEX | OPTICAL FILM THICKNESS |
|---|---|---|---|
| LOW REFLACTIVE INDEX LAYER | MgF2 | 1.38 | 126.3 |
| HIGH REFLACTIVE INDEX LAYER | MgO | 1.74 | 260.1 |
| OBJECTIVE LENS | APEL | 1.54 | |

EXAMPLE 6

|  | MATERIAL | REFLACTIVE INDEX | OPTICAL FILM THICKNESS |
|---|---|---|---|
| LOW REFLACTIVE INDEX LAYER | MgF2 | 1.38 | 129.8 |
| HIGH REFLACTIVE INDEX LAYER | Y₂O₃ | 1.78 | 253.8 |
| OBJECTIVE LENS | PMMA | 1.49 |  |

EXAMPLE 7

|  | MATERIAL | REFLACTIVE INDEX | OPTICAL FILM THICKNESS |
|---|---|---|---|
| LOW REFLACTIVE INDEX LAYER | SiO$_2$ | 1.46 | 123.9 |
| HIGH REFLACTIVE INDEX LAYER | Y$_2$O$_3$ | 1.78 | 258.1 |
| OBJECTIVE LENS | ARTON | 1.51 | |

EXAMPLE 8

|  | MATERIAL | REFLACTIVE INDEX | OPTICAL FILM THICKNESS |
|---|---|---|---|
| LOW REFLACTIVE INDEX LAYER | MgF$_2$ | 1.38 | 132.6 |
| HIGH REFLACTIVE INDEX LAYER | Al$_2$O$_3$+ZrO$_2$ | 1.83 | 250.3 |
| OBJECTIVE LENS | PMMA | 1.49 | |

COMPARATIVE EXAMPLE 1

|  | MATERIAL | REFLACTIVE INDEX | OPTICAL FILM THICKNESS |
|---|---|---|---|
| LOW REFLACTIVE INDEX LAYER | $SiO_2$ | 1.46 | 132.8 |
| HIGH REFLACTIVE INDEX LAYER | $ZrO_2$ | 2.05 | 248.8 |
| OBJECTIVE LENS | PC | 1.58 | |

COMPARATIVE EXAMPLE 2

| | MATERIAL | REFLACTIVE INDEX | OPTICAL FILM THICKNESS |
|---|---|---|---|
| LOW REFLACTIVE INDEX LAYER | $SiO_2$ | 1.46 | 137.0 |
| HIGH REFLACTIVE INDEX LAYER | $Ta_2O_5$ | 2.14 | 242.0 |
| OBJECTIVE LENS | ZEONEX | 1.525 | |

COMPARATIVE EXAMPLE 3

| | MATERIAL | REFLACTIVE INDEX | OPTICAL FILM THICKNESS |
|---|---|---|---|
| LOW REFLACTIVE INDEX LAYER | SiO₂ | 1.46 | 136.0 |
| HIGH REFLACTIVE INDEX LAYER | TiO₂ | 2.3 | 226.0 |
| OBJECTIVE LENS | BK₇ | 1.52 | |

|  | nS | nH | nL | λ1 | λ2 | λ3 |
|---|---|---|---|---|---|---|
| EXAMPLE 4 | 1.525 | 1.83 | 1.46 | 0.40 | 0.32 | 1.75 |
| EXAMPLE 5 | 1.54 | 1.74 | 1.38 | 0.42 | 0.30 | 1.67 |
| EXAMPLE 6 | 1.49 | 1.78 | 1.38 | 0.43 | 0.04 | 1.91 |
| EXAMPLE 7 | 1.51 | 1.67 | 1.46 | 1.13 | 1.29 | 1.84 |
| EXAMPLE 8 | 1.58 | 1.92 | 1.38 | 0.53 | 0.04 | 2.28 |
| COMPARATIVE EXAMPLE 1 | 1.58 | 2.05 | 1.46 | 0.78 | 0.10 | 3.55 |
| COMPARATIVE EXAMPLE 2 | 1.525 | 2.14 | 1.46 | 1.04 | 0.78 | 5.10 |
| COMPARATIVE EXAMPLE 3 | 1.52 | 2.3 | 1.46 | 2.04 | 3.41 | 10.24 |

Fig. 58A

|  | A | nH/A | nH−nS | AVERAGE | STANDARD DEVIATION | DETERMINATION VALUE |
|---|---|---|---|---|---|---|
| EXAMPLE 4 | 1.82 | 1.01 | 0.31 | 0.82 | 0.81 | 1.16 |
| EXAMPLE 5 | 1.73 | 1.00 | 0.20 | 0.79 | 0.76 | 1.04 |
| EXAMPLE 6 | 1.70 | 1.05 | 0.29 | 0.79 | 0.98 | 1.32 |
| EXAMPLE 7 | 1.81 | 0.92 | 0.16 | 1.42 | 0.37 | 2.11 |
| EXAMPLE 8 | 1.76 | 1.09 | 0.34 | 0.95 | 1.18 | 1.89 |
| COMPARATIVE EXAMPLE 1 | 1.85 | 1.11 | 0.47 | 1.48 | 1.82 | 4.53 |
| COMPARATIVE EXAMPLE 2 | 1.82 | 1.18 | 0.62 | 2.31 | 2.42 | 9.47 |
| COMPARATIVE EXAMPLE 3 | 1.81 | 1.27 | 0.78 | 5.23 | 4.39 | 40.85 |

Fig. 58B

OPTICAL PICKUP SYSTEM, OPTICAL HEAD, OPTICAL DISK APPARATUS, AND OBJECTIVE LENS

BACKGROUND OF THE INVENTION

1. Field of the Invention

The present invention relates to an optical pickup system, an optical head, an optical disk apparatus, and an objective lens.

2. Description of Related Art

Conventionally, a compatible optical disk apparatus capable of reproducing different types of optical disks such as compact disks (CDs) and digital versatile disks (DVDs) has been proposed. The CD and DVD (which is hereinafter collectively called the optical disk) both have a transparent substrate whose one side is an information recording surface. The optical disk is composed of a combination of two transparent substrates adhered together with their information recording surfaces facing each other, or a combination of the information recording surface and a transparent protection substrate adhered together with the information recording surface facing the protection substrate.

To reproduce information signals stored in the optical disk, the optical disk apparatus focuses a laser beam from a light source on the information recording surface of the optical disk through the transparent substrate. As detailed later, the wavelength of the laser beam differs between CD and DVD. The optical disk apparatus normally uses an objective lens for focusing the laser beam. In some cases, the thickness of the transparent substrate having the information recording surface differs according to the type of the optical disk or a difference in laser beam wavelength. For example, while the transparent substrate of a CD may be 1.2 mm in thickness, that of a DVD may be 0.6 mm.

For the optical disk apparatus to reproduce optical disks of different types, it is required to focus the laser beam on the information recording surface despite that the thickness of the transparent substrate varies by the type of the optical disk. Besides, a new optical disk apparatus that uses a blue laser of approximately 400 nm wavelength to reproduce information is recently proposed. Therefore, there is a need for the optical disk apparatus to be compatible with the new optical disk in addition to CD and existing DVD.

To meet this need, an optical disk apparatus may have objective lenses for different types of optical disks in a pickup so that the objective lenses are changed in accordance with the type of the optical disk in use. Alternatively, it may have pickups for different types of optical disks so that the pickups are changed in accordance with the type of the optical disk in use. However, in terms of cost and size reduction, it is preferred to use the same objective lens for any type of optical disk.

An example of the objective lens is disclosed in Japanese Unexamined Patent Publication No. 09-145995. This objective lens has a lens surface that is radially sectioned into three or more loop zones. Every other loop zonal lens surfaces and the other every other loop zonal lens surfaces have a different refractive power. The every other loop zonal lens surfaces focus a laser beam on the information recording surface of the optical disk (DVD) having a thin transparent substrate (0.6 mm). The other every other zonal lens surfaces focus the laser beam having the same wavelength, for example, on the information recording surface of the optical disk (CD) having a thick transparent substrate (1.2 mm).

Another example disclosed in Japanese Unexamined Patent Publication No. 2000-81566 (U.S. Pat. No. 6,118,594). It discloses an optical disk apparatus that uses a laser beam having a short wavelength (635 nm or 650 nm) for a DVD with a thinner transparent substrate and uses a laser beam having a long wavelength (780 nm) for a CD with a thicker transparent substrate.

This optical disk apparatus has an objective lens used in common for these laser beams. The objective lens has a diffractive lens structure with a plurality of minute loop zonal steps thickly formed on one side of a refractive lens having a positive refractive power. The diffractive lens structure is designed so as to focus diffracted light of a laser beam having a short wavelength on the information recording surface of a DVD with a thinner transparent substrate, and focus diffracted light of a laser beam having a long wavelength on the information recording surface of a CD with a thicker transparent substrate. Further, it is designed so as to focus the diffracted light having the same diffractive order on the information recording surface. A laser beam with a short wavelength is used for DVD because the recording density of the DVD is higher than that of the CD, thus requiring a small beam spot. As well known, the diameter of an optical spot is proportional to a wavelength and inversely proportional to a numerical aperture (NA).

The above optical disk apparatus allows use of a common objective lens for both DVD and CD. It eliminates the need for replacing components such as an objective lens for each use of DVD and CD. This is effective in reducing costs and simplifying the structure.

Further, Blu-ray disk and High Definition DVD (HD DVD) are appeared as optical recording media in the next of CD and DVD, and optical pickup apparatus that are compatible with the three optical recording media are under development. The optical pickup apparatus is required to transmit the output of a laser light source to a disk of a recording medium at high efficiency. An important point of development to meet this requirement is an antireflection coating that is formed on an optical component such as an objective lens included in the apparatus.

The wavelength of light used in CD is approximately 790 nm, the wavelength of light used in DVD is approximately 655 nm, and the wavelength of light used in Blu-ray disk and HD DVD is approximately 405 nm. Thus, an objective lens placed in the optical pickup apparatus preferably has an antireflection coating that has the optical property that a reflectance is low in the vicinity of these three wavelengths. As an antireflection coating compatible with a plurality of wavelengths an antireflection coating that is compatible with the wavelengths used in DVD and Blu-ray disk is disclosed in Japanese Unexamined Patent Publication No. 2005-38581.

However, since the technique disclosed in Japanese Unexamined Patent Publication No. 09-145995 uses different loop zonal lens surface of the objective lens for DVD and CD, a large area remains ineffective for an incident laser beam, which extremely lowers light use efficiency.

Further, since the technique disclosed in Japanese Unexamined Patent Publication No. 2000-81566 uses the diffracted light by the diffractive lens structure, it is impossible that the diffractive efficiencies for different wavelengths reach 100% at the same time. This diffractive lens is designed so that the diffractive efficiency reaches 100% at an intermediate wavelength between the laser beam with a short wavelength (635 nm or 650 nm) used in DVD and the laser beam with a long wavelength (780 nm) used in CD, thereby making the diffractive efficiency well balanced for the laser beams in use.

Besides, this technique requires minute steps to be formed on the lens surface to create the diffraction lens structure, which is vulnerable to processing error. If the diffractive structure is not formed as designed, it causes a decrease in diffractive efficiently. When the diffractive efficiency decreases or it does not reach 100%, it means incapability of focusing entire incident light on the information recording surface of the transparent substrate in the optical disk, which results in light loss.

Further, Blu-ray format that uses a blue laser having a still shorter wavelength is proposed recently. Backward compatibility is also required for this case. In this case, a wavelength difference is larger than that between DVD and CD, and a difference in the refractive index of a lens is also large. Therefore, in the conventional techniques described above, it is even more difficult to obtain a suitable wavefront aberration in any medium.

The antireflection coating described in Japanese Unexamined Patent Publication No. 2005-38581 defines light transmittance by focusing on two kinds of wavelengths: the wavelength of light used in DVD and the wavelength of light used in Blu-ray disk. In this case, it is possible to form an antireflection coating with low reflectance in the wavelength region of the light used in DVD and Blu-ray disk. However, since the reflectance in the wavelength region of the light used in CD becomes higher than that before formation of the antireflection coating in this example disclosed therein, defect can occur when a CD is used as a recording medium.

For example, when writing information to CD by raising the magnification of a writing speed, use of an antireflection coating that has high reflectance in the wavelength region of the light used in CD is likely to cause a writing error. The magnification of the writing speed of a CD-R drive is increased to as high as 52, and writing at a high magnification is expected.

Further, the technique of Japanese Unexamined Patent Publication No. 2005-38581 expects the use of three or more layers of antireflection coating as well. Since a time to form an antireflection coating in a manufacturing process is proportional to the number of layers of the antireflection coating, the number of antireflection coating is preferably small. When forming a film with low reflectance in two or more kinds of wavelength regions, two layers of antireflection coating called V-coat having V-shaped spectral reflection characteristics can be used if the two kinds of expected wavelength regions are relatively close to each other. However, since the wavelength region of the light used in Blu-ray disk and the wavelength region of the light used in DVD and CD are not close to each other, it is impossible to achieve a purpose with the V-coat.

The antireflection coating is normally placed in the objective lens surface in the optical pickup apparatus. The objective lens is generally made of plastic material fir its high optical performance and low costs. Though the lens made of plastic material is weak against heat, the antireflection coating is formed by vapor deposition or sputtering, and a temperature on the formation surface thereby increases. Since a film formation time is proportional to the number of layers of the antireflection coating, it is preferred that the number of antireflection coating is smaller also in terms of shortening a formation time to reduce effects such as heat deformation on the formation surface.

SUMMARY OF THE INVENTION

The present invention has been accomplished to solve the above problems and an object of the present invention is thus to provide an optical pickup system, an optical head, and an optical disk apparatus that can focus an optical beam on an information recording surface of each of a plurality of kinds of optical recording media using different wavelength with possibly lowest wavefront aberration and at high light use efficiency. Particularly, an object of the invention is to provide an optical pickup system that is most suitable for three kinds of optical information recording media.

A second object of the invention is to provide a two-layer antireflection coating achieving low reflectance in three kinds of wavelength regions and an optical pickup component.

According to one aspect of the invention, there is provided an objective lens receiving light beams with different wavelengths $\lambda n$ ($n \geq 3$) for at least three kinds of optical recording media and having a positive power to focus each light beam on an information recording surface of a transparent substrate of each optical recording medium by refraction, wherein, if distances between points Pn ($n \geq 3$) where incident light beams or extension lines of incident light beams with wavelengths $\lambda n$ ($n \geq 3$) to the objective lens crosses an optical axis and a point Q where a lens surface of the objective lens located farther from each optical recording medium than another lens surface crosses the optical axis is expressed by Sn ($n \geq 3$), and a sign of the distance Sn is defined as positive if a position of the point Pn is located in a different side from the optical recording medium with respect to the point Q, and defined as negative if the position of the point Pn is located in the same side as the optical recording medium with respect to the point Q, an incident light beam satisfying following expressions enters the objective lens:

$$\lambda_1 < \lambda_3 \text{ and } (1/S_1) < (1/S_3) \qquad \text{Expression 1:}$$

$$\lambda_2 < \lambda_3 (\lambda_2 > \lambda_1) \text{ and } (1/S_2) < (1/S_3), \text{ and} \qquad \text{Expression 2:}$$

each light beam is focused on the information recording surface with RMS wavefront aberration of 0.035 $\lambda$RMS or below.

In this objective lens, at least one lens surface is preferably radially sectioned into a plurality of zones. It is also preferred that an optical path length of a light beam passing through each zone of the objective lens is different from an optical path length passing through another zone by substantially 2 m$\lambda$ (m is an integral number) for a light beam selected from light beams consisting of a first light beam, a second light beam, and a third light beam, and by substantially m$\lambda$ (m is an integral number) for a rest of the light beams. Particularly, the wavelength with a difference of substantially 2 m$\lambda$ is preferably $\lambda_1$. In a preferred embodiment, the wavelength $\lambda_1$ is approximately 405 nm, the wavelength $\lambda_2$ is approximately 655 nm, and the wavelength $\lambda_3$ is approximately 790 nm. Particularly, $S_1$ and $S_3$ preferably respectively satisfy expressions: $S_1 < 0$, $S_3 > 0$.

According to another aspect of the invention, there is provided an optical pickup system receiving a first light beam with a wavelength $\lambda_1$ corresponding to a first optical recording medium, a second light beam with a wavelength $\lambda_2$ corresponding to a second optical recording medium, and a third light beam with a wavelength $\lambda_3$ corresponding to a third optical recording medium, having an objective lens that focuses the first light beam on the first optical recording medium, the second light beam on the second optical recording medium, and the third light beam on the third optical recording medium, and being capable of reading information recorded in the first optical recording medium, the second optical recording medium, and the third optical recording medium, wherein the objective lens has a positive power to focus each light beam on an information recording surface of a transparent substrate of each optical recording medium by refraction, and if distances between points $P_1$, $P_2$, $P_3$ where incident light beams or extension lines of incident light beams with wavelengths $\lambda_1$, $\lambda_2$, $\lambda_3$ to the objective lens cross an optical axis and a point Q where a lens surface of the objective lens located farther from each optical recording medium than another lens surface crosses the optical axis are expressed as $S_1$, $S_2$, $S_3$, and signs of the distances $S_1$, $S_2$, $S_3$, are defined as positive if positions of the points $P_1$, $P_2$, $P_3$ are located in a different side from the optical recording medium with respect to the point Q, and defined as negative if the positions of the points $P_1$, $P_2$, $P_3$ are located in the same side as the optical recording medium with respect to the point Q, following expressions are satisfied:

$\lambda_1 < \lambda_3$ and $(1/S_1) < (1/S_3)$;  Expression 1:

$\lambda_2 < \lambda_3 (\lambda_2 > \lambda_1)$ and $(1/S_2) < (1/S_3)$.  Expression 2:

Each of the first, the second and the third light beams is preferably focused on each information recording surface with RMS wavefront aberration of 0.035 λRMS or below. It is preferred in the objective lens that at least one lens surface of the objective lens is radially sectioned into a plurality of zones, and an optical path length of a light beam passing through each zone is different from an optical path length passing through another zone by substantially mλ (m is an integral number) for a light beam selected from light beams consisting of the first light beam, the second light beam, and the third light beam, and by substantially 2 mλ (m is an integral number) for a rest of the light beams. The wavelength with a difference of substantially 2 mλ is preferably $\lambda_1$. Preferably, the wavelength $\lambda_1$ is approximately 405 nm, the wavelength $\lambda_2$ is approximately 655 nm, and the wavelength $\lambda_3$ is approximately 790 nm.

It is possible to constitute an optical head and an optical disk with the optical pickup system of this structure.

Preferably, each of the first light beam, the second light beam, and the third light beam is focused on each optical recording medium after passing through a wavelength selective filter having an outer area that allows the first light beam and the second light beam to pass through and shields the third light beam, and an inner area that allows the first light beam, the second light beam, and the third light beam to pass through.

Particularly, a numerical aperture of a light beam after passing through the objective lens is preferably largest in the first light beam, second-largest in the second light beam, and smallest in the third light beam.

$S_1$ and $S_3$ preferably respectively satisfy expressions: $S_1 < 0$, $S_3 > 0$. Further, magnification m1 of the first light beam and magnification m3 of the third light beam respectively preferably satisfy expressions of $0 < m1 \leq 1/10$ and $-1/10 < m3 \leq 0$, and more preferably $0 < m1 \leq 1/20$ and $-1/20 < m3 \leq 0$.

Preferably, the wavelength selective filter is formed in a surface of the objective lens. A refractive index of the wavelength selective filter is within a range of 0.9 to 1.1 with respect to a refractive index of the objective lens. The objective lens is made of material mainly composed of glass with a refractive index of 1.49 to 1.70.

According to another aspect of the invention, there is provided an objective lens receiving light beams with different wavelengths λn (n≧3) for at least three kinds of optical recording media and having a positive power to focus each light beam on an information recording surface of a transparent substrate of each optical recording medium by refraction, wherein, if distances between points Pn (n≧3) where incident light beams or extension lines of incident light beams with wavelengths λn (n≧3) to the objective lens crosses an optical axis and a point Q where a lens surface of the objective lens located farther from each optical recording medium than another lens surface crosses the optical axis is expressed by Sn (n≧3), and a sign of the distance Sn is defined as positive if a position of the point Pn is located in a different side from the optical recording medium with respect to the point Q, and defined as negative if the position of the point Pn is located in the same side as the optical recording medium with respect to the point Q, an incident light beam satisfying following expressions enters the objective lens:

$\lambda_1 < \lambda_3$ and $(1/S_1) < (1/S_3)$  Expression 1:

$\lambda_2 < \lambda_3 (\lambda_2 > \lambda_1)$ and $(1/S_2) < (1/S_3)$,  Expression 2:

each light beam is focused on the information recording surface with RMS wavefront aberration of 0.050 λRMS or below, and the objective lens is made of material mainly composed of glass with a refractive index of 1.49 to 1.70 and a thermal deformation temperature of 300° C. or below.

According to an aspect of the invention, there is provided an antireflection coating formed on a light transmitting surface of an optical component with a refractive index of $n_S$ used in an optical pickup device using at least two wavelengths of approximately 405 nm and 655 nm, the antireflection coating comprising two layers of a high refractive index layer with a refractive index of $n_H$ and an optical coating thickness of $n_H d_H$ formed on the optical component; and a low refractive index layer with a refractive index of $n_L$, and an optical coating thickness of $n_L d_L$ formed on the high refractive index layer, wherein a reflectance is lowest only in two regions of approximately 405 nm and 655 nm and highest in one region between the two lowest regions.

According to another aspect of the invention, there is provided an antireflection coating used in an optical pickup device using at least three wavelengths of approximately 405 nm, 655 nm, and 790 nm and formed on a light transmitting surface of an optical component with a refractive index of $n_S$, the antireflection coating comprising two layers of: a high refractive index layer with a refractive index of $n_H$ and an optical film thickness of $n_H d_H$ formed on the optical component; and a low refractive index layer with a refractive index of $n_L$, and an optical film thickness of $n_L d_L$ formed on the high refractive index layer, wherein a reflectance is lowest only in two regions of approximately 405 nm and 655 nm and highest in one region between the two lowest regions.

The antireflection coating preferably satisfies following conditions: $0.9 \leq n_H/A \leq 1.1$, $0.1 \leq n_H - n_S$, 225 nm$\leq n_H d_H \leq$275 nm, 100 nm$\leq n_L d_L \leq$150 nm, where $A = (1.21 * n_S + 0.84 * n_L * n_L)/2$. More preferably, it satisfies $n_H - n_S \leq 0.4$. In a preferred embodiment, material of the low refractive index layer is silicon oxide or fluoride. The antireflection coating may be formed on a surface of the optical component for an optical pickup. Preferably, the optical component is made of material mainly composed of glass with a refractive index $n_S$ of 1.49 to 1.70 and a thermal deformation temperature of 300° C. or below.

According to another aspect of the invention, there is provided a method of manufacturing an object lens for an optical pickup, used in an optical pickup device using at least three wavelengths of approximately 405 nm, 655 nm and 790 nm and having a surface where an antireflection coating composed of a high refractive index layer and a low refractive index layer is formed, the method comprising: selecting material for the high refractive index layer and the low refractive index layer that satisfy following conditions of $0.9 \leq n_H$/

$A \leq 1.1$, $0.1 \leq n_H - n_S$, where $A = (1.21*nS + 0.84*nL*nL)/2$, when $n_S$ is a refractive index of the objective lens, $n_H$ is a refractive index of the high refractive index layer, and $n_L$ is a refractive index of the low refractive index layer; forming the high refractive index layer with a refractive index of $n_H$ on the objective lens; and forming the low refractive index layer with a refractive index of $n_L$ on the high refractive index layer.

The step of selecting material preferably selects material so as to satisfy a condition of $n_H - n_S \leq 0.4$. Further, the step of selecting material preferably selects material so as to satisfy a condition of: $1.30 \leq n_L \leq 1.55$.

According to another aspect of the invention, there is provided an antireflection coating placed in a light transmitting surface of an optical component with a refractive index of $n_S$ used in an optical pickup device using at least three wavelengths of approximately 405 nm, 655 nm and 790 nm, comprising two layers of: a high refractive index layer with a refractive index of $n_H$ formed on the optical component; and a low refractive index layer with a refractive index of $n_L$ formed on the high refractive index layer, wherein the antireflection coating satisfies following conditions of $0.9 \leq n_H/A \leq 1.1$, $0.1 \leq n_H - n_S$, where $A = (1.21*n_S + 0.84*n_L*n_L)/2$.

According to another aspect of the invention, there is provided an objective lens wherein the objective lens is made of material mainly composed of glass with a refractive index of 1.49 to 1.70 and a thermal deformation temperature of 300° C. or below, and the objective lens has an antireflection coating composed of two layers of a high refractive index layer with a refractive index of $n_H$ and an optical film thickness of $n_H d_H$ and a low refractive index layer with a refractive index of $n_L$ and an optical film thickness of $n_L d_L$, and having lowest reflectance values only in two regions of approximately 405 nm and 655 nm and a highest reflectance value in one region between the two lowest reflectance values.

The present invention can provide an optical pickup system, an optical head, and an optical disk apparatus that can focus an optical beam on an information recording surface for each of a plurality of kinds of optical recording media having different use wavelengths with a passively lowest wavefront aberration and a high light use efficiency.

The present invention can provide an antireflection coating composed of two layers and having low reflectance in three kinds of wavelength regions and an optical pickup component.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIGS. 3A to 3C are pattern diagrams showing embodiments of an objective lens of the invention;

FIG. 7 is a table showing coefficients to calculate a distance $Z_A$;

FIG. 8 is a table showing coefficients to calculate a distance $Z_B$;

FIGS. 9A to 9C are tables showing the distance between and the arrangement of optical components of an optical system of a first embodiment;

FIG. 11 is a table showing a difference in substantial optical path length between zone 1 and zones 2 to 9;

FIG. 12 is a table showing the relationship between a distance $Z_A$ and an optical height h;

FIG. 13 is a table showing the relationship between a distance $Z_A$ and an optical height h;

FIG. 14 is a table showing the relationship between a distance $Z_A$ and an optical height h;

FIG. 15 is a table showing the relationship between a distance $Z_A$ and an optical height h;

FIG. 16 is a table showing the relationship between a distance $Z_A$ and an optical height h;

FIGS. 17A to 17C are tables showing the distance between and the arrangement of optical components of an optical system of a first embodiment;

FIG. 18 is a table showing a difference in substantial optical path length between zone 1 and zones 2 to 22;

FIGS. 20A to 20C are graphs showing a difference and ratio of the wavefront aberration of Blu-ray, DVD, and CD of a second embodiment;

FIG. 22 is a table showing the relationship between a distance $Z_A$ and an optical height h;

FIGS. 23A to 23C are tables showing the arrangement in an optical system of a third embodiment;

FIG. 26 is a table showing the amount of coma aberration generated in an objective lens of the third embodiment;

FIG. 27 is a table showing a difference in substantial optical path length between zone 1 and zones 2 to 7;

FIG. 29 is a table showing the relationship between a distance $Z_A$ and an optical height h;

FIG. 30 is a table showing the relationship between a distance $Z_A$ and an optical height h;

FIG. 31 is a table showing the relationship between a distance $Z_A$ and an optical height h;

FIG. 32 is a table showing the relationship between a distance $Z_A$ and an optical height h;

FIG. 33 is a table showing the relationship between a distance $Z_A$ and an optical height h;

FIG. 34 is a table showing the relationship between a distance $Z_A$ and an optical height h;

FIG. 35 is a table showing the relationship between a distance $Z_A$ and an optical height h;

FIGS. 36A to 36C are tables showing the arrangement in an optical system of the third embodiment;

FIG. 37 is a table showing a difference in substantial optical path length between zone 1 and zones 2 to 31;

FIGS. 44A to 44F are tables showing simulation results in the sixth embodiment;

FIGS. 48A to 48C are tables showing design examples of an AR coat;

FIGS. 58A and 58B are tables showing analysis results in the fifth embodiment;

DESCRIPTION OF THE PREFERRED EMBODIMENTS

A lens according to this invention is a multiwavelength lens using a plurality of kinds of monochromatic light. It is a general-purpose multiwavelength lens that can be used for a recording and reproducing apparatus compatible with different kinds of optical recording media such as CD including CD-R, DVD, Blu-ray disk, and Advanced Optical Disk (AOD). A multiwavelength optical system, optical head, and optical disk apparatus according to this invention use this multiwavelength optical lens.

The present invention is schematically described hereinafter.

It is assumed that for a first optical disk using a transparent substrate having a thickness $t_1$, the aberration of an objective lens placed in an optical disk apparatus to be used is corrected appropriately, and a laser beam with a wavelength $\lambda_1$ is appropriately focused an information recording surface of the substrate. In this optical disk apparatus, a laser beam with a wavelength $\lambda_2$ which is different from the wavelength $\lambda_1$ is now to be focused on a second optical disk using a transparent substrate having a thickness $t_2$.

In this case, the laser beam wavelength $\lambda_1$ and $\lambda_2$ and the transparent substrate thickness $t_1$ and $t_1$ respectively differ from each other, or, even if the thickness $t_1$ and $t_1$ are the same, the wavelength $\lambda_1$ and $\lambda_2$ differ from each other. Thus, spherical aberration due to a difference in transparent substrate thickness and chromatic aberration due to a difference in refractive index of the objective lens because of a difference in laser beam wavelength both occur, or only the chromatic aberration occurs, making it unable to focus the laser beam appropriately on the information recording surface.

The present invention sets the aspherical surface shape of an objective lens and the divergence of an incident light beam to an objective lens so that no or little aberration occurs in an optical path length at a given optical height for all different kinds of disks with difference wavelengths. It is thereby possible to reduce is the aberration for all the optical disks. Further, since this invention achieves it only with refracted light, not using diffraction, no light loss of diffraction efficiency occurs.

As detailed later, a lens of an embodiment of the invention has a lens surface that is sectioned into a plurality of aspherical surfaces.

Figure 1:
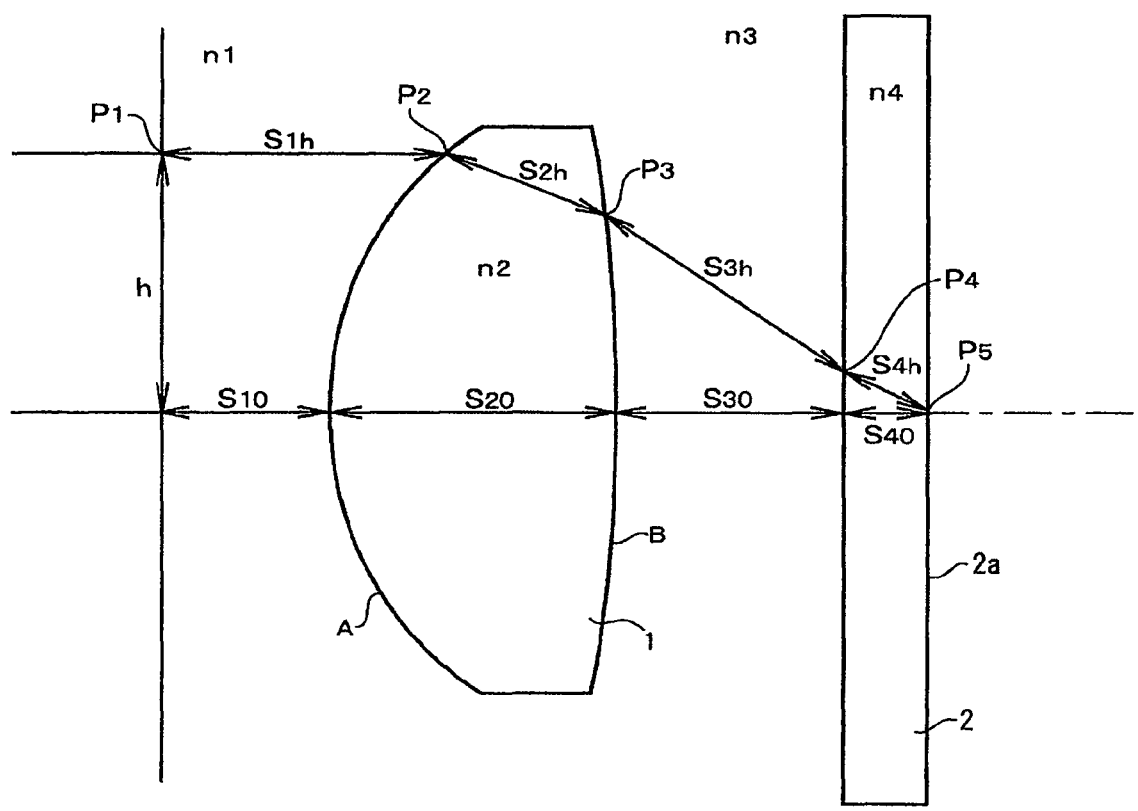
FIG. 1 is a pattern diagram to describe an optical path length in an optical system composed of an objective lens and a transparent substrate of an optical disk.

Referring first to FIG. 1, a case of focusing a laser beam on an information recording surface 2a of a substrate 2 by using an objective lens 1 is described hereinafter below. A surface A of the objective lens 1 is a light incident side, and a surface B is a light exit side. The information recording surface 2a is on the reverse of the side of the substrate 2 facing the objective lens 1.

FIG. 1 schematically shows an optical path of the objective lens 1. In FIG. 3, a laser beam entering the objective lens 1 is parallel light. The optical system shown in FIG. 1 is thus a so-called infinite optical system. FIG. 1 schematically shows the optical path of a light beam that passes through a point $P_1$ which is a vertical distance (optical height) h apart from an optical axis OA of the objective lens 1 to reach a point (focal point) $P_5$ where it crosses the optical axis OA.

An incident point to the objective lens 1 on the optical path is represented by $P_2$, an exit point from the objective lens 1 is by $P_3$, and an incident point to the transparent substrate 2 is by $P_4$. A spatial distance and the refractive index between the points are represented as follows:

Point $P_1$ to Incident point $P_2$: Distance=$S_{1h}$, Refractive index=$n_1$

Incident point $P_2$ to Exit point $P_3$: Distance=$S_{2h}$, Refractive index=$n_2$ Exit point $P_3$ to Incident point $P_4$: Distance=$S_{3h}$, Refractive index=$n_3$ Incident point $P_4$ to Focal point $P_5$: Distance=$S_{4h}$, Refractive index=$n_4$.

The optical path length $L_h$ from the point $P_1$ to the focal point $P_5$ is expressed by the following expression:

$$L_h = n_1 * S_{1h} + n_2 * S_{2h} + n_3 * S_{3h} + n_4 * S_{4h} \qquad \text{Expression 3:}$$

The optical path length $L_h$ on the optical axis OA is when h=0 in Expression 3.

Expression 3 is applicable to any optical height h. When aberration is corrected, the focal point $P_5$ for each optical height h is on the information recording surface $2a$ within allowable ranges. Specifically, the present invention uses a laser beam having a different wavelength for each of a plurality of substrates having different thickness and therefore spherical aberration and chromatic aberration cancel each other out so that the focal point $P_5$ for a given optical height h is on the information recording surface $2a$ within each of the allowable ranges.

Though the case where the incident light to the objective lens 1 is parallel light, which is an infinite system, is described above, the incident light may be divergent light, which is a finite system. It is also possible to select the infinite or finite systems for use for different optical recording media and different wavelengths. Further, it is also possible to use the same finite system for different optical recording media while changing the divergence of an incident light beam. The incident light to the objective lens may be convergent light.

For example, a monochromatic light $\lambda_1$ of 405 nm wavelength for HDDVD (AOD) and a monochromatic light $\lambda_2$ of 655 nm wavelength for DVD are used. In this case, an area of a lens surface commonly used for the both wavelengths can be sectioned into a plurality of aspherical surface sections. In this technique, the optical path length of one aspherical section is different from that of another aspherical section by integral multiple of the wavelength $\lambda_i$ of each monochromatic light. Further, a difference between a maximum value and a minimum value of wavefront aberration of each monochromatic light in each aspherical section is $\Delta V_d(\lambda_1)$ and $\Delta V_d(\lambda_2)$ where d is an integral number of 1, 2 . . . , meaning each aspherical section.

In these conditions, if the ratio of the difference between the maximum value and the minimum value of the wavefront aberration of each monochromatic light is between 0.4 and 2.5, preferably between 0.5 and 2.0, in any aspherical section, Root Mean Square (RMS) wavefront aberration of the whole lens can fall within an allowable range for all the wavelengths. Further, the RMS wavefront aberration value in CD can be improved if the incident light beam is divergent light or incident light with higher divergence than in HDDVD and DVD. The spherical aberration due to a thick substrate and the chromatic aberration due to highly divergent incident light thereby cancel out each other, thereby correcting the spherical aberration that occurs in CD.

If the optical length when the optical height h=0 is $L_0$, and the optical path length at each optical height is $L_h$, the wavefront aberration $V_h$ is expressed by the following expression:

$$V_h = (L_h - L_0)/\lambda_i \qquad \text{Expression 4:}$$

Figure 2A:
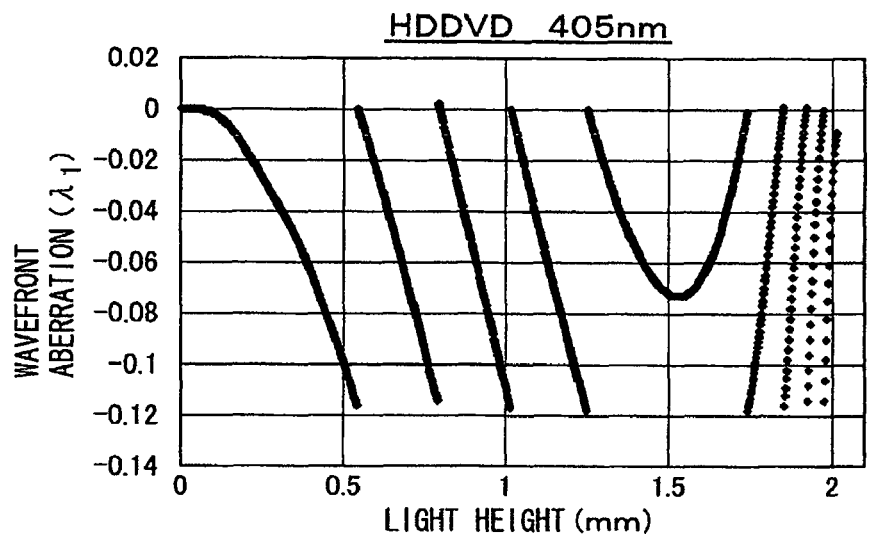
FIGS. 2A to 2C are graphs showing the wavefront aberration of HDDVD, DVD, and CD in a first embodiment.
Figure 2B:
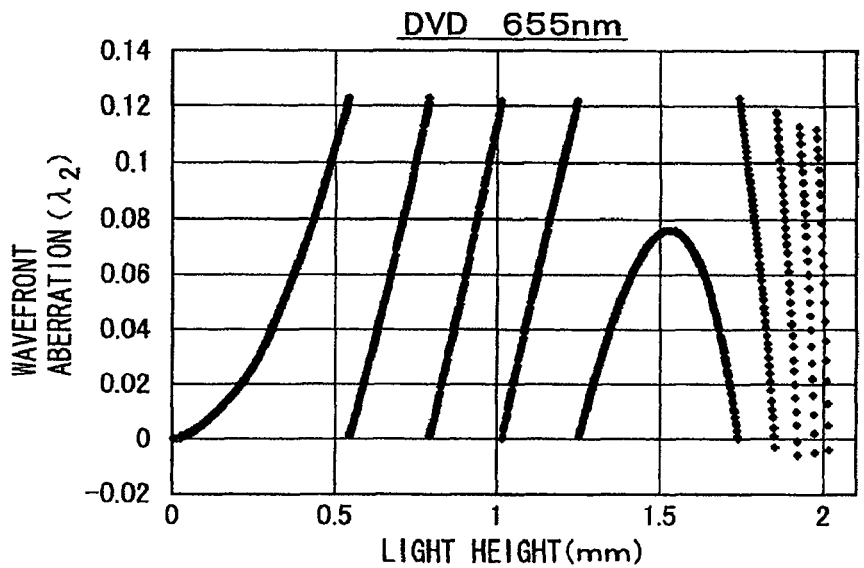
Figure 2C:
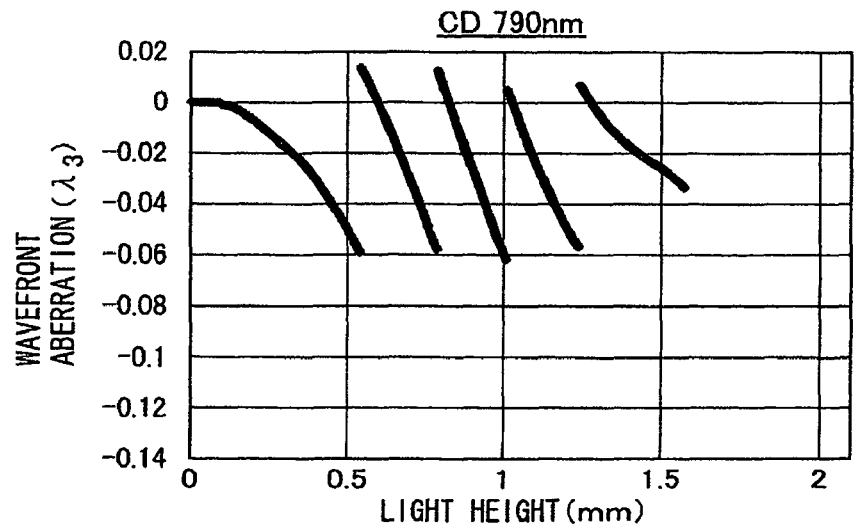

FIGS. 2A to 2C show the wavefront aberrations in HDDVD, DVD, and CD. In FIG. 2, the horizontal axis indicates optical height and the vertical axis indicates wavelength aberration. FIG. 2A shows the wavefront aberration in each aspherical section for HDDVD, FIG. 2B shows the wavefront aberration in each aspherical section for DVD, and FIG. 2C shows the wavefront aberration in each aspherical section for CD, which are calculated by the above expression.

For example, a difference between the maximum and minimum values of the wavefront aberration in a first aspherical section is defined as $\neq V_d(\lambda_1)$ and $\Delta V_d(\lambda_2)$. As in the embodiments described later, the ratio of a difference between the maximum and minimum values of the wavefront aberration for each wavelength falls within the range of 0.4 to 2.5 in any aspherical section in this invention. Thus, each aspherical section has a uniform distribution of wavefront aberration for any wavelength. This is different from conventional techniques that design a lens surface based on one wavelength and corrects wavefront aberration in the other wavelength using phase lag.

In the multiwavelength lens of the present invention, a difference between the maximum and minimum values of the wavefront aberration of each wavelength can be 0.14 $\lambda_i$ or lower, preferably 0.12 $\lambda_i$ or lower, and more preferably 0.10 $\lambda_i$ or lower. For example, when a difference between the maximum and minimum values is 0.14 $\lambda_i$ or lower, if the wavelength is 790 nm, it is 110.6 nm or lower, if the wavelength is 655 nm, it is 91.7 nm or lower, and if the wavelength is 405 nm, it is 56.7 nm. The multiwavelength lens of this invention can thereby have suitable optical characteristics in each wavelength.

Further, if this invention is applied to a dual wavelength optical system, use of a multiwavelength lens in which the wavefront aberration for each wavelength is substantially symmetrical produces a suitable balance between the two wavelengths, thereby further reducing the RMS wavefront aberration.

As a result, the RMS wavefront aberration is $0.03152\lambda_1$RMS in HDDVD, $0.023237\lambda_2$RMS in DVD, and thus the RMS wavefront aberration is substantially equal in HDDVD and DVD. The RMS wavefront aberration in CD is $0.01764\lambda_3$RMS, which is smaller than that of HDDVD and DVD.

For the recording and reproducing the CD (790 nm), it is possible to change the divergence of the incident light to the objective lens or a so-called object distance for the objective lens in a geometrical-optical sense. This is effective for correcting spherical aberration since the degree of spherical aberration changes by the divergence of the incident light. This is described in the embodiments below.

Further, in the embodiments of the invention described later, the incident light having the wavelengths of 405 nm and 655 nm are infinite and the incident light having the wavelength of 790 nm is finite. Specifically, the divergence of the incident light with 405 nm and 655 nm wavelengths are the same and the divergence of the incident light with 790 nm wavelength is different. Selection of a wavelength whose divergence is to be changed may be made each time according to use wavelength and substrate thickness so as to reduce aberration. Further, all the wavelengths may be incident as divergent light or as convergent light.

The embodiments of the invention described later allow formation of a suitable optical spot on an information recording surface for any optical disk having a substrate of a different thickness. This is applicable also when the thickness of a disk substrate is not different, that is, when the thickness is the same and the wavelength is different, by setting focal point $P_5$ shown in FIG. 1 within each allowable range. Further, this invention is applicable not only to optical recording media but also to optical communication and so on where different wavelengths of laser beams pass through the same lens or optical system.

Preferred embodiment of the present invention is described hereinafter in detail.

First Embodiment

A first embodiment of the present invention is described below with reference to the drawings. It takes the case of using three kinds of optical disks, HDDVD ($\lambda_1$=405 nm), DVD ($\lambda_2$=655 nm), and CD ($\lambda_3$=790 nm), as an example. Though the lens used in the first embodiment has a refractive index that is equivalent to plastic resin, it may have a refractive index of a glass if it is desired to use a glass as a lens material.

FIGS. 3A to 3B are pattern diagrams showing examples of the mechanism of an objective lens of this invention. FIG. 3A shows the case of HDDVD, FIG. 3B shows the case of DVD, and FIG. 3C shows the case of CD. FIGS. 3A and 3C illustrates an objective lens 1 of the first embodiment, a transparent substrate 2 of HDDVD, a transparent substrate 3 of DVD, a transparent substrate 4 of CD, an aperture 5, and a wavelength selective aperture 6.

In FIG. 3A, the optical lens 1 is placed in an optical head of an optical disk apparatus, which are not shown. HDDVD is installed in the optical disk apparatus. The objective lens 1 focuses a laser beam that is incident as parallel light for recording or reproducing data. The HDDVD substrate 2 has the thickness $t_1$ of 0.6 mm. The laser beam used has a wavelength $\lambda_1$ of 405 nm, as a luminous flux with a numerical aperture (NA) of 0.650. Under these conditions, the laser beam is focused on the information recording surface 2a of the HDDVD substrate 2, which is on the reverse of the side facing the objective lens 1.

FIG. 3B shows a case where DVD is installed in the same optical disk apparatus, also not shown, and the same objective lens 1 is used to record and reproduce data. The DVD substrate 3 has the thickness $t_2$ of 0.6 mm. The laser beam used has a wavelength $\lambda_2$ of 655 nm, as a luminous flux with a numerical aperture (NA) of 0.628. In the above two cases using HDDVD and DVD, though the diameter of the aperture 5 is the same, NA is different. This is because the refractive index of the objective lens 1 differs since the wavelengths are different, which makes focal distances to differ from each other.

FIG. 3C shows a case where CD is installed in the same optical disk apparatus, also not shown, and the same objective lens 1 is used to record and reproduce data. The CD substrate 4 has the thickness $t_3$ of 1.2 mm. The laser beam used has a wavelength $\lambda_3$ of 790 nm, which is incident to the objective lens 1 as divergent light, used as a luminous flux with a numerical aperture (NA) of approximately 0.470.

Figure 4A:
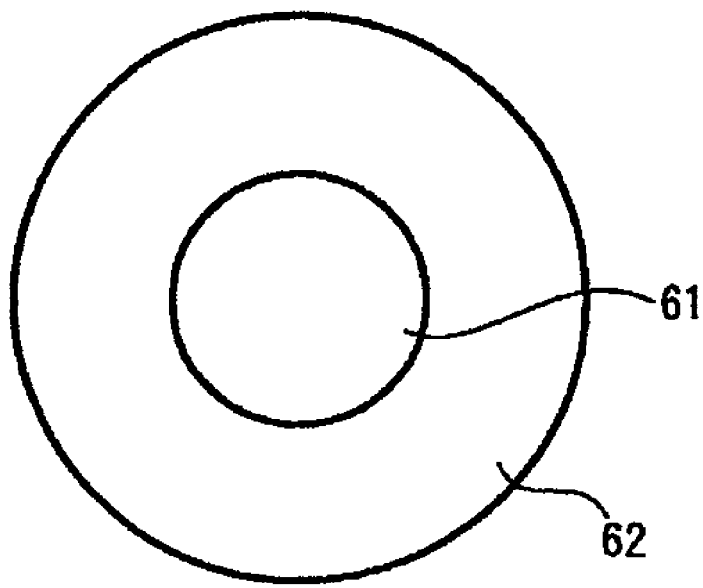
FIGS. 4A and 4B are pattern diagrams showing an example of the structure of a wavelength selective filter.
Figure 4B:
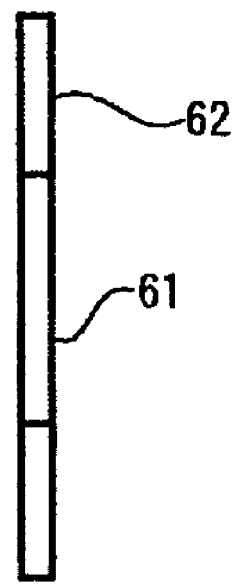

The wavelength selective filter 6 shown in FIGS. 3A to 3C is sectioned into an inner entire light transmitting area and an outer CD (790 nm) light shielding area, as shown in FIG. 4. It is formed by depositing a dichroic coating that reflects the light having 750 nm or higher wavelength after forming a mask in the inner part.

Figure 5:
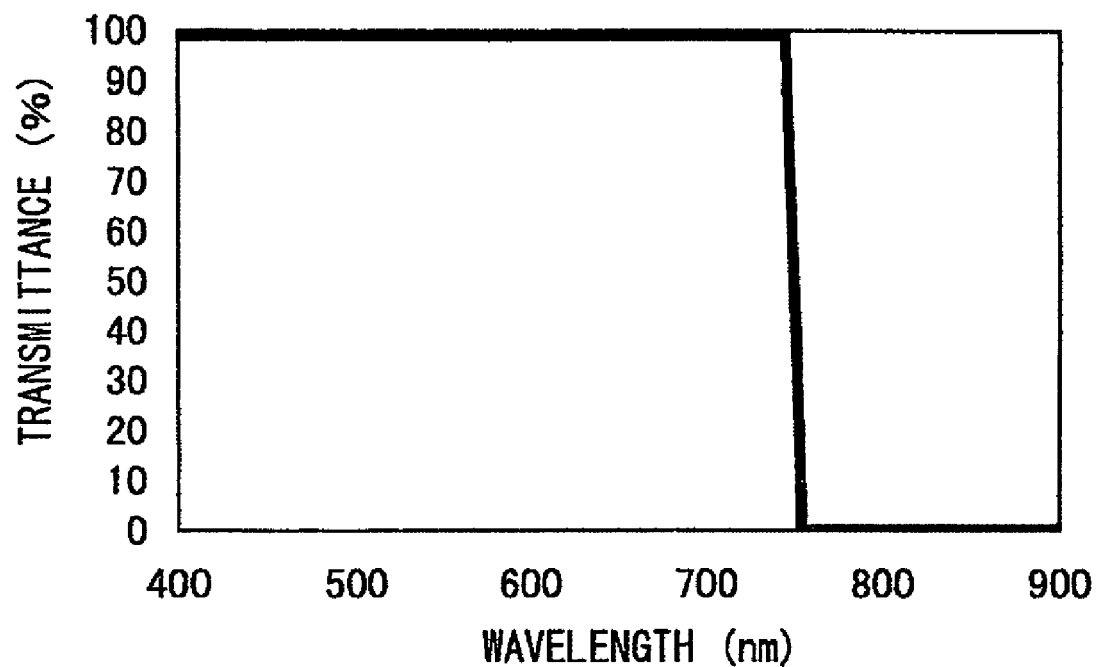
FIG. 5 is a graph showing the spectral transmittance characteristics of a CD light shielding area or a wavelength selective filter.

Specifically, a dichroic coating having the spectral transmittance characteristics as shown in FIG. 5, for example, is deposited on the CD light shielding area. It is thereby possible to obtain the wavelength selective filter 6 having the spectral transmittance characteristics of FIG. 5 in the outer CD light shielding area. This achieves a purpose of shielding CD light only while letting DVD and HDDVD light pass through in the outer area. As a result, NA of HDDVD is 0.650, NA of DVD is 0.628, and NA of CD is 0.470.

Ideal spectral transmittance characteristics are that transmittance is 100% for a wavelength of 750 nm or lower and it is 0% for a wavelength of 750 nm or higher. The spectral transmittance characteristics shown in FIG. 5 are close the ideal state, with 99% for the former and 0.2% for the latter. If it is impossible for actual filter characteristics to achieve these characteristics, the transmittance for a wavelength of 700 nm or lower may be 90% or higher and the transmittance for a wavelength of 770 nm or higher may be 5% or lower, for example. Though adverse effects such as decrease in the signal level of the optical disk apparatus or deterioration of CD jitter characteristics occur in this case also, they are not so significant to make it unusable, and thus it is available.

The first embodiment designs the lens surface shape of the objective lens 1 in such a way that the optical path length $L_h$ expressed by Expression 3 for a given optical height h falls is a value that reduces aberration to fall within an allowable range in all the case of HDD, DVD, and CD. It is thereby possible to reduce aberration in HDDVD, DVD, and CD and produce an appropriate optical spot on the information recording surface of each medium.

In the first embodiment, the light incident surface A is radially sectioned from the optical axis into a plurality of zones, and the surface shape of each zone is designed so as to reduce aberration to an allowable range for HDDVD, DVD and CD.

The surface shape of the light incident surface A in the first embodiment is described hereinafter with reference to FIG. 6. A distance between the points a and b in the j-th zone from the optical axis OA in the direction of the optical height h (the radial direction) on the light incident surface A is expressed by the following function $Z_{Aj}$:

$$Z_{Aj} = B + \frac{Ch^2}{1 + \sqrt{1 - (K+1)C^2 \cdot h^2}} + A_4 \cdot h^4 + A_6 \cdot h^6 + A_8 \cdot h^8 + A_{10} \cdot h^{10} + A_{12} \cdot h^{12} + A_{14} \cdot h^{14} + A_{16} \cdot h^{16} \qquad \text{Expression 5}$$

The optical height h in Expression 5 is that in the j-th zone.

Figure 6:
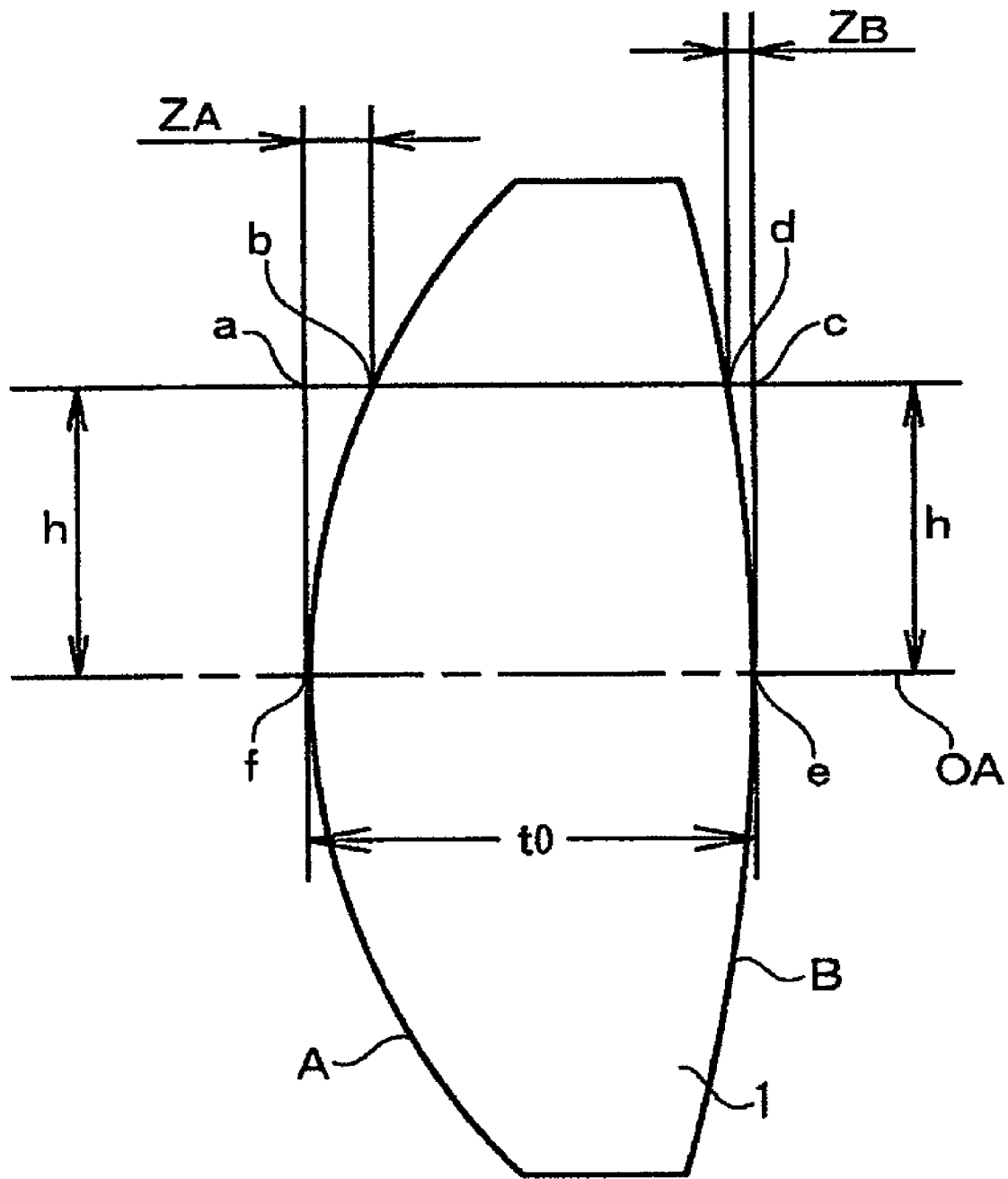
FIG. 6 is a pattern diagram showing a specific example of a lens surface shape of an embodiment of the invention.

In FIG. 6, on the light exit surface B of the objective lens 1, the point at the optical height h is c, the point on the light exit surface B located apart from the point c in the direction parallel to the optical axis OA is d. The surface shape of the light exit surface B is designed to be expressed with a distance $Z_B$ between the points a and b for a given optical height h by the following expression:

$$Z_{Bj} = \frac{Ch^2}{1 + \sqrt{1 - (K+1)C^2 \cdot h^2}} + A_4 \cdot h^4 + A_6 \cdot h^6 + A_8 \cdot h^8 + A_{10} \cdot h^{10} \qquad \text{Expression 6}$$

Then, for each case of HDD, DVD, and CD, the range of h and constants B, C, K, $A_4$, $A_6$, $A_8$, $A_{10}$, $A_{12}$, $A_{14}$, $A_{16}$ are calculated for each zone in Expression 5 to reduce aberration to an allowable range. FIG. 7 shows the calculation results Further, the values of the constants in Expression 6 are also calculated. FIG. 8 shows the calculation results.

FIGS. 9A to 9C show the distance between optical components and their arrangement based on the objective lens in an optical system equivalent to that of FIG. 3 for HDDVD, DVD, and CD, respectively.

A distance between surface apexes f and e on the optical axis of the objective lens 1, which is a center thickness to, is 1.94 mm. A refractive index n for a wavelength $\lambda_1$=405 nm (Blu-ray disk) is 1.54972, a refractive index n for a wavelength $\lambda_2$=655 nm (DVD) is 1.53, and a refractive index n for a wavelength $\lambda_3$=790 nm (CD) is 1.5263653.

The transparent substrate of Blu-ray disk (wavelength $\lambda_1$=405 nm) has a thickness of 0.6 mm and a refractive index of 1.6235. The transparent substrate of DVD (wavelength $\lambda_2$=655 nm) has a thickness of 0.6 mm and a refractive index of 1.58. The transparent substrate of CD (wavelength $\lambda_3$=790 nm) has a thickness of 1.2 mm and a refractive index of 1.57163.

In HDDVD with a wavelength of 405 nm, NA is 0.650 and a focal length is 3.1015 mm. In DVD with a wavelength of 655 nm, NA is 0.628 and a focal length is 3.2116 mm. The effective diameter of incident parallel light is φ4.032 in both HDDVD and DVD. Further, the entire lens surface in the side A is a HDDVD/DVD common use area. In CD with a wavelength of 790 nm, NA is 0.470 and a focal length is 3.2327 mm.

The tables of FIGS. 9A to 9C show an aperture, objective lens, disk, and an object surface for the objective lens. As shown in FIGS. 9A to 9C, in HDDVD and DVD, for example, the incident light to the objective lens is parallel light, that is, a distance between the object surface for the objective lens and the objective lens is ∞. An actual optical system places a HDDVD laser or a DVD laser in the focal position of a collimator lens and inputs the output light from the collimator lens to the objective lens as parallel light.

In CD, a distance from the object surface to the objective lens is 49.4 mm, and divergent light is input to the objective lens. In the case of CD as well, a distance from an emission point of a CD laser to a surface apex of the objective lens in the light source side may be 49.4 mm in an actual optical system. In this case, however, an optical pickup becomes large.

It is preferred in this case to place the collimator lens between the CD laser light source and the objective lens, and places the emission point of the CD laser in the position closer to the collimator lens than the focal position of the collimator lens. In this arrangement, the light emitted from the CD laser and having passed through the collimator lens becomes divergent light and enters the objective lens. The collimator lens and the CD laser are preferably arranged so that the incident light to the objective lens becomes the same as the light emitted from a distance of 49.4 mm without collimator lens.

FIGS. 9A to 9C also show the effective diameter of the aperture surface. The wavelength selective filter as shown in FIG. 4 is used. Thus, in FIG. 4, the outer diameter of the entire light transmitting area which is equal to the inner diameter of the CD light shielding area is φ3.15, and the outer diameter of the CD light shielding area is φ4.032 or larger, which is greater than the effective diameter of HDDVD and DVD. Specifically, the effective diameter of the aperture surface is set to φ4.8, for example, considering the size required for holding by a glass frame.

The thickness of the wavelength selective filter is determined so that the incident light enters at 0 degree. The incident light can enters obliquely due to positions of components such as a laser and mirrors, accuracy variation, displacement of an emission point of a two-wavelength laser or a three-wavelength laser in the direction perpendicular to the optical axis, and so on. For this reason, the thickness of the wavelength selective filter is preferably small, and it is 0.5 mm in the first embodiment.

In the first embodiment shown in FIGS. 9A to 9C, the relationship of $S_1$, $S_2$, and $S_3$ expressed by Expressions 1 and 2 is as follows:

| | |
|---|---|
| HDDVD: | $\lambda_1 = 405$ nm, $S_1 = \infty$, |
| DVD: | $\lambda_2 = 655$ nm, $S_2 = \infty$, |
| CD: | $\lambda_3 = 790$ nm, $S_3 = 49.4$ mm |

Therefore, $$405 \text{ nm}(\lambda_1) < 790 \text{ nm}(\lambda_3).$$

Further, $$(1/S_1) = (1/\infty) = 0,$$

$$(1/S_3) = (1/49.4) = 0.0202429$$

Therefore, $$0 < 0.0202429; (1/S_1) < (1/S_3)$$

Hence, in HDDVD and CD, $\lambda_1 < \lambda_3$ and $(1/S_1) < (1/S_3)$ are both satisfied.

Further, since $$655 \text{ nm}(\lambda_2) < 790 \text{ nm}(\lambda_3).$$

and $$(1/S_2) = (1/\infty) = 0,$$

$$(1/S_3) = (1/49.4) = 0.0202429.$$

Therefore, $$0 < 0.0202429; (1/S_2) < (1/S_3)$$

Hence, in DVD and CD, $\lambda_2 < \lambda_3$ and $(1/S_2) < (1/S_3)$ are both satisfied.

The refractive index of this objective lens is close to the refractive index of a plastic resin. Thus, when using polyolefin resin or acrylic resin, the objective lens is designed by using the refractive index of the resin to determine each aspherical surface shape and a lens center thickness. Particularly, since the polyolefin resin does not substantially absorb water under the high-humidity environment as well, it is advantageous in that the refractive index does not change. On the other hand, the acrylic resin is advantageous in that a transmittance of Blu-ray is high and a transmittance in the vicinity of Blu-ray (405 nm) does not substantially change over time.

The objective lens is preferably made of material with low birefringence since it produces a suitable value of wavefront aberration when forming a lens by injection molding, cast molding, or the like. Further, use of acrylic material has a problem that water absorption changes under the high-humidity environment. Therefore, when using the acrylic material, it is preferred to perform humidity conditioning beforehand so as to make it absorb some water since it is effective when the objective lens is used under the environment of almost absolute dry or high-humidity. In this case, the lens is designed by using the refractive index of the resin after absorbing some water by the humidity conditioning.

Substitution of values into the coefficients C, K, $A_4$, $A_6$, $A_8$, and $A_{10}$ in Expression 6 gives a value of the distance $Z_B$ for a given optical height h ($\neq 0$) as negative. This means that the point d on the light exit side B is located closer to the light incident surface side (in the left side of FIG. 6) compared with the point c, which is, the surface apex e of the light output side B through which the optical axis OA passes. On the contrary, if the distance $Z_B$ is a positive value, it means that the point d is located at the right side of the point e.

(i) An allowable value for the aberration to evaluate the aberration is an RMS wavefront aberration of 0.035λ and preferably 0.033λ for HDDVD (wavelength $\lambda_1$=405 nm), DVD (wavelength $\lambda_2$=655 nm) and CD (wavelength $\lambda_3$=790 nm) when an incident laser beam to the objective lens 1 has an incident angle of 0°, that is, when it is parallel light parallel with the optical axis OA. In the first embodiment, the light exit surface B and the light incident surface A are designed to have the above surface shapes in order that the wavefront aberrations for HDDVD, DVD, and CD do not exceed this allowable value.

Though the first embodiment describes the case of using three kinds of different wavelengths $\lambda_1$, $\lambda_2$, and $\lambda_3$, this is the same when using the n (n is an integral number of 2 and above) number of kinds of different wavelengths $\lambda_i$ (i=1, 2, ..., n).

(ii) In the case of using the n number of kinds of wavelengths $\lambda_i$, if the RMS wavefront aberrations when the incident laser beams with the wavelengths $\lambda_i$ have the incident angle of 0° is $W_i.\lambda_i$, the aberration satisfies the following expression:

Expression 7:
$$\sqrt{\frac{\sum W_i^2}{i}} \leq W_0$$

The allowable value $W_0$ is 0.035 or below and preferably 0.033 or below.

In Expression 7, the wavelength of the i-th light beam is $\lambda_i$ (i=1, 2, ...), a sum of square of the RMS wavefront aberration for all the wavelengths is $\Sigma W_i^2$, and the RMS wavefront aberration of a light beam having wavelength $\lambda_i$ is $W_i.\lambda_i$.

(iii) In a case of using laser beams having the n number of kinds of different wavelengths $\lambda_i$, of the maximum RMS wavefront aberration is $W_{max}$ and the minimum RMS wavefront aberration is $W_{min}$, the following expression are satisfied:

$$1 \leq W_{max}/W_{min} < W_{th}$$

The allowable value $W_{th}$ in this case is 1.8, preferably 1.6, and more preferably 1.4. In the case of the first embodiment, one of the RMS wavefront aberrations $W_1$ for DVD and the RMS wavefront aberration $W_2$ for CD is the maximum RMS wavefront aberration $W_{max}$, and the other is the minimum RMS wavefront aberration $W_{min}$.

FIGS. 2A to 2C are graphs showing the wavefront aberration of the first embodiment. The RMS wavefront aberration in HDDVD is 0.03152 $\lambda$RMS, the RMS wavefront aberration in DVD is 0.03237 $\lambda$RMS, and the RMS wavefront aberration in CD is 0.01764 $\lambda$RMS. The RMS wavefront aberration of 0.035 $\lambda$RMS or below, and further 0.033 $\lambda$RMS or below are achieved in HDDVD, DVD, and CD.

The value of Expression 7 is:

$$\sqrt{\frac{\sum W_i^2}{i}} = \sqrt{\frac{0.03152^2 + 0.03237^2 + 0.01764^2}{3}}$$
$$= 0.028003$$

It is 0.0 035 $\lambda$RMS or below, and also 0.033 $\lambda$RMS or below.

Figure 10A:
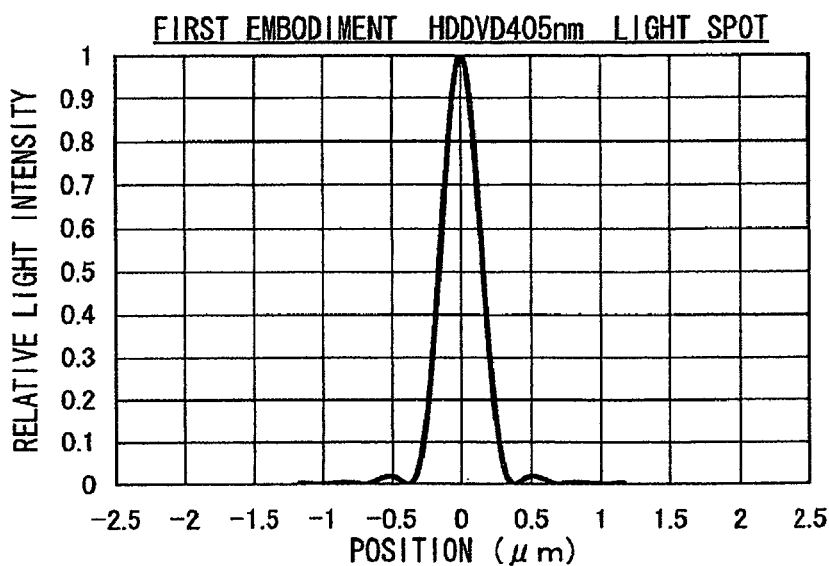
FIGS. 10A to 10C are graphs showing calculation results of an optical spot for different kinds of optical disks in the first embodiment.
Figure 10B:
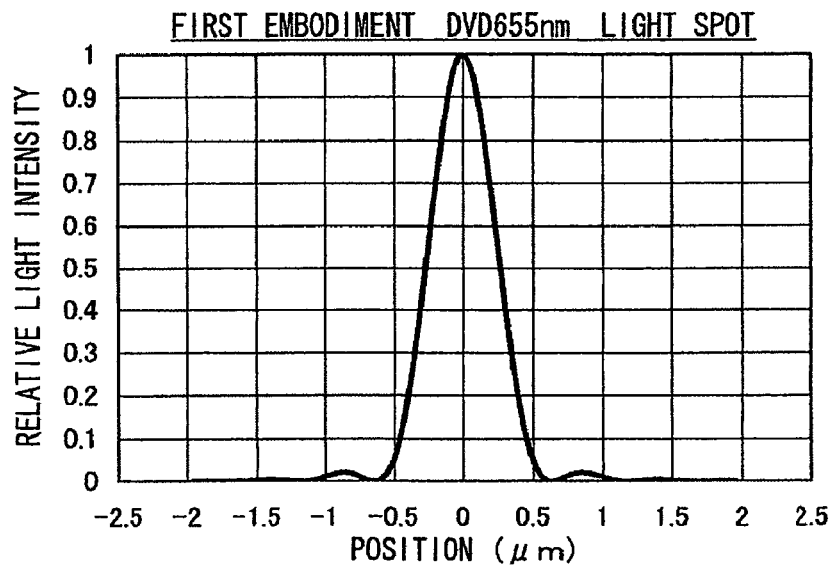
Figure 10C:
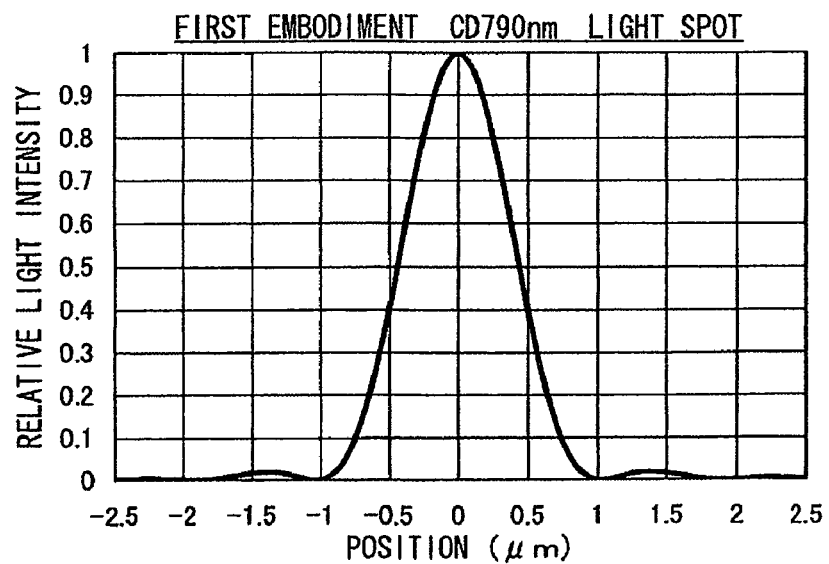

FIGS. 10A to 10C are graphs showing the optical spot of the first embodiment. The diameter of the optical spot having a relative luminous intensity of 1/e² (=0.135) is 0.5149 μm for Blu-ray with 405 nm, 0.8606 μm for DVD with 655 nm, and 1.3979 μm for CD with 790 nm.

The optical spot diameter is approximately 0.82*wavelength/NA in an ideal optical system having no aberration. In an actual lens, the optical spot diameter is generally preferably smaller. Since other adverse effects can occur if the optical spot diameter is too small, it is preferred that the optical spot is 0.9 to 1.03 times the value of 0.82*wavelength/NA. Further, if the optical spot diameter is too small, it causes an adverse effect such as Super-resolution. If the optical spot diameter is too large, it causes deteriorated focusing characteristics of the optical spot, affecting jitter characteristics or the like.

Evaluation of the first embodiment is as follows.

In HDDVD (wavelength 405 nm; NA 0.650), 0.82*wavelength/NA=0.5109 μm. Since an actual optical spot diameter is 0.5149 μm, it is 1.0078 times the value of 0.82*wavelength/NA, thus being within a preferable range of 0.9 to 1.02.

In DVD (wavelength 655 nm; NA 0.628), 0.82*wavelength/NA=0.8553 μm. Since an actual optical spot diameter is 0.8606 μm, it is 1.0062 times the value of 0.82*wavelength/NA, thus being within a preferable range of 0.9 to 1.02.

In CD (wavelength 790 nm; NA 0.470), 0.82*wavelength/NA=1.3783 μm. Since an actual optical spot diameter is 1.3979 μm, it is 1.0142 times the value of 0.82*wavelength/NA, thus being within a preferable range of 0.9 to 1.02.

Further, this lens is designed so that the wavefront aberration appears on the positive (+) side in the wavelength of 655 nm (DVD), and on the negative (−) side in the wavelength of 405 nm (HDDVD). The wavefront aberration is thus substantially symmetrical.

FIG. 11 shows a difference in substantial optical path length between zone 1 and zones 2 to 9. The difference in optical path length between zone 1 and zones 2 to 8 is m$\lambda$ (m is an integral number) for the wavelength of 655 nm (DVD), DVD and the wavelength of 790 nm (CD), and it is 2 m$\lambda$ (m is an integral number) for the wavelength of 405 nm (HDDVD).

As described in the foregoing, the first embodiment allows the aberration to fall within the above allowable range. This is achieved by designing the lens surface shape and setting the divergence of incident light to the objective lens that make the aberration within the allowable range, considering each wavelength and each substrate thickness.

The effect of the first embodiment to reduce the overall aberration is obvious from the graphs of the optical spot shown in FIGS. 10A to 10C and the graphs of the wavefront aberration shown in FIGS. 2A to 2C. Further, in the first embodiment, the surface shape of the light incident surface A of the objective lens 1 is given by Expression 5 and FIG. 7, and the surface shape of the light exit surface B is given by Expression 6 and FIG. 8. Therefore, the first embodiment does not use the diffraction lens structure employed in conventional lenses described earlier, such as the lenses in Japanese Patent Unexamined Publication No. 09-145995 and 2000-81566. Further, since the first embodiment can focus the substantially entire light flux for the aperture (NA) required for recording or reproducing, it is possible to obtain a high light use efficiency.

Though the first embodiment describes the case of using three kinds of optical disks, HDDVD, DVD, and CD, this invention is not limited thereto but is also applicable to the case of using other kinds of optical disks. Further, the first embodiment is applicable to the optical disk having the same or different substrate thickness. In this case, it changes the wavelength of the laser beam to be used for each disk and designs the lens surface shape so as to reduce the overall aberration according to it.

Second Embodiment

A second embodiment of the invention describes a case where the substrate thickness is different and the wavelength is also different (405 nm, 655 nm, and 790 nm) Specifically, the second embodiment relates to the case of using Blu-ray or Blue laser with the wavelength of 405 nm and the substrate thickness of 0.1 mm, the case of using DVD with the wavelength of 655 nm and the substrate thickness of 0.6 mm, and the case of using CD with the wavelength of 790 nm and the substrate thickness of 1.2 mm.

In the second embodiment, the basic lens structure is the same as in the first embodiment shown in FIG. 6. Specifically, for Blu-ray and DVD, parallel light is incident to the side A to form a suitable optical spot on an information recording surface of a disk substrate (not shown) in the side B. For CD, divergent light is incident to the side A to form a suitable optical spot on an information recording surface of a disk substrate (not shown) in the side B.

On the side A in the light source side, the relationship between $Z_A$ and h is expressed by Expression 5. The specific values are shown in the tables of FIGS. 12 to 15 for each zone 1 to 22. On the other hand, on the side B in the disk side which is opposite to the light source, the relationship between $Z_B$ and h is expressed by Expression 6. The specific values are shown in the table of FIG. 16. In FIGS. 12 to 16, R represents curvature radius, "small" represents the optical axis side, and "large" represents the side apart from the optical axis.

The refractive index of the objective lens in the second embodiment is close to the refractive index of a glass with a high refractive index, which is the refractive index of VD89, for example.

A distance between the surface apexes f and e on the optical axis of the objective lens 1, which is the center thickness $t_0$, is 2.076 mm. The refractive index n for a wavelength $\lambda_1$=405 nm (Blu-ray disk) is 1.83164, the refractive index n for a wavelength $\lambda_2$=655 nm (DVD) is 1.7911, and the refractive index n for a wavelength $\lambda_3$=790 nm (CD) is 1.783555.

The transparent substrate of Blu-ray disk (wavelength $\lambda_1$=405 nm) has a thickness of 0.6 mm and a refractive index of 1.6235. The transparent substrate of DVD (wavelength $\lambda_2$=655 nm) has a thickness of 0.6 mm and a refractive index of 1.58. The transparent substrate of CD (wavelength $\lambda_3$=790 nm) has a thickness of 1.2 mm and a refractive index of 1.573. Therefore, a difference in refractive index between Blu-ray disk (wavelength $\lambda_1$=405 nm) and DVD (wavelength $\lambda_2$=655 nm) is 0.03 or higher, and a difference in refractive index between Blu-ray disk (wavelength $\lambda_1$=405 nm) and CD (wavelength $\lambda_3$=790 nm) is also 0.03 or higher.

In Blu-ray disk with a wavelength of 405 nm, NA is 0.850 and a focal length is 1.765 mm. In DVD with a wavelength of 655 nm, NA is 0.600 and a focal length is 1.8564 mm. In CD with a wavelength of 790 nm, NA is 0.469 and a focal length is 1.8745 mm. The aperture diameters are as shown in FIGS. 17A to 17C. The wavelength selective filter is used for aperture just like in the first embodiment.

FIGS. 17A to 17C show the distance between optical components and their arrangement based on the objective lens in an optical system equivalent to that of FIGS. 12 to 16 for Blu-ray, DVD, and CD, respectively. The tables of FIGS. 17A to 17C show an aperture, objective lens, disk, and an object surface for the objective lens. As shown in FIG. 17A to 17C, in Blu-ray and DVD, for example, the incident light to the objective lens is parallel light, that is, a distance between the object surface for the objective lens and the objective lens is ∞. An actual optical system places a Blue laser or a DVD laser in the focal position of a collimator lens and inputs the output light from the collimator lens to the objective lens as parallel light.

In CD, a distance from the object surface to the objective lens is 15.5 mm, and divergent light is input to the objective lens. In the case of CD as well, a distance from an emission point of a CD laser to a surface apex of the objective lens in the light source side may be 15.5 mm in an actual optical system. In this case, however, an optical pickup becomes large.

It is preferred in this case to place the collimator lens between the CD laser light source and the objective lens, and places the emission point of the CD laser in the position closer to the collimator lens than the focal position of the collimator lens. In this arrangement, the light emitted from the CD laser and having passed through the collimator lens becomes divergent light and enters the objective lens. The collimator lens and the CD laser are preferably arranged so that the incident light to the objective lens becomes the same as the light emitted from a distance of 15.5 mm without collimator lens.

In the second embodiment shown in FIGS. 17A to 17C, the relationship of $S_1$, $S_2$, and $S_3$ expressed by Expressions 1 and 2 is as follows:

Blu-ray: $\lambda_1$ = 405 nm, $S_1$ = ∞,
DVD: $\lambda_2$ = 655 nm, $S_2$ = ∞,
CD: $\lambda_3$ = 790 nm, $S_3$ = 15.5 mm Therefore, 405 nm($\lambda_1$)<790 nm($\lambda_3$).

Further, $(1/S_1)=(1/\infty)=0$, $(1/S_3)=(1/15.5)=0.064516129$

Therefore, $0<0.064516129$; $(1/S_1)<(1/S_3)$

Hence, in Blu-ray and CD, $\lambda_1<\lambda_3$ and $(1/S_1)<(1/S_3)$ are both satisfied.

Further, since 655 nm($\lambda_2$)<790 nm($\lambda_3$).

and $(1/S_2)=(1/\infty)=0$, $(1/S_3)=(1/15.5)=0.064516129$.

Therefore, $0<0.064516129$; $(1/S_2)<(1/S_3)$

Hence, in DVD and CD, $\lambda_2<\lambda_3$ and $(1/S_2)<(1/S_3)$ are both satisfied.

As shown in FIG. 18, the area in the side A up to the effective diameter φ2.228 where the range h is from 0 to 1.114, which is the zones 1 to 21 shown in FIG. 18 is a common use area of DVD and Blu-ray. On the other hand, the outer area of the effective diameter φ2.228 where the range h exceeds 1.114, which is the zone 22 shown in FIG. 18 is an exclusive use area of Blu-ray.

However, the light with the wavelength of 655 nm (DVD) passes though the Blu-ray exclusive use area with the wavelength selective filter. Therefore, the incident laser beam enters DVD and it becomes flare light having extremely high aberration on the information recording surface of DVD, which does not have any harmful effect.

Figure 21A:
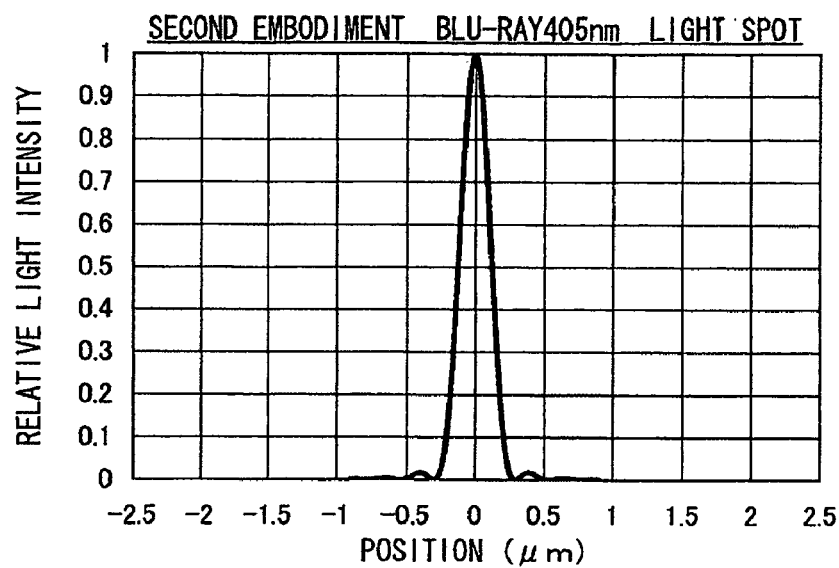
FIGS. 21A to 21C are graphs showing calculation results of an optical spot for different kinds of optical disks in the second embodiment.
Figure 21B:
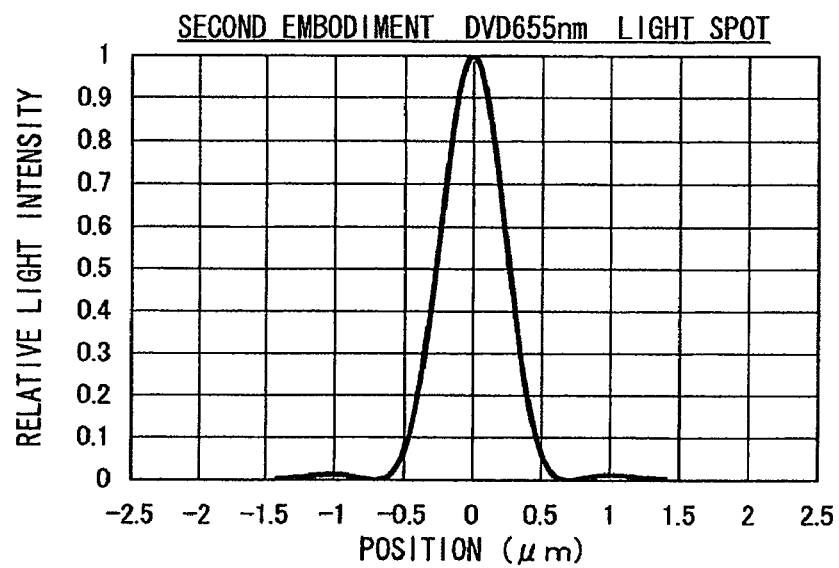
Figure 21C:
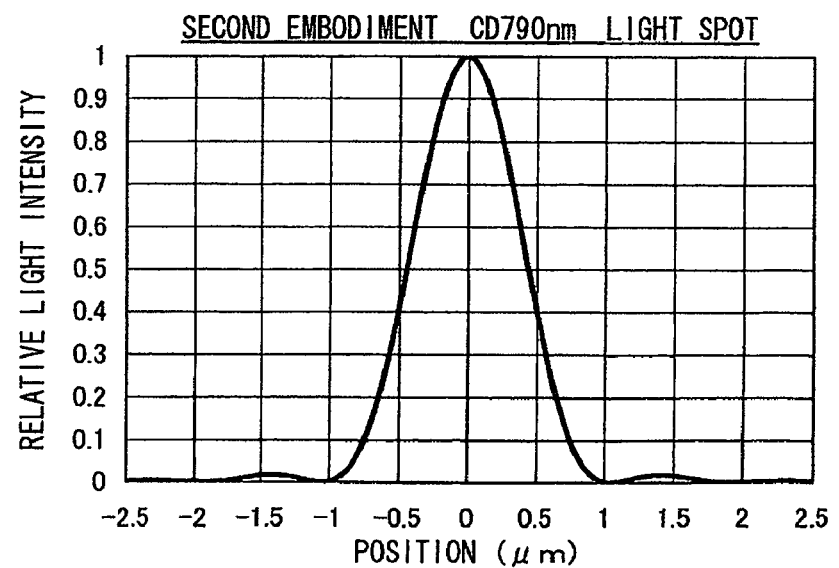

This is obvious also from the optical spot graphs of FIGS. 21A to 21C.

Figure 19A:
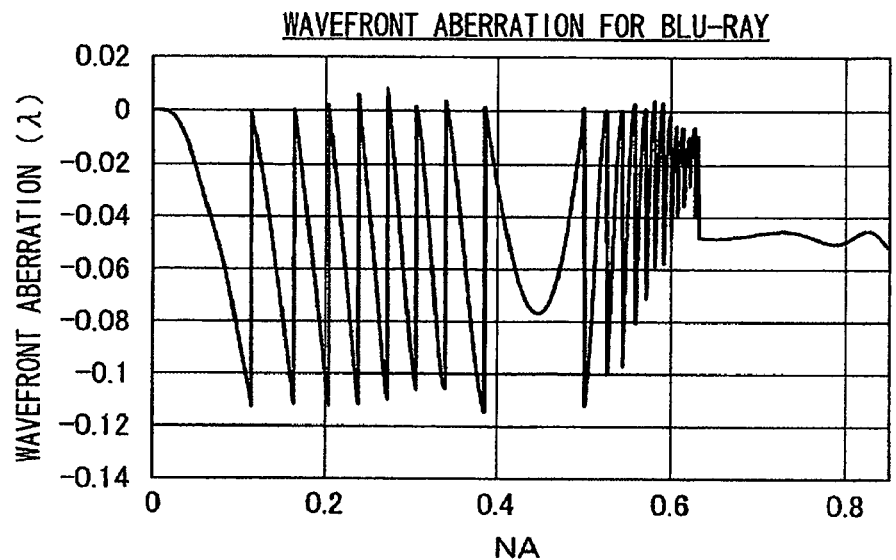
FIGS. 19A to 19C are graphs showing the wavefront aberration of Blu-ray, DVD, and CD of a second embodiment.
Figure 19B:
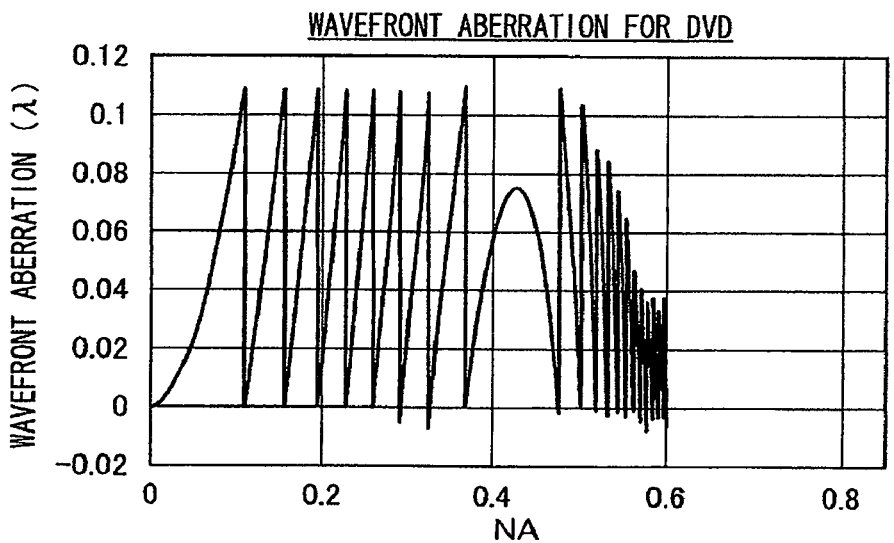
Figure 19C:
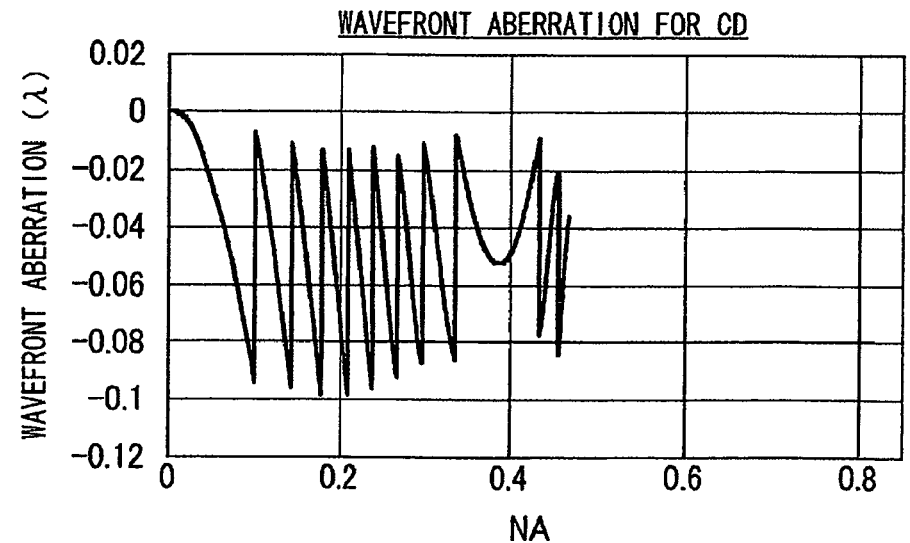

FIGS. 19A to 19C are graphs showing the wavefront aberration of the second embodiment. The RMS wavefront aberration in Blu-ray is 0.02410 λRMS, the RMS wavefront aberration in DVD is 0.02753 λRMS, and the RMS wavefront aberration in CD is 0.02127 λRMS. The RMS wavefront aberration of 0.035 λRMS or below, and further 0.033 λRMS or below are achieved in Blu-ray, DVD, and CD.

The value of Expression 7 is:

$$\sqrt{\frac{\sum W_i^2}{i}} = \sqrt{\frac{0.02410^2 + 0.02753^2 + 0.02127^2}{3}}$$
$$= 0.02443$$

It is 0.0 035 λRMS or below, and also 0.033 λRMS or below.

FIG. 18 also shows the substantial optical path length in the Blu-ray/DVD common use area zones 2 to 21 is displaced about how many times the wavelength λ in each aspherical surface section shown in FIGS. 17A to 17C when the substantial optical path length in zone 1 is a reference length.

FIG. 18 shows that, in zones 2 to 21, the difference in optical path length is 2 mλ for the wavelength of 405 nm (Blu-ray), and it is mλ (m is an integral number) for the wavelength of 655 nm (DVD) and the wavelength of 790 nm (CD). Since the shorter wavelength $\lambda_1$ is between 380 nm and 430 nm, the longer wavelength $\lambda_2$ is between 630 nm and 680 nm, and $\lambda_3$ is about 790 nm, it is likely to satisfy the relationship of the difference in substantial optical path length described above and to obtain the suitable wavelength aberration shown in FIGS. 19A to 19C.

Further, since the refractive index of the lens is the value described above, it is likely to obtain an appropriate difference in substantial optical path length and suitable wavelength aberration. Specifically, a different in refractive index between wavelengths 405 nm and 655 nm is 0.04054, and a difference in refractive index between wavelengths 405 nm and 790 nm is 0.048085. Since the both values are larger than 0.03, it is likely to produce an appropriate difference in substantial optical path length and suitable wavelength aberration.

FIGS. 20A to 20C show a difference and a ratio of wavefront aberration between the wavelengths of 405 nm (Blu-ray) and 655 nm (DVD) in each aspherical surface section shown in FIGS. 17A to 17C.

As shown in FIGS. 20A to 20C, the ratio of difference in wavefront aberration ΔVd(λ655)/ΔVd(λ405) in the common use are of 655 nm and 405 nm is within the range of 0.90 to 1.65. Further, the ratio ΔVd(λ405)/ΔVd(λ655) is within the range of 0.60 to 1.11. The wavefront aberration in each section is 0.14λ or below in the both wavelengths.

FIGS. 21A to 21C are graphs showing the optical spot of the second embodiment. The diameter of the optical spot having a relative luminous intensity of 1/e² (=0.135) is 0.3836 μm for Blu-ray with 405 nm, 0.8570 μm for DVD with 655 nm, and 1.4112 μm for CD with 790 nm.

Evaluation of the optical spot diameter in comparison with 0.82*wavelength/NA which is described in the first embodiment is as follows.

In Blu-ray (wavelength 405 nm; NA 0.850), 0.82*wavelength/NA=0.3907 μm. Since an actual optical spot diameter is 0.3836 μm, it is 0.9818 times the value of 0.82*wavelength/NA, thus being within a preferable range of 0.9 to 1.02.

In DVD (wavelength 655 nm; NA 0.600), 0.82*wavelength/NA=0.8952 μm. Since an actual optical spot diameter is 0.8570 μm, it is 0.9574 times the value of 0.82*wavelength/NA, thus being within a preferable range of 0.9 to 1.02. In DVD, the optical spot diameter is smaller than in the ideal lens by about as much as 4% (0.04 times). This is because the DVD light passes through the Blu-ray exclusive use area also, and the optical spot diameter becomes smaller due to this effect.

In CD (wavelength 790 nm; NA 0.469), 0.82*wavelength/NA=1.3812 μm. Since an actual optical spot diameter is 1.4084 μm, it is 1.0197 times the value of 0.82*wavelength/NA, thus being within a preferable range of 0.9 to 1.02.

Though the wavelength of one monochromatic light is 405 nm and the wavelengths of the other monochromatic light are 655 nm and 790 nm in the second embodiment, the one may be 380 to 430 nm and the other may be 630 to 680 nm and 770 to 820 nm. While the refractive index differs in this case, it is designed in accordance with the value.

Third Embodiment

The configuration of a third embodiment of the invention (convergent light incidence in HDDVD) describes the case where an object length to CD is longer than in the first embodiment (parallel light incidence in HDDVD). In the first embodiment, the incident light to the objective lens is parallel light in HDDVD and DVD, and it is divergent light in CD. In the third embodiment, the incident light to the objective lens is convergent light in HDDVD, parallel light in DVD, and divergent light in CD. The configuration of the third embodiment (convergent light incidence in HDDVD) can increase the object distance to CD compared to the first embodiment the first embodiment (parallel light incidence in HDDVD). The coma aberration occurring off-axis is higher when divergent light is incident to the objective lens compared to when parallel light is incident to the objective lens. Therefore, when the objective lens is horizontally shifted (objective lens shift) in the plane substantially perpendicular to the optical axis for tracking, high comma aberration can occur. The degree of comma aberration is largely affected by the divergence of light. Smaller divergence or longer object distance can reduce comma aberration in the objective lens shift. Therefore, the configuration of the optical system of the third embodiment is advantageous in CD objective lens shift compared to the configuration of the first embodiment. However, since convergent light is incident to HDDVD, comma aberration occurs in HDDVD also during the objective lens shift. Thus, it is preferred to consider the balance of object distance (magnification) in HDDVD and CD. If the magnification in HDDVD is m1 and magnification in CD is m3, it is preferable to satisfy:

0<m1≦1/10, −1/10<m3≦0

If m1 and m3 are out of the above range, comma aberration in the objective lens shift increases. The following range is more preferable:

0<m1≦1/20, −1/20≦m3<0

Though the lens in the third embodiment has a refractive index equivalent to plastic resin, it may be designed to have a refractive index of glass if a lens material is glass.

The basic lens structure of the third embodiment is described with reference to FIG. 6 showing the first embodiment In the third embodiment, for HDDVD, convergent light is incident to the side A to form a suitable optical spot on an information recording surface of a disk substrate (not shown) in the side B. For CD, divergent light is incident to the side A to form a suitable optical spot on an information recording surface of a disk substrate (not shown) in the side B. For DVD, parallel light is incident to the side A to form a suitable optical spot on an information recording surface of a disk substrate (not shown) in the side B.

On the side A in the light source side, the relationship between $Z_A$ and h is expressed by Expression 5. The specific values are shown by the table of FIG. 22 for each zone 1 to 7.

A distance between the surface apexes f and e on the optical axis of the objective lens 1, which is the center thickness $t_0$, is 1.92 mm. The refractive index n for a wavelength $\lambda_1$=408 nm (HDDVD) is 1.5229, the refractive index n for a wavelength $\lambda_2$=658 nm (DVD) is 1.5048, and the refractive index n for a wavelength $\lambda_3$=785 nm (CD) is 1.5018.

The transparent substrate of HDDVD (wavelength $\lambda_1$=408 nm) has a thickness of 0.6 mm and a refractive index of 1.622. The transparent substrate of DVD (wavelength $\lambda_2$=658 nm) has a thickness of 0.6 mm and a refractive index of 1.577. The transparent substrate of CD (wavelength $\lambda_3$=785 nm) has a thickness of 1.2 mm and a refractive index of 1.5720.

In HDDVD with a wavelength of 408 nm, NA is 0.650 and a focal length is 3.101 mm. In DVD with a wavelength of 658 nm, NA is 0.650 and a focal length is 3.2059 mm. In CD with a wavelength of 785 nm, NA is 0.470 and a focal length is 3.2246 mm. The aperture diameters are as shown in FIGS. 23A to 23C. The wavelength selective filter is used for aperture just like in the first embodiment.

The tables of FIGS. 23A to 23C show the distance between optical components and their arrangement based on the objective lens in an optical system equivalent to that of FIG. 1 for HDDVD, DVD, and CD, respectively. FIGS. 23A to 23C show an aperture, objective lens, disk, and an object surface for the objective lens. As shown in FIG. 23A to 23C, in HDDVD, for example, the incident light to the objective lens is convergent light. Thus a distance between the object surface for the objective lens and the objective lens is negative, −93.9 mm. An actual optical system places a collimator lens between a HDDVD laser light source and an objective lens, and places an emission point of the HDDVD laser in the position apart from the collimator lens compared with the focal position of the collimator lens. In this arrangement, the light emitted from the HDDVD laser and having passed through the collimator lens becomes convergent light and enters the objective lens. In DVD, the incident light to the objective lens is parallel light, that is, a distance between the object surface for the objective lens and the objective lens is ∞. An actual optical system places a DVD laser in the focal position of a collimator lens and inputs the output light from the collimator lens to the objective lens as parallel light.

In CD, a distance from the object surface to the objective lens is 113.0 mm, and divergent light is input to the objective lens. In an actual optical system, a distance from an emission point of a CD laser to a surface apex of the objective lens in the light source side may be 113 mm. In this case, however, an optical pickup becomes large. It is thus preferred to place the collimator lens between the CD laser light source and the objective lens, and places the emission point of the CD laser in the position closer to the collimator lens than the focal position of the collimator lens. In this arrangement, the light emitted from the CD laser and having passed through the collimator lens becomes divergent light and enters the objective lens. The collimator lens and the CD laser are preferably arranged so that the incident light to the objective lens becomes the same as the light emitted from a distance of 113 mm without collimator lens.

In the third embodiment shown in FIGS. 23A to 23C, the relationship of $S_1$, $S_2$, and $S_3$ expressed by Expressions 1 and 2 is as follows:

| HDDVD: | $\lambda_1$ = 408 nm, $S_1$ = −93.9, |
|---|---|
| DVD: | $\lambda_2$ = 658 nm, $S_2$ = ∞, |
| CD: | $\lambda_3$ = 785 nm, $S_3$ = 113.0 mm |

Therefore, 408 nm($\lambda_1$)<785 nm($\lambda_3$).

Further, $(1/S_1)=(1/-93.9)=-0.010649627$, $(1/S_3)=(1/113.0)=0.008849557$

Therefore, $-0.010649627<0.008849557; (1/S_1)<(1/S_3)$

Hence, in HDDVD and CD, $\lambda_1<\lambda_3$ and $(1/S_1)<(1/S_3)$ are both satisfied.

Further, since magnification m1 of HDDVD is 1/31.2, and magnification m3 of CD is −1/34.1, $0<m1\leq1/20$ and $-1/20\leq m3<0$ are both satisfied.

Further, 658 nm($\lambda_2$)<785 nm($\lambda_3$)

and $(1/S_2)=(1/\infty)=0$, $(1/S_3)=(1/113.0)=0.008849557$.

Therefore, $0<0.008849557; (1/S_2)<(1/S_3)$

Hence, in DVD and CD, $\lambda_2<\lambda_3$ and $(1/S_2)<(1/S_3)$ are both satisfied.

As shown in FIG. 22, the area in the side A up to the effective diameter φ3.8932 mm where the range h is from 0 to 1.94658, which is the zones 1 to 6 shown in FIG. 22 is a common use area of DVD and HDDVD. On the other hand, the outer area of the effective diameter φ3.8932 where the range h exceeds 1.94658, which is the zone 7 shown in FIG. 22 is an exclusive use area of DVD.

However, the light with the wavelength of 408 nm (HDDVD) also passes though the DVD exclusive use area with the wavelength selective filter. Therefore, the laser beam emitted from the laser enters HDDVD after passing through the objective lens. Since the incident light becomes flare light having extremely high aberration on the information recording surface of HDDVD, it does not have any harmful effect.

Figure 24:
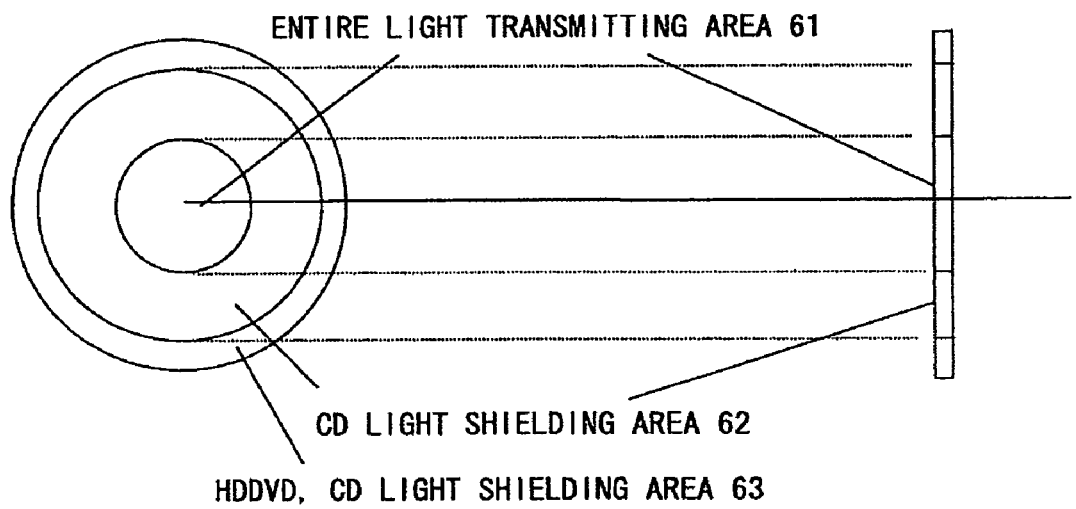
FIG. 24 is a view showing the structure of a wavelength selective filter of the third embodiment.

The wavelength selective filter as shown in FIG. 24 may be used. The wavelength selective filter is sectioned into an inner entire light transmitting area 61, an intermediate CD (785 nm) light shielding area 62, and an outer HDDVD (408 nm) and CD (785 nm) light shielding area 63 as shown in FIG. 24. For example, a dichroic coating that reflects the light having a 750 nm or higher wavelength may be deposited on the intermediate CD light shielding area 62, and a dichroic coating that allows only the light having a 600 to 700 nm wavelength to pass through is deposited on the outer HDDVD and CD light shielding area 63. Thereby, the numerical aperture (NA) of HDDVD is 0.650, NA of DVD is 0.650, and NA of CD is 0.470.

Figure 25A:
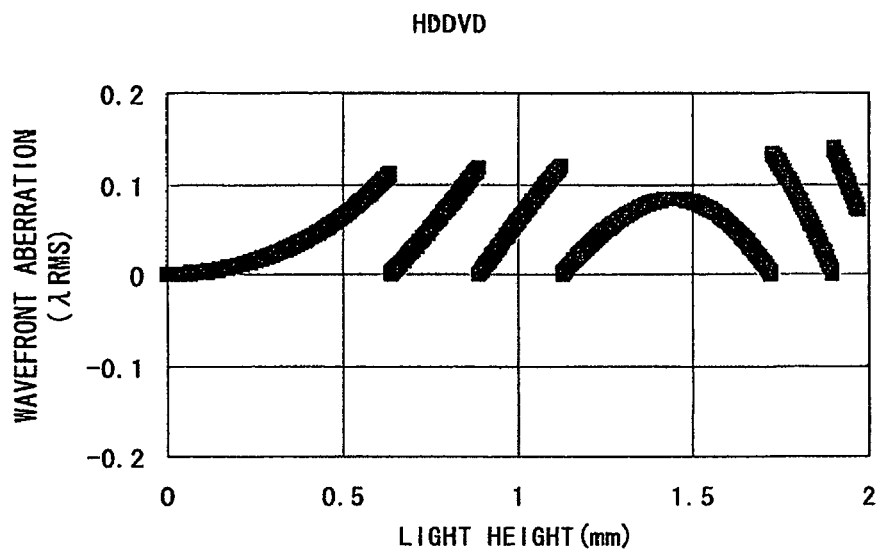
FIGS. 25A to 25C are graphs showing the wavefront aberration of an objective lens of the third embodiment.
Figure 25B:
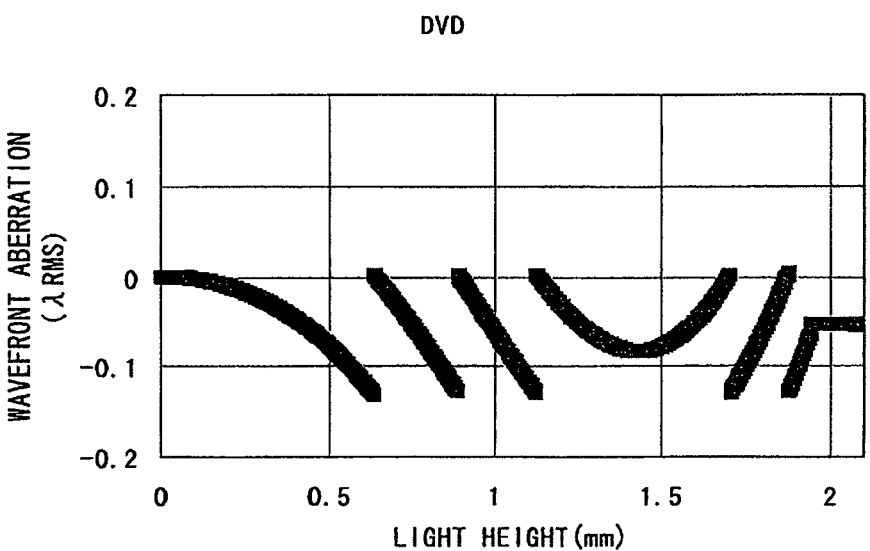
Figure 25C:
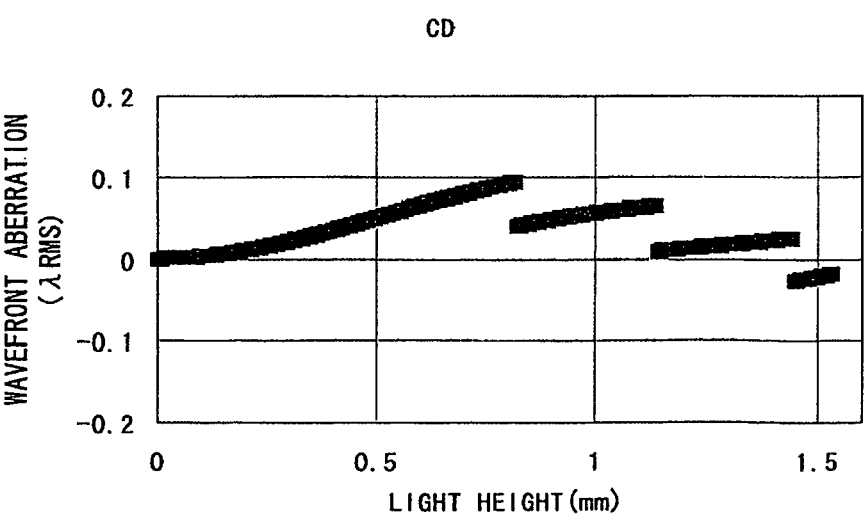

FIGS. 25A to 25C are graphs showing the wavefront aberration of the third embodiment.

The RMS wavefront aberration in HDDVD is 0.03253 λRMS, the RMS wavefront aberration in DVD is 0.03178 λRMS, and the RMS wavefront aberration in CD is 0.02091 λRMS. Thus, the RMS wavefront aberration of 0.035 λRMS or below, and further 0.033 λRMS or below are achieved in HDDVD, DVD, and CD.

The value of Expression 7 is:

$$\sqrt{\frac{\sum W_i^2}{i}} = \sqrt{\frac{0.03253^2 + 0.03178^2 + 0.02091^2}{3}}$$
$$= 0.02890$$

It is 0.0 035 λRMS or below, and also 0.033 λRMS or below.

FIG. 26 shows the comma aberration (third order) that occurs in CD (NA=0.470) objective lens shift of 0.3 mm in the objective lens of the first embodiment and the objective lens of the third embodiment. In the first embodiment, the incident light to the objective lens is parallel light in HDDVD and DVD while it is divergent light in CD, and an object distance in CD is 49.4 mm. In the third embodiment, the incident light to the objective lens is convergent light in HDDVD, parallel light in DVD, and divergent light in CD, and an object distance in CD is thereby 113.0 mm, which is longer than in the first embodiment. As a result, as shown in FIG. 26, the comma aberration during the CD objective lens shift, which is 0.0469 λRMW in the objective lens of the first embodiment, is reduced to 0.0177 λRMW in the objective lens of the third embodiment.

FIG. 27 also shows the substantial optical path length in the HDDVD/DVD common use area zones 2 to 6 is displaced about how many times the wavelength λ in each aspherical surface section shown in FIGS. 22A to 22C when the substantial optical path length in zone 1 is a reference length.

FIG. 27 shows that, in zones 2 to 6, the difference in optical path length is 2 mλ for the wavelength of 408 nm (HDDVD), and it is mλ (m is an integral number) for the wavelength of 658 nm (DVD) and the wavelength of 785 nm (CD). Since the shorter wavelength $\lambda_1$ is between 380 nm and 430 nm, the longer wavelength $\lambda_2$ is between 630 nm and 680 nm, and $\lambda_3$ is about 790 nm, it is likely to satisfy the relationship of the difference in substantial optical path length described above and to obtain the suitable wavelength aberration shown in FIGS. 25A to 25C.

Figure 28A:
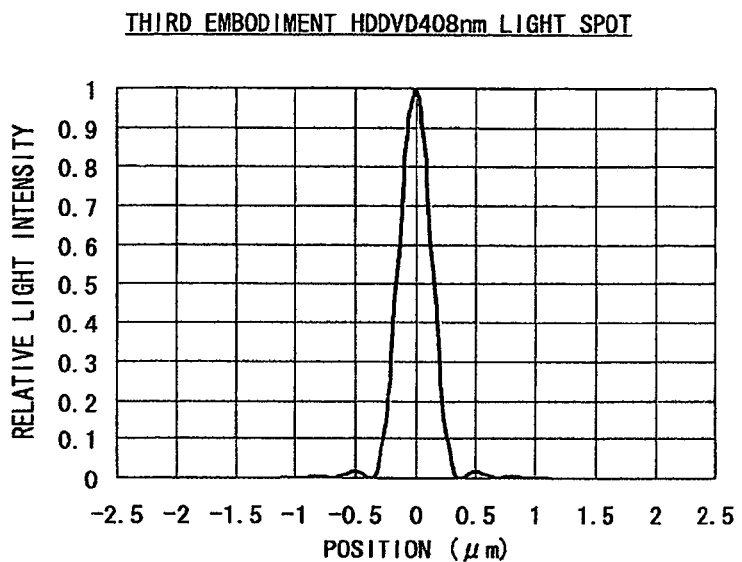
FIGS. 28A to 28C are graphs showing an optical spot in the third embodiment.
Figure 28B:
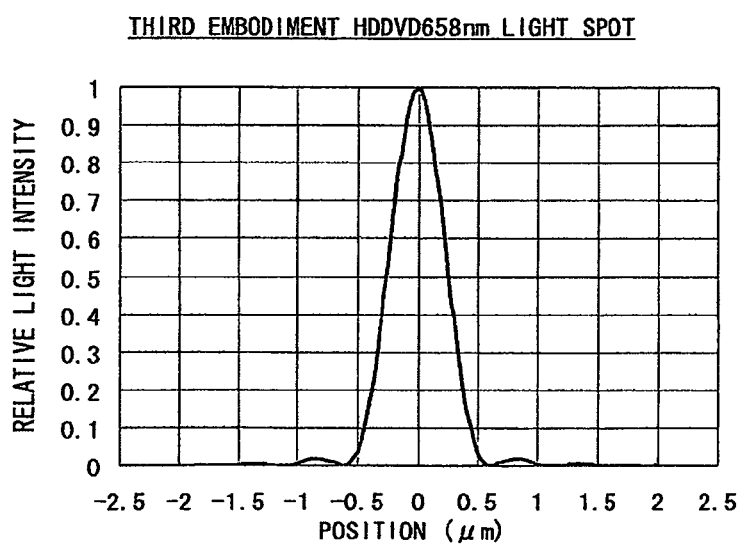
Figure 28C:
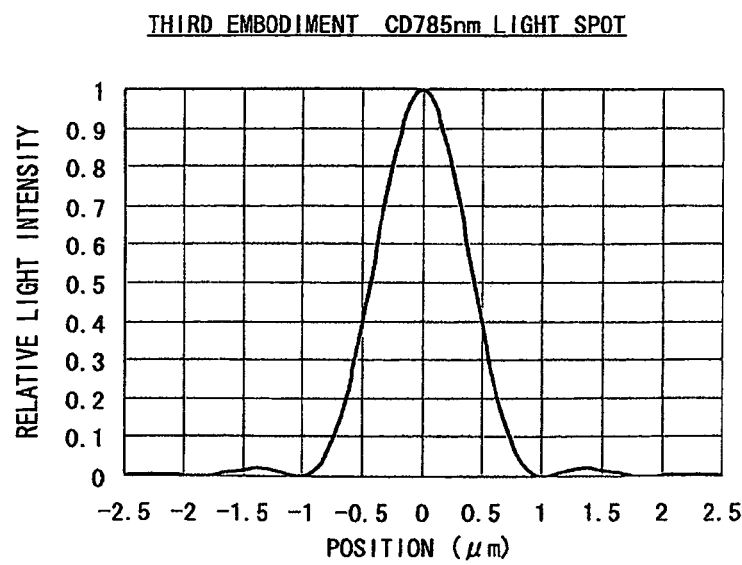

FIGS. 28A to 28C are graphs showing the optical spot of the third embodiment. The diameter of the optical spot having a relative luminous intensity of $1/e^2$ (=0.135) is 0.5029 μm for HDDVD with 408 nm, 0.8236 μm for DVD with 658 nm, and 1.3811 μm for CD with 785 nm, which are within an allowable range.

Evaluation of the optical spot diameter in comparison with 0.82*wavelength/NA which is described in the first embodiment is as follows.

In HDDVD (wavelength 408 nm; NA 0.650), 0.82*wavelength/NA=0.5147 μm. Since an actual optical spot diameter is 0.5029 μm, it is 0.9771 times the value of 0.82*wavelength/NA, thus being within a preferable range of 0.9 to 1.02. In HDDVD, the optical spot diameter is smaller than that of the ideal lens by about as much as 2.3% (0.023 times). This is because the HDDVD light passes through the DVD exclusive use area also, and the optical spot diameter becomes smaller due to this effect.

In DVD (wavelength 658 nm; NA 0.65), 0.82*wavelength/NA=0.8301 μm. Since an actual optical spot diameter is 0.8236 μm, it is 0.9922 times the value of 0.82*wavelength/NA, thus being within a preferable range of 0.9 to 1.02.

In CD (wavelength 785 nm; NA 0.470), 0.82*wavelength/NA=1.3696 μm. Since an actual optical spot diameter is 1.3811 μm, it is 1.0084 times the value of 0.82*wavelength/NA, thus being within a preferable range of 0.9 to 1.02.

Though the wavelengths of monochromatic light are 408 nm, 658 nm, and 785 nm in the third embodiment, they may be 380 to 430 nm, 630 to 680 nm, and 770 to 820 nm, respectively. While the refractive index differs in this case, it may be designed in accordance with these values. Further, the incident light to the objective lens is parallel light in HDDVD and DVD, and it is divergent light in CD in the first embodiment, and the incident light to the objective lens is convergent light in HDDVD, parallel light in DVD, and divergent light in CD in the third embodiment. However, it is not limited to these combinations. For example, it is possible to use convergent light in HDDVD and DVD and divergent light in CD. If the object distance is the same in HDDVD and DVD, it is possible to use the same optical detector for both HDDVD and DVD.

Fourth Embodiment

A fourth embodiment of the invention describes the case where the substrate thickness is different and the wavelength is also different (408 nm, 655 nm, and 790 nm), which is similar to the second embodiment. In this embodiment, the objective lens is made of different material from the objective lens in the second embodiment.

In the second embodiment, it is expected that an objective lens is made of glass having a high melting point and a high thermal deformation temperature (Tg=528° C.), such as VC89, for example. On the other hand, in the fourth embodiment, it is expected that an objective lens is made of glass having a low melting point and a low thermal deformation temperature (Tg=228° C.), such as K-PG325 manufactured by SUMITA optical glass, inc., for example. A difference in objective lens material between the second and fourth embodiments is comparatively described below.

Since the glass with a high refractive index such as VC89 has a high melting point of 600° C. or above, it requires a carbide die in which it is difficult to provide a microstructure on its surface as a lens molding die that is endurable for the temperature. Further, since it takes a long time to reduce the temperature to a normal temperature after lens molding, it causes low productivity per hour. On the other hand, the glass with a low refractive index such as K-PG325 has a low melting point of about 300° C., it is possible to use an equivalent lens molding die to the one used for plastic material, in which it is easy to provide a microstructure such as orbicular zones. Further, since it takes only a short time to reduce the temperature to a normal temperature, it achieves high productivity per hour. In the following, the material that is mainly composed of glass with a refractive index of 1.49 to 1.70 and a thermal deformation temperature of 300° C. or below is called "low-melting glass".

The refractive index of the low-melting glass is 1.49 to 1.70 for light of 408 nm, for example, which is lower than normal glass such as VC89. Therefore, optical design of a high NA lens is difficult to make since the low-melting glass has a low refractive index. This embodiment secures the characteristics when using the low-melting glass as material of the objective lens by increasing the center thickness of the lens to 2.642 mm. Though the low-melting glass has substantially the same refractive index as plastic material, it is more advantageous as objective lens material in having higher temperature/humidity characteristics than the plastic material.

Specifically, the fourth embodiment relates to the case of using Blu-ray or light emitted from Blue laser with the wavelength of 408 nm and the substrate thickness of 0.0875 mm, the case of using DVD with the wavelength of 655 nm and the substrate thickness of 0.6 mm, and the case of using CD with the wavelength of 790 nm and the substrate thickness of 1.2 mm. It uses the low-melting glass as lens material.

In the fourth embodiment, the basic lens structure is the same as in the first embodiment shown in FIG. 6. Specifically, for Blu-ray and DVD, parallel light is incident to the side A to form a suitable optical spot on an information recording surface of a disk substrate (not shown) in the side B. For CD, divergent light is incident to the side A to form a suitable optical spot on an information recording surface of a disk substrate (not shown) in the side B.

On the side A in the light source side, the relationship between $Z_A$ and h is expressed by Expression 5. The specific values are shown in the tables of FIGS. 29 to 34 for each zone. On the other hand, on the side B in the disk side which is opposite to the light source, the relationship between $Z_B$ and h is expressed by Expression 6. The specific values are shown in the table of FIG. 35. In FIGS. 29 to 35, R represents curvature radius, "small" represents the optical axis side, and "large" represents the side apart from the optical axis.

A distance between the surface apexes f and e on the optical axis of the objective lens 1, which is the center thickness $t_0$, is 2.642 mm. The refractive index n for a wavelength $\lambda_1$=408 nm (Blu-ray disk) is 1.5126, the refractive index n for a wavelength $\lambda_2$=655 nm (DVD) is 1.4987, and the refractive index n for a wavelength $\lambda_3$=790 nm (CD) is 1.4958.

The transparent substrate of Blu-ray disk (wavelength $\lambda_1$=408 nm) has a thickness of 0.0875 mm and a refractive index of 1.6205. The transparent substrate of DVD (wavelength $\lambda_2$=655 nm) has a thickness of 0.6 mm and a refractive index of 1.5794. The transparent substrate of CD (wavelength $\lambda_3$=790 nm) has a thickness of 1.2 mm and a refractive index of 1.5725. Therefore, a difference in refractive index between Blu-ray disk (wavelength $\lambda_1$=408 nm) and DVD (wavelength $\lambda_2$=655 nm) is 0.03 or higher, and a difference in refractive index between Blu-ray disk (wavelength $\lambda_1$=408 nm) and CD (wavelength $\lambda_3$=790 nm) is also 0.03 or higher.

In Blu-ray disk with a wavelength of 408 nm, NA is 0.850 and a focal length is 2.3721 mm. In DVD with a wavelength of 655 nm, NA is 0.650 and a focal length is 2.4262 mm. In CD with a wavelength of 790 nm, NA is 0.510 and a focal length is 2.4378 mm. The aperture diameters are as shown in FIGS. 36A to 36C. The wavelength selective filter is used for aperture just like in the first embodiment.

FIGS. 36A to 36C show the distance between optical components and their arrangement based on the objective lens in an optical system equivalent to that of FIGS. 29 to 35 for Blu-ray, DVD, and CD, respectively. The tables of FIGS. 36A to 36C show an aperture, objective lens, disk, and an object surface for the objective lens. As shown in FIG. 36A to 36C, in Blu-ray and DVD, the incident light to the objective lens is parallel light, that is, a distance between the object surface for the objective lens and the objective lens is ∞. An actual optical system places a Blue laser or a DVD laser in the focal position of a collimator lens and inputs the output light from the collimator lens to the objective lens as parallel light.

In CD, a distance from the object surface to the objective lens is 19.35 mm, and divergent light is input to the objective lens. In the case of CD as well, a distance from an emission point of a CD laser to a surface apex of the objective lens in the light source side may be 19.35 mm in an actual optical system. In this case, however, an optical pickup becomes large.

It is preferred in this case to place the collimator lens between the CD laser light source and the objective lens, and places the emission point of the CD laser in the position closer to the collimator lens than the focal position of the collimator lens. In this arrangement, the light emitted from the CD laser and having passed through the collimator lens becomes divergent light and enters the objective lens. The collimator lens and the CD laser are preferably arranged so that the incident light to the objective lens becomes the same as the light emitted from a distance of 19.35 mm without collimator lens.

In the fourth embodiment shown in FIGS. 36A to 36C, the relationship of $S_1$, $S_2$, and $S_3$ expressed by Expressions 1 and 2 is as follows:

| | |
|---|---|
| Blu-ray: | $\lambda_1$ = 408 nm, $S_1$ = ∞, |
| DVD: | $\lambda_2$ = 655 nm, $S_2$ = ∞, |
| CD: | $\lambda_3$ = 790 nm, $S_3$ = 19.35 mm |

Therefore, 408 nm($\lambda_1$)<790 nm($\lambda_3$).

Further, $(1/S_1)=(1/\infty)=0$, $(1/S_3)=(1/19.35)=0.05168$

Therefore, $0<0.05168; (1/S_1)<(1/S_3)$

Hence, in Blu-ray and CD, $\lambda_1<\lambda_3$ and $(1/S_1)<(1/S_3)$ are both satisfied.

Further, since 655 nm($\lambda_2$)<790 nm($\lambda_3$)

and $(1/S_2)=(1/\infty)=0$, $(1/S_3)=(1/19.35)=0.05168$.

Therefore, $0<0.05168; (1/S_2)<(1/S_3)$.

Hence, in DVD and CD, $\lambda_2<\lambda_3$ and $(1/S_2)<(1/S_3)$ are both satisfied.

As shown in FIG. 37, the area in the side A up to the effective diameter φ3.153 where the range h is from 0 to 1.5765, which is the zones 1 to 29 shown in FIG. 37 is a common use area of DVD and Blu-ray. On the other hand, the outer area of the effective diameter φ3.153 where the range h exceeds 1.5765, which is the zones 30 and 31 shown in FIG. 37 is an exclusive use area of Blu-ray.

However, the light with the wavelength of 655 nm (DVD) passes though the Blu-ray exclusive use area with the wavelength selective filter. Therefore, the incident laser beam enters DVD and it becomes flare light having extremely high aberration on the information recording surface of DVD, which does not have any harmful effect.

Figure 38A:
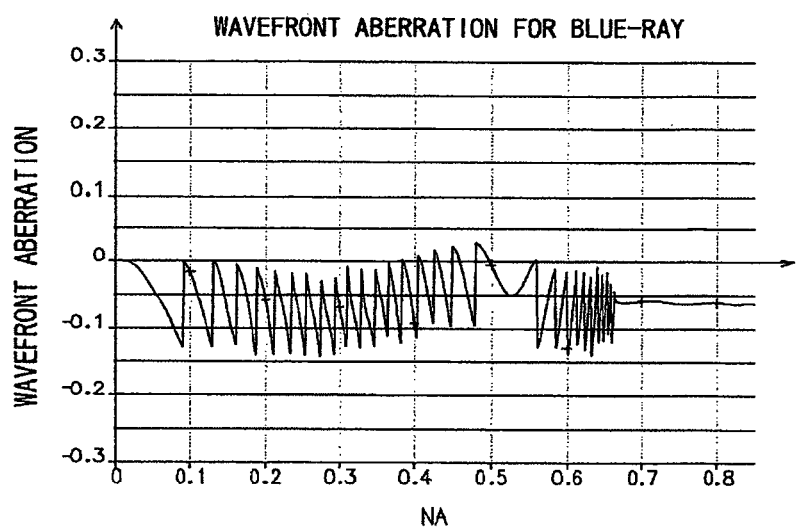
FIGS. 38A to 38C are graphs showing the wavefront aberration of an objective lens of a fourth embodiment.
Figure 38B:
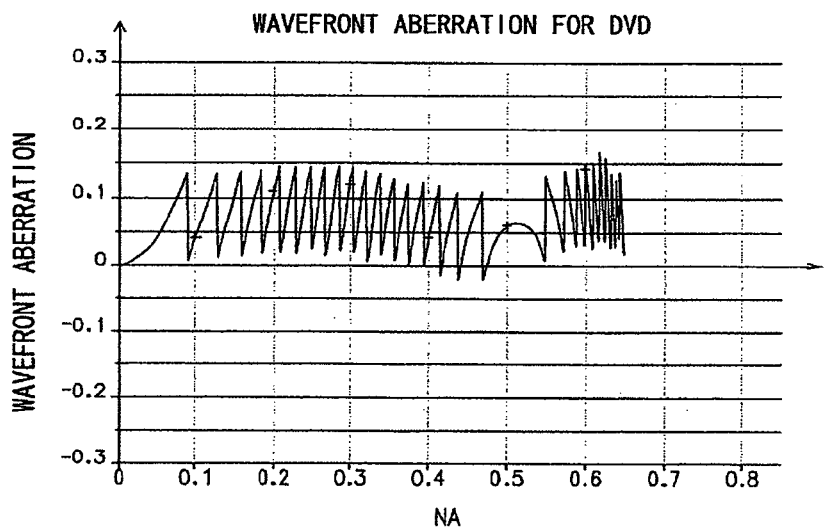
Figure 38C:
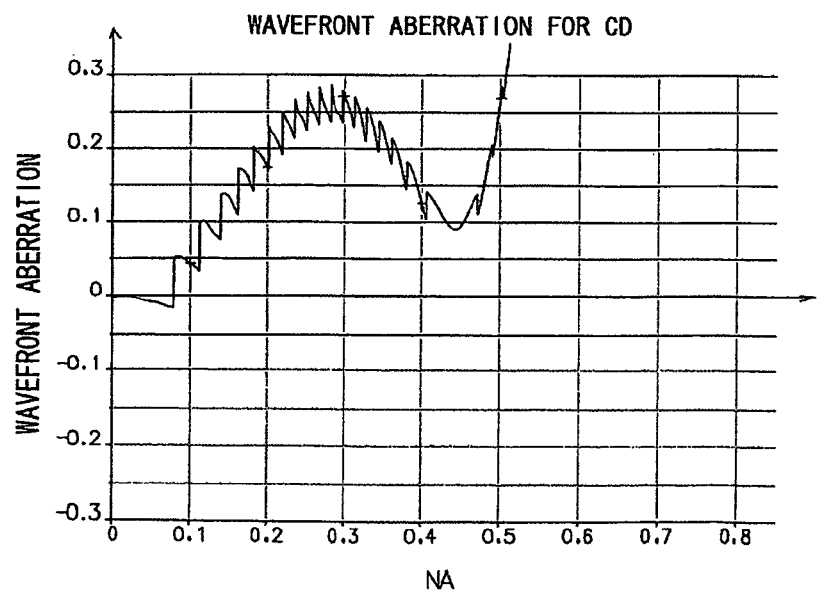

FIGS. 38A to 38C are graphs showing the wavefront aberration of the fourth embodiment. The RMS wavefront aberration in Blu-ray is 0.03210 λRMS, the RMS wavefront aberration in DVD is 0.03740 λRMS, and the RMS wavefront aberration in CD is 0.04320 λRMS. Thus, the RMS wavefront aberration is 0.045 λRMS or below in Blu-ray, DVD, and CD.

FIG. 37 also shows the substantial optical path length in the Blu-ray/DVD common use area zones 2 to 29 is displaced about how many times the wavelength λ in each aspherical surface section shown in FIGS. 36A to 36C when the substantial optical path length in zone 1 is a reference length.

FIG. 37 shows that, in zones 2 to 21, the difference in optical path length is 2 mλ for the wavelength of 408 nm (Blu-ray), and it is mλ (m is an integral number) for the wavelength of 655 nm (DVD) and the wavelength of 790 nm (CD). Since the shorter wavelength $\lambda_1$ is between 380 nm and 430 nm, the longer wavelength $\lambda_2$ is between 630 nm and 680 nm, and $\lambda_3$ is about 790 nm, it is likely to satisfy the relationship of the difference in substantial optical path length described above and to obtain the suitable wavelength aberration shown in FIGS. 38A to 38C.

Though the wavelengths of one monochromatic light are 408 nm, 655 nm and 790 nm in the fourth embodiment, they may be 380 to 430 nm, 630 to 680 nm and 770 to 820 nm, respectively. While the refractive index differs in this case, it may be designed in accordance with the value.

As described in the foregoing, the fourth embodiment forms the objective lens of NA=0.85 with the material mainly composed of glass with the refractive index of 1.49 to 1.70 for the light of 408 nm. Since material with a low melting point of about 300° C., for example, can be used as the low-refractive index material, it is possible to produce the lens with a normal die and thereby increase productivity.

Fifth Embodiment

Figures 39, 40:
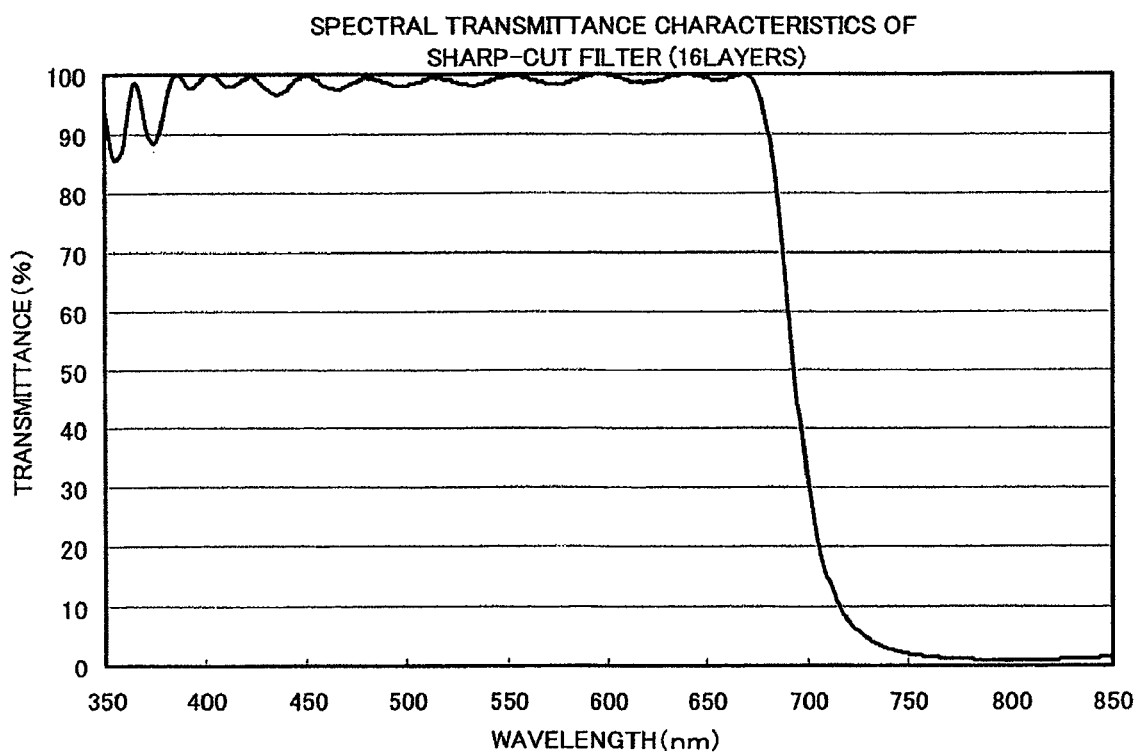
FIG. 39 is a table showing the film structure of a wavelength selective filter of a fifth embodiment.
FIG. 40 is a graph showing the spectral characteristics of the wavelength selective filter of the fifth embodiment.

FIG. 39 shows the film structure of a wavelength selective filter (sharp-cut filter) by 16-layer coating. The wavelength selective filter is composed of $SiO_2$ layers and $Ta_2O_5$ layers that are laminated on one another on a glass substrate made of BK7. The refractive index shown in FIG. 39 is a value for the light of 780 nm. FIG. 40 shows the spectral transmittance characteristics of the wavelength selective filter having the structure of FIG. 39. The transmittance of the CD wavelength 780 nm to 790 nm is as low as 1%, thus being suitable. The spectral transmittance characteristics shown in the graph of FIG. 40 remain the same even if the refractive index or the thickness of the film structure shown in FIG. 39 are deviated by about 0.5% to 1% due to manufacturing error.

Figures 41, 42:
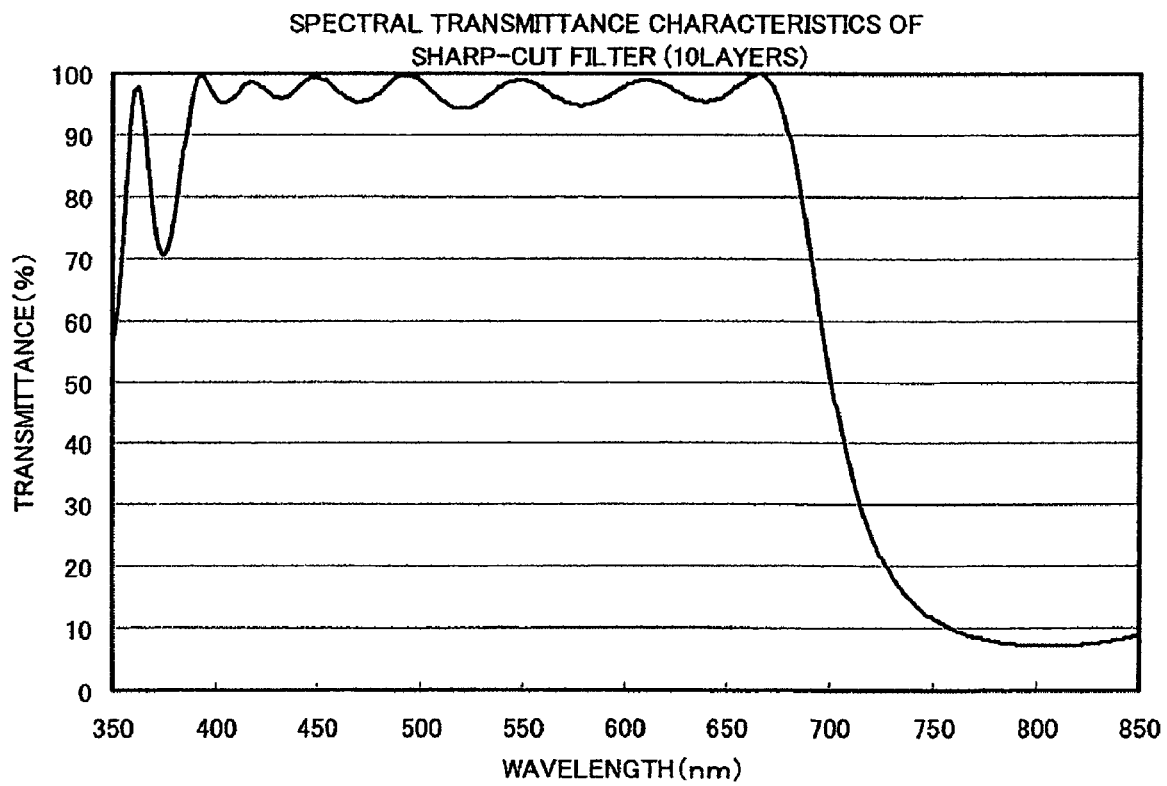
FIG. 41 is a table showing a film structure of the wavelength selective filter of the fifth embodiment.
FIG. 42 is a graph showing the spectral characteristics of the wavelength selective filter of the fifth embodiment.

On the other hand, the 16-layer coating causes high costs due to a large number of coats. FIG. 41 shows the film structure of the wavelength selective filter by 10-layer coating. The refractive index shown in FIG. 41 is a value for the light of 810 nm. FIG. 42 shows the spectral transmittance characteristics of the wavelength selective filter having the structure of FIG. 41. The transmittance of the CD wavelength 780 nm to 790 nm is about 7% to 8%. Though the transmittance characteristics are deteriorated compared to the 16-layer coating wavelength selective filter, it is not too significant to affect the CD recording and reproducing characteristics, and thus sufficient for practical use. The 10-layer coating wavelength selective filter can reduce costs compared to the 16-layer coating wavelength selective filter. The spectral transmittance characteristics shown in the graph of FIG. 42 remain the same even if the refractive index or the thickness of the film structure shown in FIG. 41 are deviated by about 0.5% to 1% due to manufacturing error.

The wavelength selective filter preferably has a transmittance of 10% or lower for a CD wavelength (770 to 800 nm). A more preferable transmittance is 5% or lower, and the most preferable transmittance is 2% or lower.

Further, the wavelength selective filter preferably has a transmittance of 85% or higher for Blu-ray and DVD wavelength (380 to 700 nm). A more preferable transmittance is 90% or higher, and the most preferable transmittance is 95% or lower.

Though the wavelength selective filter shown in FIGS. 39 to 42 is formed on a glass substrate, separated from an objective lens, it may be coated on one side of the objective lens. In this case, it is preferably coated on an almost flat surface of the objective lens facing to the disk. This allows easy formation of a uniform film. Further, if the refractive index of the wavelength selective filter and the refractive index of the objective lens are substantially equal, it is possible to achieve the similar design to the coating design in the embodiment shown in FIGS. 39 to 42, which facilitates manufacturing. In this embodiment, the refractive index of the objective lens such as plastic is 1.54 to 1.55, and the refractive index of BK7 is 1.51; therefore, the both refractive indexes are substantially the same. The refractive index of the wavelength selective filter is preferably within the range of 0.9 to 1.1 with respect to the refractive index of the objective lens.

Sixth Embodiment

A sixth embodiment of the invention is described hereinafter with reference to the drawings. This embodiment describes an objective lens that focuses laser light on an optical recording medium as an optical component included in an optical pickup device. The optical pickup device is compatible with CD, DVD, and Blu-ray disk. The optical component is not limited to the objective lens, and it is possible to achieve an effect of the invention if it is an optical member through which light with three kinds of wavelength regions pass.

An antireflection coating used in this invention is composed of layers with a high refractive index and layers with a low refractive index laminated on one another on an optical component. Material of the layer with a high refractive index is at least one selected from oxides such as aluminum oxide, zirconium oxide, titanium oxide, tantalum oxide, niobium oxide, antimony oxide, cerium oxide, yttrium oxide, hafnium oxide and magnesium oxide, nitrides such as silicon nitride and germanium nitride, carbides such as silicon carbide, sulfides such as zinc sulfide, and mixed material of these. Material of the layer with a low refractive index is at least one selected from silicon oxide, fluorides such as magnesium fluoride, aluminum fluoride, barium fluoride, calcium fluoride, lithium fluoride, sodium fluoride, strontium fluoride, yttrium fluoride, chiolite and cryorite, and mixed material of these. It is preferred to use oxide, nitride, carbide and fluoride to obtain high retention characteristics under a high temperature and high humidity environment.

The antireflection coating of this invention is formed by vacuum deposition, for example. In the vacuum deposition process, various deposition techniques such as vacuum evaporation, sputtering, chemical vapor deposition, reservation, and so on. When performing the vacuum evaporation, it is effective to ionize part of vapor flow in order to improve the film property and use ion plating that applies bias to a substrate, cluster ion beam, and ion assisted deposition that applies ion to a substrate with ion gun. The sputtering involves DC reactive sputtering, RF sputtering, ion beam sputtering, and so on. The chemical vapor deposition involves plasma polymerization, light assisted deposition, thermal decomposition, organic metal chemical vapor deposition, and so on. It is possible to create a desired film thickness by adjusting a deposition time during film formation and so on.

Figure 43:
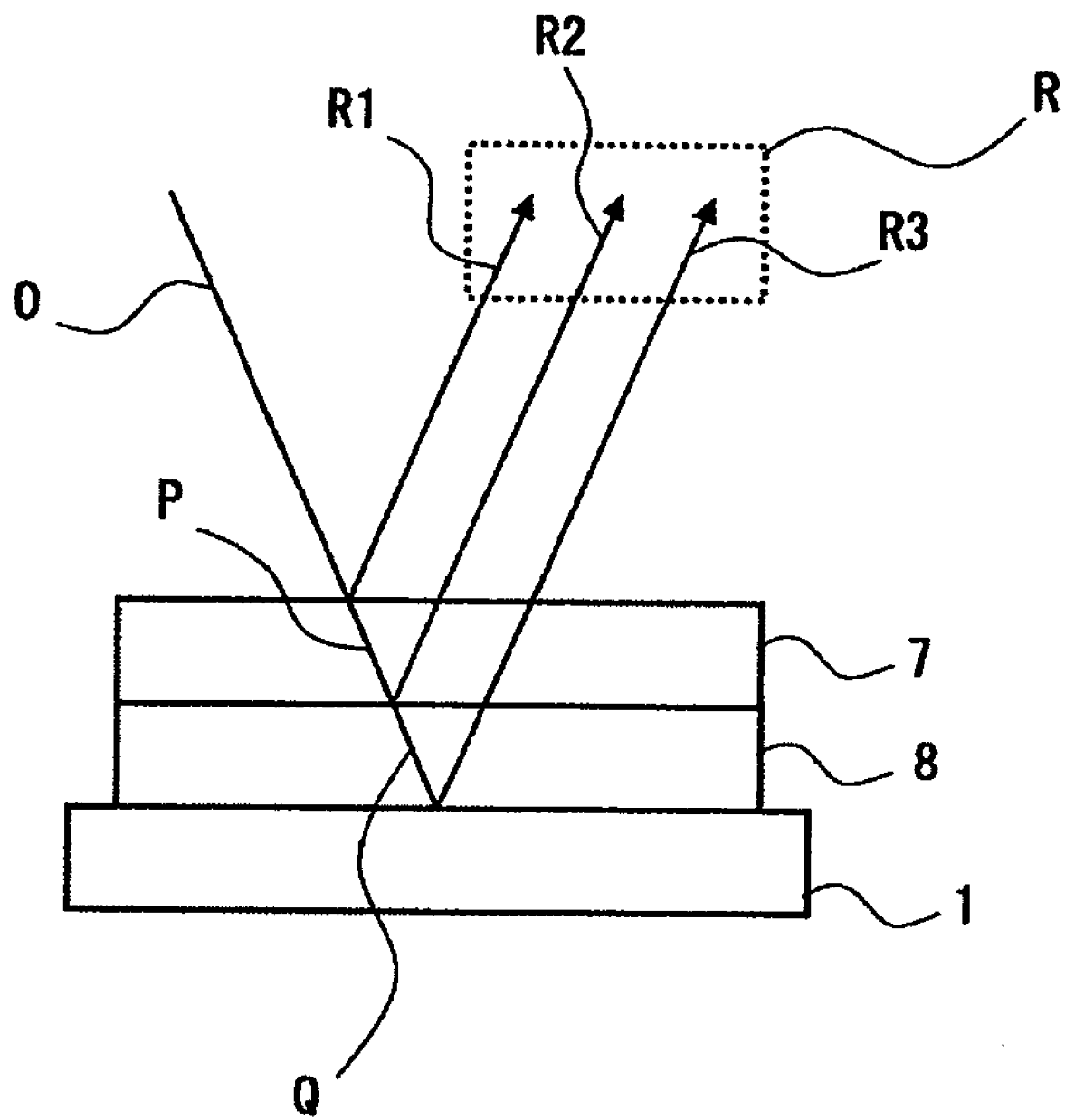
FIG. 43 is a sectional view to describe the principle of an antireflection coating of a sixth embodiment.

The optical component may be composed of any optical material that is transparent in a use band, including plastic such as polyolefin resin, cycloolefin resin, methacrylic resin and polycarbonate resin, optical glass such as quartz glass and borosilicate glass, oxide single crystal or polycrystal substrate such as $Al_2O_3$ and MgO, fluoride single crystal or polycrystal substrate such as $CaF_2$, $MgF_2$, $BaF_2$ and LiF, chlorides such as NaCl, KBr and KCl, and bromide single crystal or polycrystal substrate. The principle of the effect of the antireflection coating is described hereinafter with reference to FIG. 43. FIG. 43 is a sectional view schematically illustrating the objective lens 1 having a two-layer antireflection coating on its surface. The antireflection coating has a high refractive index layer 8 and a low refractive index layer 7.

Reflected light R when light O is incident on the objective lens 1 is described below. Though FIG. 43 expediently illustrates the light O incident on the objective lens obliquely, the light O is incident on the lens parallel to the optical axis of the objective lens 1. The light O first enters the low refractive index layer 7. The light O is divided into transmission light P and reflected light R1 at the surface of the low refractive index layer 7. Then, the transmission light P enters the high refractive index layer 8 through the low refractive index layer 7. At the boundary between the low refractive index layer 7 and the high refractive index layer 8, the transmission light P is divided into transmission light Q and reflected light R2. Then, the transmission light Q reaches the objective lens 1 through the high refractive index layer 8 and is reflected at the boundary between the high refractive index layer 8 and the objective lens 1 to become reflected light R3.

Though some light enters the objective lens 1 without becoming the reflected light R3 at the boundary between the high refractive index layer 8 and the objective lens 1, the description is omitted since it is not necessary to describe the reflected light R. Further, though the reflected light R2 includes component that is multiply reflected at a reflectance of about 5% on the upper and lower boundaries of the low refractive index layer 7, and the reflected light R3 includes component that is multiply reflected at a reflectance of about 5% on the upper and lower boundaries of the high refractive index layer. However, the intensity of the light of these components becomes as low as 0.25% or below after being reflected twice or more, and the description is also omitted here.

The reflected light R is synthesized light of the reflected light R1 to R3 shown in FIG. 43. Thus, the state of the reflected light R changes by a phase difference in the reflected light R1 to R3. The phase difference in the reflected light R1 and R2 is defined by the relationship of the objective lens 1, the refractive index $n_H$ of the high refractive index layer 8 and the refractive index $n_L$ of the low refractive index layer 7, and optical film thickness of the high refractive index layer 8 and the low refractive index layer 7, and the wavelength of the light O.

The basic principal is as follows. For example, the optical film thickness of the low refractive index layer 7 is one-fourth of the wavelength of the light O. In this case, the phase difference between the reflected light R1 and R2 corresponds to one-half the wavelength of the light O, and therefore the reflected light R1 and R2 cancel out each other. As a result, only the reflected light R3 becomes reflected light R. Thus, the light intensity ratio of the reflected light R3 with respect to the light O is reflectance in this wavelength region. On the other hand, if the wavelength of the light O is changed while keeping the conditions of the objective lens 1, the high refractive index layer 8 and the low refractive index layer 7, the reflected light R1 to R3 cancel out each other in some cases. The reflectance is low in this wavelength region.

Using this principle, if an antireflection coating that minimizes a reflectance in the vicinity of the wavelength region corresponding to the wavelength used for Blu-ray disk (about 405 nm) and in the vicinity of the wavelength region corresponding to the wavelength used for DVD (about 655 nm) while reducing a reflectance in the wavelength region corresponding to the wavelength used for CD (790 nm) is formed on the surface of the objective lens 1, it is possible to produce a high performance optical pickup apparatus compatible with the three kinds of optical media.

An example of simulation by setting the conditions for the objective lens 1, the high refractive index layer 8 and the low refractive index layer 7 based on the above principle is as follows. In the simulation and example described below, the film thickness $d_H$ of the high refractive index layer 8 and the film thickness $d_L$ of the low refractive index layer 7 are determined on the basis of one-fourth of a given wavelength (QW). The given wavelength corresponds to the wavelength of the light O shown in FIG. 43, and it is 500 nm in this embodiment. The value of $n_H d_H$ (optical film thickness of the high refractive index layer 8) is about 1 QW in this embodiment as in the description of FIG. 43, and the value of $n_L d_L$ (optical film thickness of the low refractive index layer 7) is about 2 QW. Thus, 225 nm$\leq n_H d_H \leq$275 nm and 100 nm$\leq n_L d_L \leq$150 nm.

FIGS. 44A to 44F show simulations of a change in the reflectance in the three kinds of wavelength regions accompanying a change in the refractive index of the high refractive index layer 8 with respect to the objective lens 1 and the low refractive index layer 7. The values of the reflectance in each wavelength region show a maximum reflectance in the wavelength 405±5 nm (hereinafter as $\lambda_1$), a maximum reflectance in the wavelength 655±20 nm (hereinafter as $\lambda_2$), and a minimum reflectance in the wavelength 790±20 nm (hereinafter as $\lambda_3$). $n_S$ represents a refractive index of an objective lens, $n_L$ represents a refractive index of a low refractive index layer, and $n_H$ represents a refractive index of a high refractive index layer.

Figure 45:
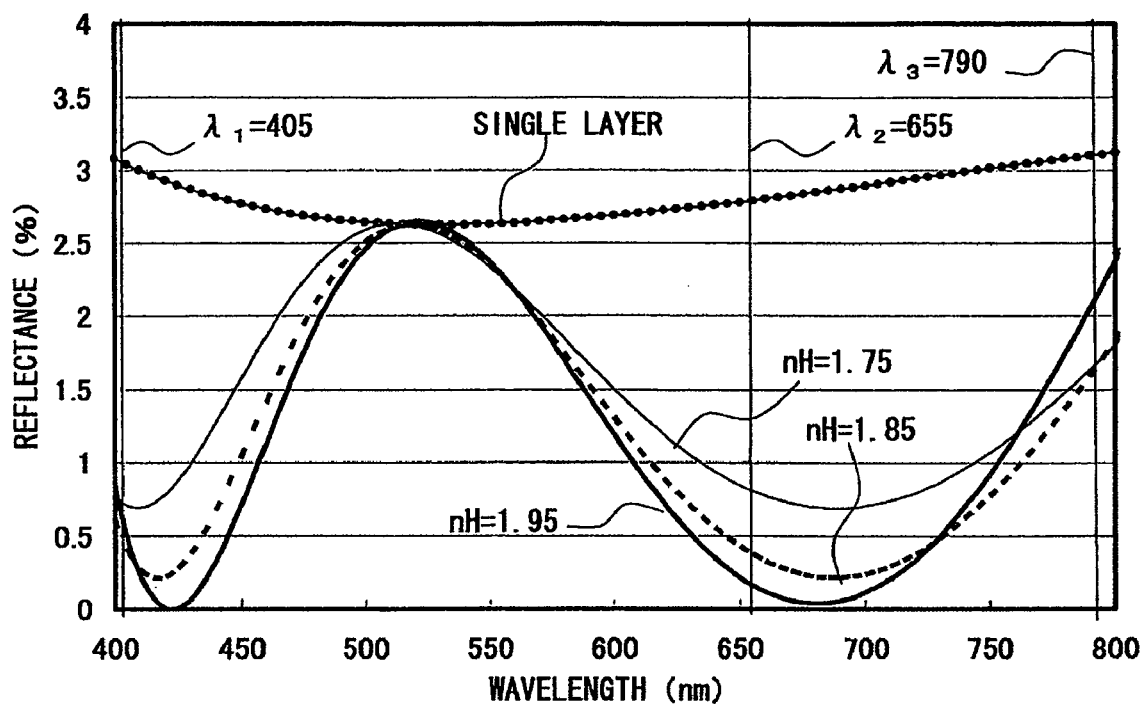
FIG. 45 is a graph showing a change in reflectance depending on wavelength in the simulation result of the sixth embodiment.

The table of FIG. 44A shows an example that uses APEL, which is a registered trademark of and manufactured by Mitsui Chemicals, Inc., as an objective lens and uses $SiO_2$ as a low refractive index layer. In the table, the data in the heavy lines indicates the most suitable simulation result. FIG. 45 shows the graph of the reflectance for each wavelength when $n_H$ is 1.75, 1.85, and 1.95 and in a single low refractive index layer under the conditions shown in the table of FIG. 44A. The reflectance value for the wavelength creates a curving line with two nodes having the minimum values in the vicinity of $\lambda_1$ and $\lambda_2$. The reflectance is low also in the vicinity of $\lambda_3$. Since the reflectance of a single APEL is 4.5%, the reflectance is reduced in a desired wavelength region by use of the antireflection coating. Further, a comparative example of the single low refractive index layer also shows that the reflectance is reduced for the three kinds of wavelength regions.

FIG. 44B shows a simulation where $n_S$=1.70 and the other conditions are the same as in FIG. 44A. Similarly, FIG. 44C shows a simulation where $n_S$=1.85. Since $n_H$ needs to be higher than $n_S$, an available lower limit of $n_H$ is higher than the case of $n_S$=1.54 and the amount of data decreases.

Figure 46:
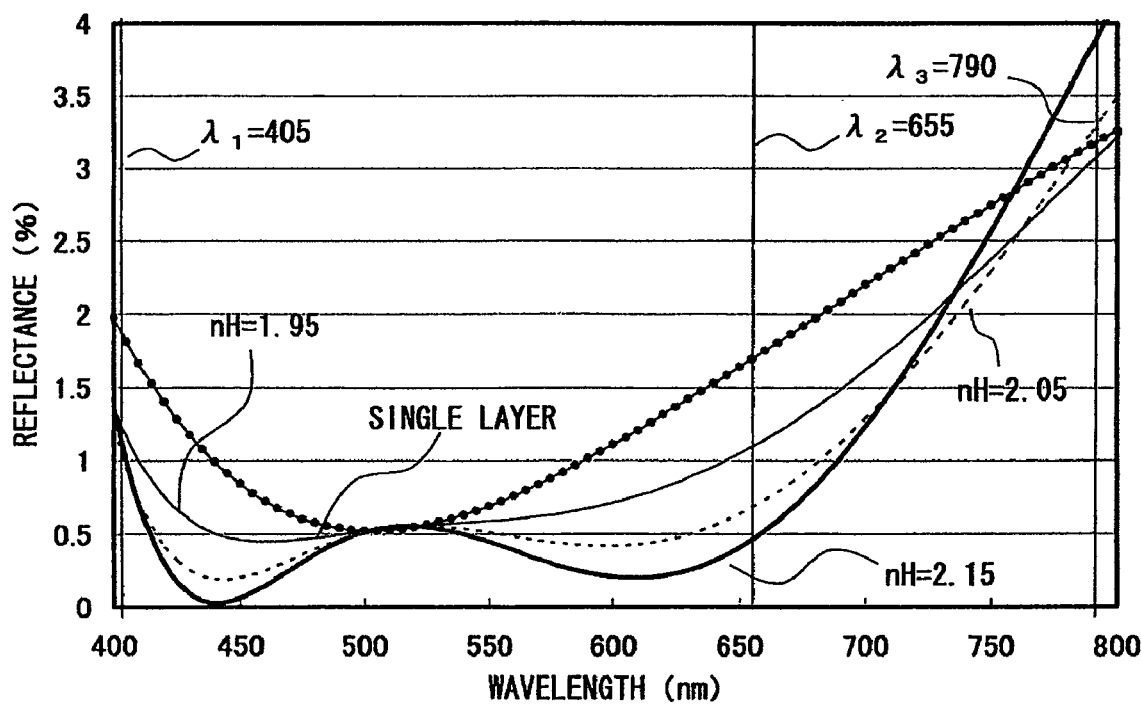
FIG. 46 is a graph showing a change in reflectance depending on wavelength in the simulation result of the sixth embodiment.

FIG. 46 shows the graph of reflectance for each wavelength under the conditions of FIG. 4C when $n_H$ is 1.95, 2.05, and 2.15 and in a single low refractive index layer. The reflectance for the wavelength has its minimum value in the vicinity of $\lambda_1$ and $\lambda_2$. However, compared to the curving line of FIG. 45, a change in reflectance in the wavelength region from $\lambda_2$ and $\lambda_3$ or higher is steep, and the reflectance is very high for $\lambda_3$. Since the reflectance of the objective lens 1 is 8.9% in FIG. 46, the reflectance is reduced by placing the antireflection coating.

Figure 47:
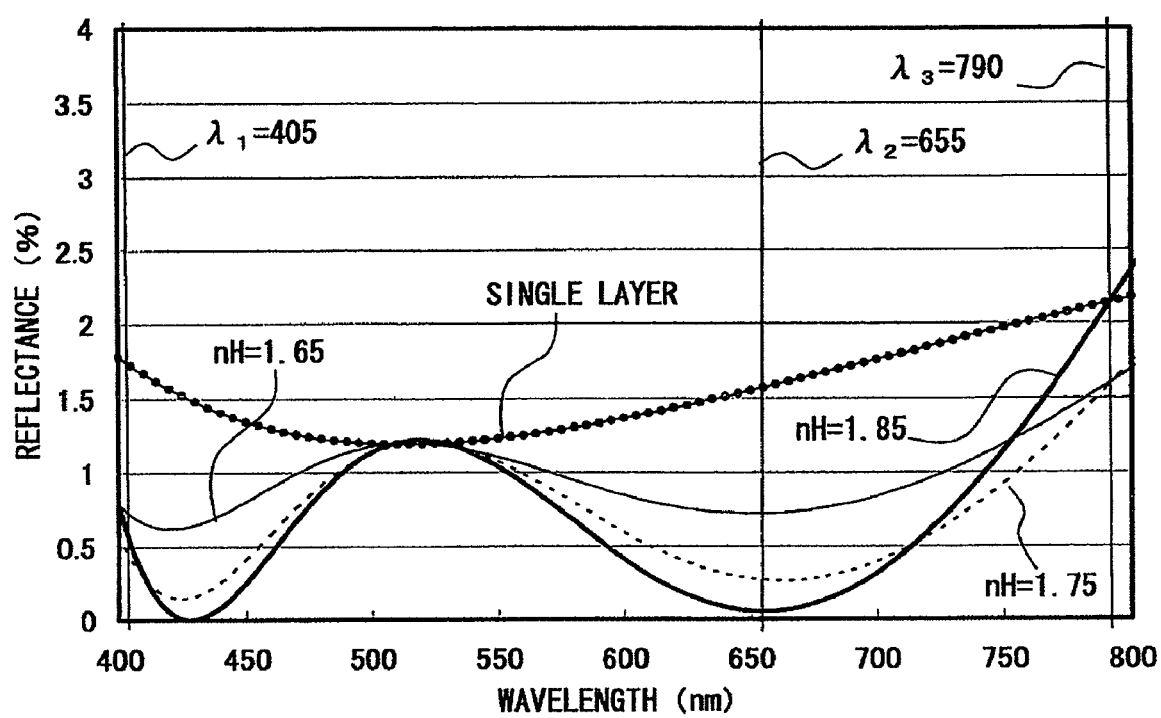
FIG. 47 is a graph showing a change in reflectance depending on wavelength in the simulation result of the sixth embodiment.

FIGS. 44D to 44F show the cases that uses $MgF_2$ for a low refractive index layer and $n_L=1.38$. The tables of FIGS. 44D to 44F show the simulations where $n_S$ is 1.54, 1.70, and 1.85. FIG. 46 shows the graph of the reflectance for each wavelength when $n_H$ is 1.65, 1.75, and 1.85 and in a single low refractive index layer under the conditions shown in the table of FIG. 44D. Just like in FIG. 45, the reflectance values for the wavelength are minimum in the vicinity of $\lambda_1$ and $\lambda_2$. However, compared to the curving line of FIG. 45, a change in reflectance in the wavelength region from $\lambda_2$ and $\lambda_3$ or higher is steep, and the reflectance is very high for $\lambda_3$. Since the reflectance of the objective lens 1 is 4.5% in FIG. 47, the reflectance is reduced by placing the antireflection coating.

In FIGS. 44A to 44F, the data in which the reflectance is higher than the case where the low refractive index layer is a single layer is indicated by gray color. Further, the cell containing the data in which the reflectance is higher than that of the single object lens is inverted. Thus, the value of $n_H$ including the gray-colored cell or the inverted cell is not suitable in terms of optical characteristics. FIGS. 44A to 44C has a gray cell where $n_H=2.15$, and FIGS. 44D to 44F has a gray cell where $n_H=1.95$.

The inventers of the present invention have found the relationship between the values of $n_S$, $n_H$, and $n_L$ by analyzing $n_H$ where a gray cell appears in the tables of FIG. 44A to 44F and an optimal $n_H$. Since the value of $n_H$ where a gray cell appears is close to the value of square of $n_L$, the upper limit of the optimal value of $n_H$ is expected to at least satisfy the condition of $n_H \leq n_L * n_L$. Further, since the value of $n_H$ needs to be higher than the value of $n_S$, it is expected to at least satisfy the condition of $n_S < n_H$.

Therefore, a minimum condition of optimal value of $n_H$ is: $n_S < n_H \leq n_L * n_L$. The value of optimal $n_H$ existing in this range can be given by $(a*n_S+b*n_L*n_L)/2$, where a and b are given constants. As a result of the simulations as shown in FIGS. 44A to 44F, the values of a and b are preferably in the range of: $1.00 \leq a \leq 1.4$ and $0.65 \leq b \leq 1.00$. The most suitable combination is a=1.21 and b=0.84, for example. If the optimal value of $n_H$ with respect to $n_S$ and $n_L$ is parameter A, $A=(1.21*n_S+0.84*n_L*n_L)/2$.

Figure 51:
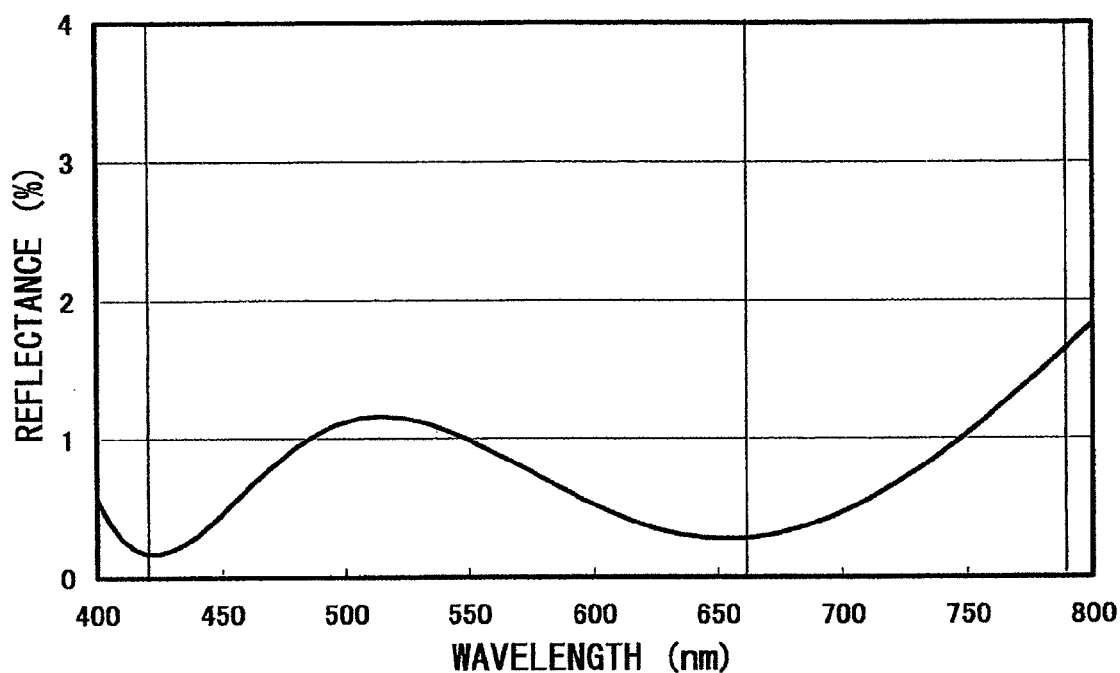
FIG. 51 is a graph showing an example 5 of the invention.
Figure 53:
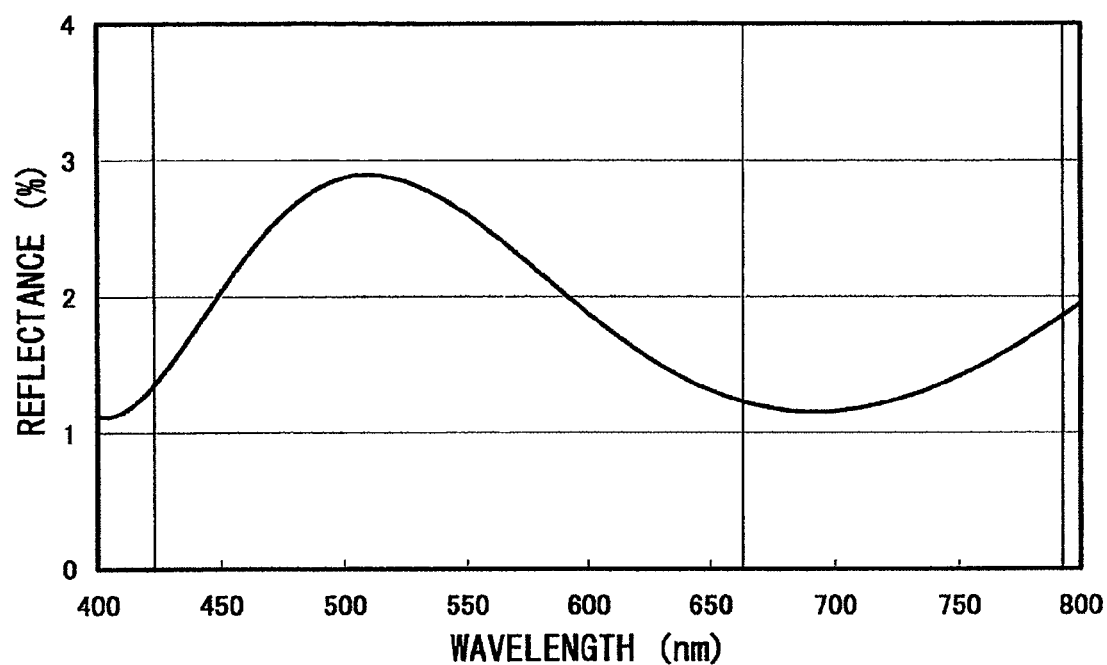
FIG. 53 is a graph showing an example 7 of the invention.

Further, as shown in the table of FIG. 51, if the value of $n_S$ increases, an effective range of $n_H$ decreases, making the reflectance in the vicinity of the wavelength 790 nm higher as shown in FIG. 53. Further, if the value of $n_S$ decreases, a usable object is limited. Therefore, the value of $n_S$ preferably satisfies: $1.46 \leq n_S \leq 1.65$. Similarly, if the value of $n_L$ increases, the maximum value of the reflectance between $\lambda_1$ and $\lambda_2$ becomes higher, which narrows down the bandwidth with a low reflectance. If the value of $n_L$ becomes less than 1.3, it is difficult to obtain a stable film formation material. Therefore, the value of $n_L$ preferably satisfies: $1.3 \leq n_L \leq 1.55$.

Specific examples are shown in consideration of these conditions. By depositing one of the three kinds of AR coats shown in the following examples 1, 2 and 3, it is possible to obtain relatively high transmittance characteristics in the three wavelengths described above. In addition, since the number of layers is as small as two, it is possible to provide the AR coating with relatively low costs. FIGS. 48A to 48C show design examples of these AR coats.

EXAMPLE 1

On a lens having a refractive index of 1.53, a mixed material of $Al_2O_3$ (n=1.68) and $ZrO_2$ (n=2.07) having a refractive index of 1.85 with the thickness of 135.1 nm (optical film thickness $\lambda/2$) and $SiO_2$ having a refractive index of 1.46 with the thickness of 85.5 nm (optical film thickness $\lambda/4$) are coated. A reference wavelength of an AR coat optical film thickness is 500 nm.

EXAMPLE 2

On a lens having a refractive index of 1.53, $Y_2O_3$ having a refractive index of 1.80 with the thickness of 139 nm (optical film thickness $\lambda/2$) and $SiO_2$ having a refractive index of 1.46 with the thickness of 85.5 nm (optical film thickness $\lambda/4$) are coated. A reference wavelength of an AR coat optical film thickness is 500 nm.

EXAMPLE 3

On a lens having a refractive index of 1.53, SiN having a refractive index of 2.04 with the thickness of 122.5 nm (optical film thickness $\lambda/2$) and $SiO_2$ having a refractive index of 1.46 with the thickness of 85.5 nm (optical film thickness $\lambda/4$) are coated. A reference wavelength of an AR coat optical film thickness is 500 nm.

Figure 49A:
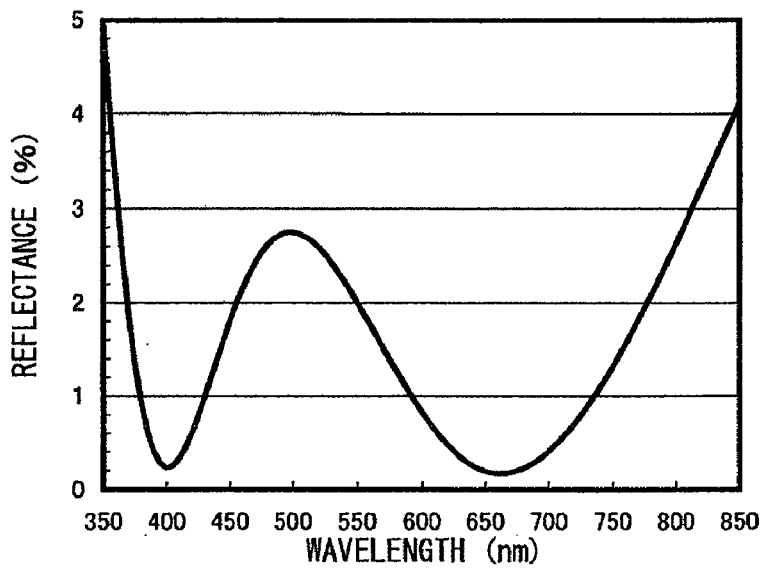
FIGS. 49A to 49C are graphs showing the spectral transmittance characteristics per one lens surface by the AR coat.
Figure 49B:
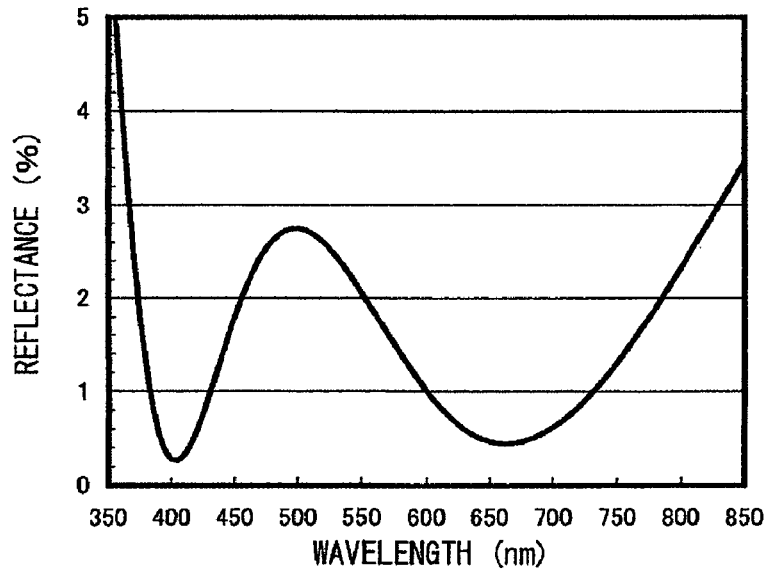
Figure 49C:
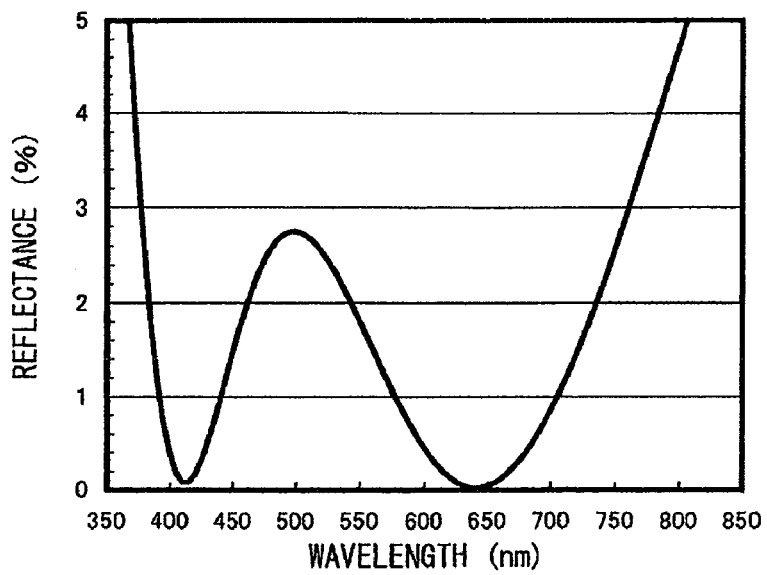

FIGS. 49A to 49C show the spectral reflectance characteristics per one lens surface by the AR coating of Examples 1 to 3. The tables of FIGS. 49A to 49C correspond to Examples 1, 2, and 3, respectively. As shown in the graphs, the reflectance decreases in the wavelength regions of around 405 nm and from 650 nm to 790 nm in any of FIGS. 49A to 49C.

Examples shown in FIGS. 48A and 48B satisfy the conditions of $0.9 \leq n_H/A \leq 1.1$ and $0.1 \leq n_H-n_S$ and the condition of $n_H-n_S \leq 0.4$. Specifically, in FIG. 48A, $n_L$ is 1.46, $n_H$ is 1.85, $n_S$ is 1.53, A is 1.82, $n_L d_L$ is 125 nm, $n_H d_H$ is 250 nm, $n_H/A$ is 1.0, $n_H-n_S$ is 0.32. In FIG. 48B, $n_L$ is 1.46, $n_H$ is 1.80, $n_S$ is 1.53, A is 1.821, $n_L d_L$ is 125 nm, $n_H d_H$ is 250 nm, $n_H/A$ is 1.0, $n_H-n_S$ is 0.27. In FIG. 48C, $n_L$ is 1.46, $n_H$ is 2.04, $n_S$ is 1.53, A is 1.82, $n_L d_L$ is 125 nm, $n_H d_H$ is 250 nm, $n_H/A$ is 1.1, $n_H-n_S$ is 0.51.

Figure 50:
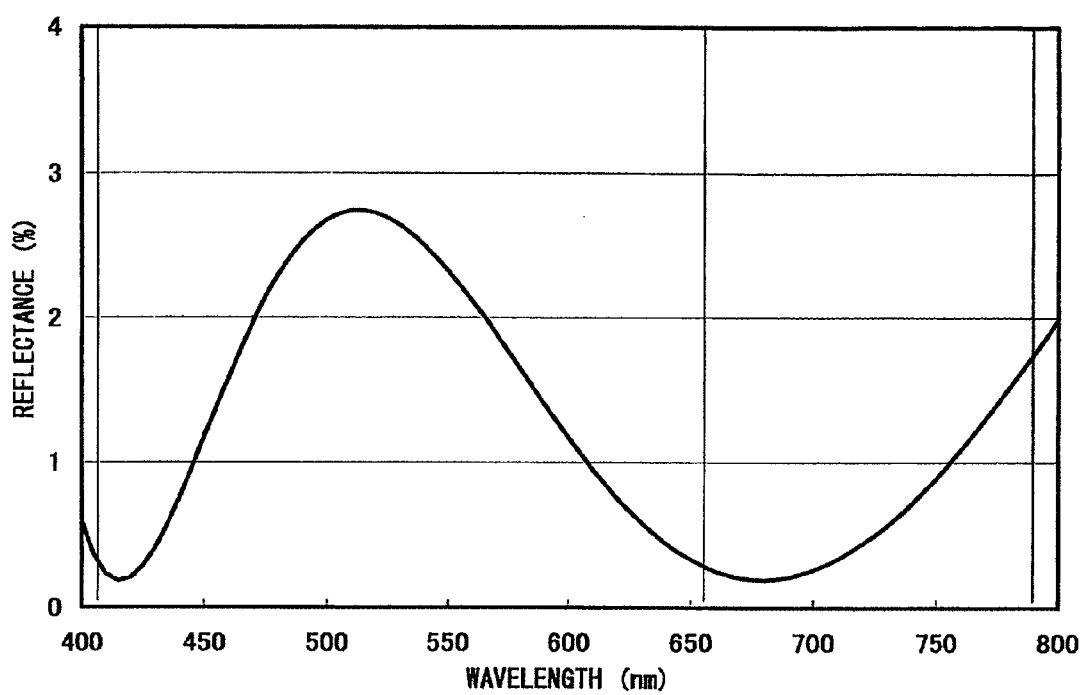
FIG. 50 is a graph showing an example 4 of the invention.

FIG. 50 shows Example 4 that uses ZEONEX, which is a registered trademark of and manufactured by ZEON CORPORATION, for the objective lens 1, a mixed film of $Al_2O_3$ and $ZrO_2$ for the high refractive index layer 8, and $SiO_2$ for the low refractive index layer 7. In this case, $n_S$ is 1.525, $n_H$ is 1.83, $n_L$ is 1.46, and A is 1.818. Further, $n_H d_H$ is 256.3 nm and $n_L d_L$ is 129.3 nm. As shown in FIG. 50, the reflectance for each wavelength is lowest in the vicinity of $\lambda_1$ and $\lambda_2$. Further, it is also as low as 3% or lower at $\lambda_3$. Thus, this example produces a suitable antireflection coating.

FIG. 51 shows Example 5 that uses APEL for the objective lens 1, MgO for the high refractive index layer 8, and $MgF_2$ for the low refractive index layer 7. In this case, $n_S$ is 1.54, $n_H$ is 1.74, $n_L$ is 1.38, and A is 1.732. Further, $n_H d_H$ is 260.1 nm and $n_L d_L$ is 126.3 nm. As shown in FIG. 51, the reflectance for each wavelength is lowest in the vicinity of $\lambda_1$ and $\lambda_2$. Further, it is also as low as 3% or lower at $\lambda_3$. Thus, this example produces a suitable antireflection coating.

Figure 52:
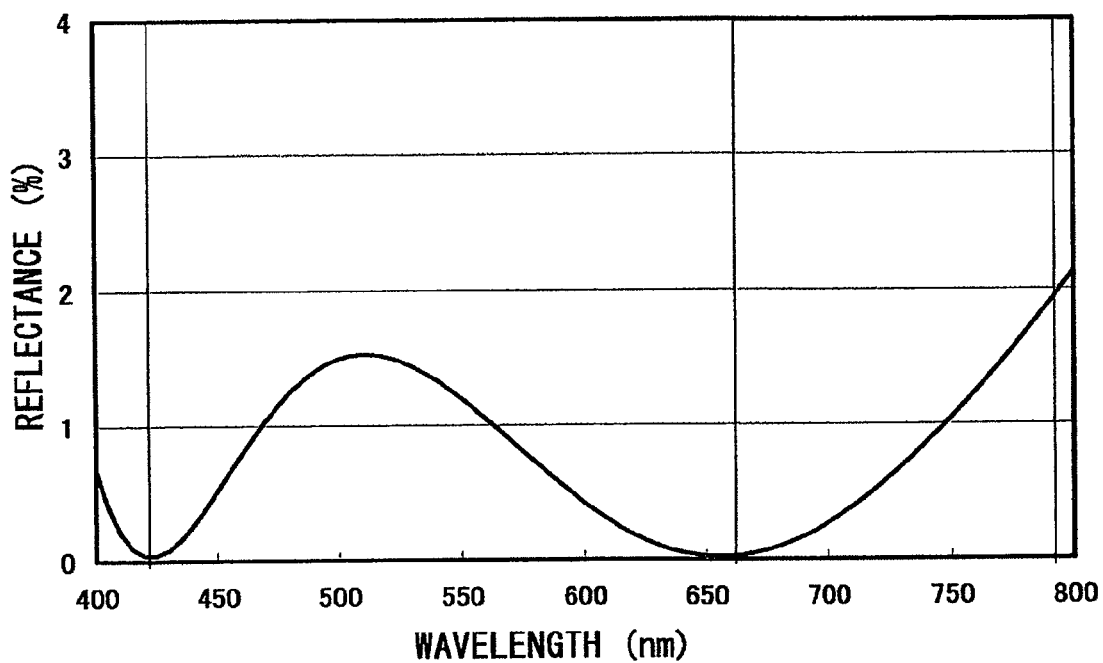
FIG. 52 is a graph showing an example 6 of the invention.

FIG. 52 shows Example 6 that uses polymethyl methacrylate (PMMA) for the objective lens 1, $Y_2O_3$ for the high refractive index layer 8, and $MgF_2$ for the low refractive index layer 7. In this case, $n_S$ is 1.49, $n_H$ is 1.78, $n_L$ is 1.38, and A is 1.701. Further, $n_H d_H$ is 253.8 nm and $n_L d_L$ is 129.8 nm. As shown in FIG. 52, the reflectance for each wavelength is lowest in the vicinity of $\lambda_1$ and $\lambda_2$. Further, it is also as low as 3% or lower at $\lambda_3$. Thus, this example produces a suitable antireflection coating.

FIG. 53 shows Example 7 that uses ARTON, which is a registered trademark of and manufactured by Japan Synthetic Rubber Co., Ltd., for the objective lens 1, $Y_2O_3$ for the high refractive index layer 8, and $SiO_2$ for the low refractive index layer 7. In this case, $n_S$ is 1.51, $n_H$ is 1.78, $n_L$ is 1.46, and A is 1.809. Further, $n_H d_H$ is 258.1 nm and $n_L d_L$ is 123.9 nm. As shown in FIG. 53, the reflectance for each wavelength is lowest in the vicinity of $\lambda_1$ and $\lambda_2$. Further, it is also as low as 3% or lower at $\lambda_3$. Thus, this example produces a suitable antireflection coating. In this example, the value of the parameter A is greater than the value of $n_H$. The minimum values of reflectance in the vicinity of $\lambda_1$ and $\lambda$ is also higher, which shows a change due to a difference between the value of $n_H$ and the value of the parameter A becomes large.

Figure 54:
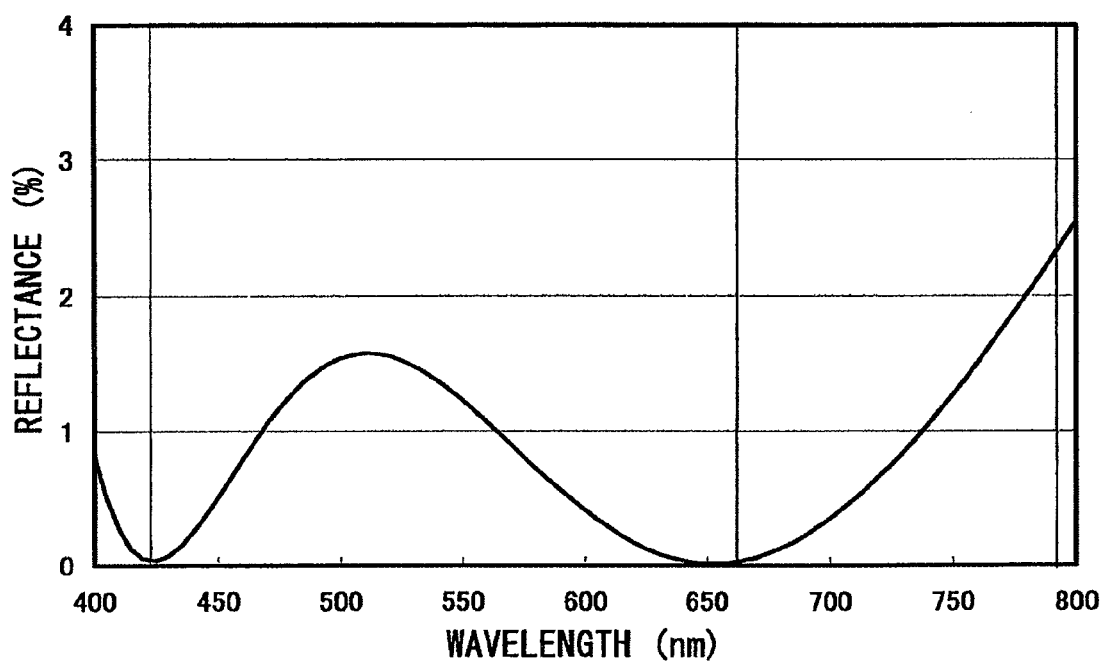
FIG. 54 is a graph showing an example 8 of the invention.

FIG. 54 shows Example 8 that uses PMMA for the objective lens 1, a mixed film of $Al_2O_3$ and $ZrO_2$ for the high refractive index layer 8, and $MgF_2$ for the low refractive index layer 7. In this case, $n_S$ is 1.49, $n_H$ is 1.83, $n_L$ is 1.38 and A is 1.756. Further, $n_H d_H$ is 250.3 nm and $n_L d_L$ is 132.6 nm. As shown in FIG. 54, the reflectance for each wavelength is lowest in the vicinity of $\lambda_1$ and $\lambda_2$. Further, it is also as low as 3% or lower at $\lambda_3$. Thus, this example produces a suitable antireflection coating. In this example, the value of the parameter A is smaller than the value of $n_H$. Though a difference between the value of $n_H$ and the value of the parameter A is larger than in Examples 4 to 7, it shows that this difference still allows formation of a suitable antireflection coating.

Figure 55:
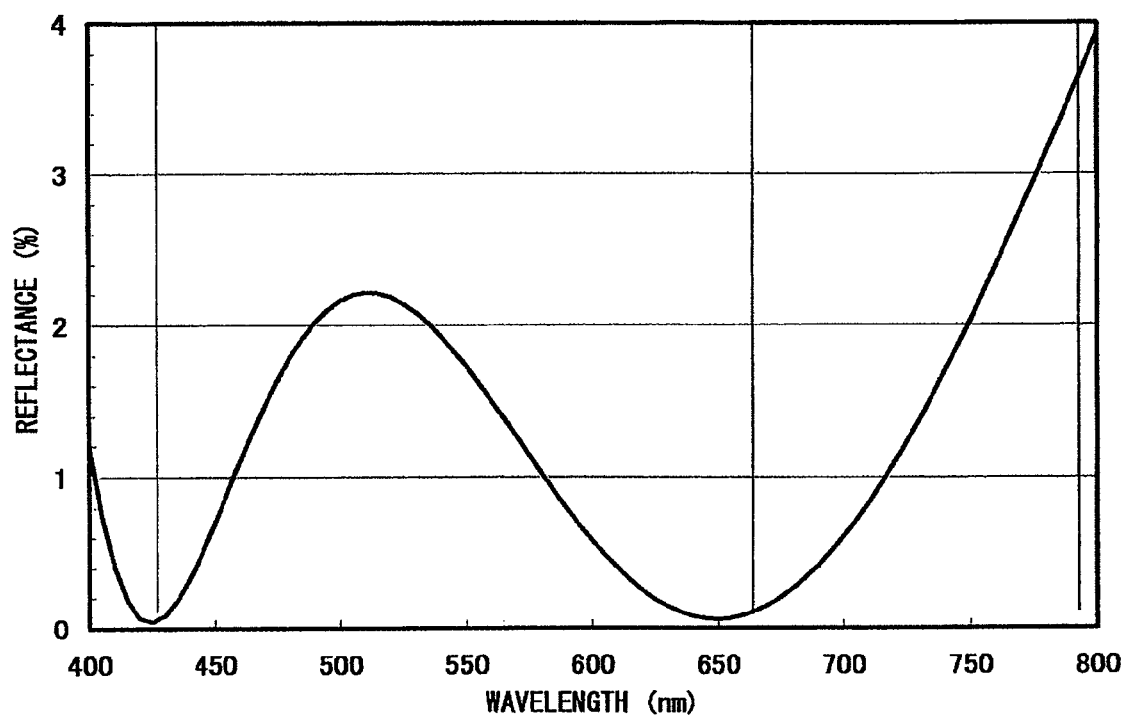
FIG. 55 is a graph showing a comparative example 1 of the invention.

As a comparative example, a case that is to be eliminated if $n_H$ is defined by a parameter A of this embodiment within a range defined as a two-layer antireflection coating. FIG. 55 is Comparative Example 1 that uses PC for the objective lens 1 and $ZrO_2$ for the high refractive index layer 8, and $SiO_2$ for the low refractive index layer 7. In this case, $n_S$ is 1.58, $n_H$ is 2.05, $n_L$ is 1.46 and A is 1.851. Further, $n_H d_H$ is 248.8 nm and $n_L d_L$ is 132.8 nm. As shown in FIG. 55, the reflectance for each wavelength is lowest in the vicinity of $\lambda_1$ and $\lambda_2$. However, the reflectance is high at $\lambda_3$, exceeding 3%. Thus, though it may be used as an antireflection coating, it is not suitable.

Figure 56:
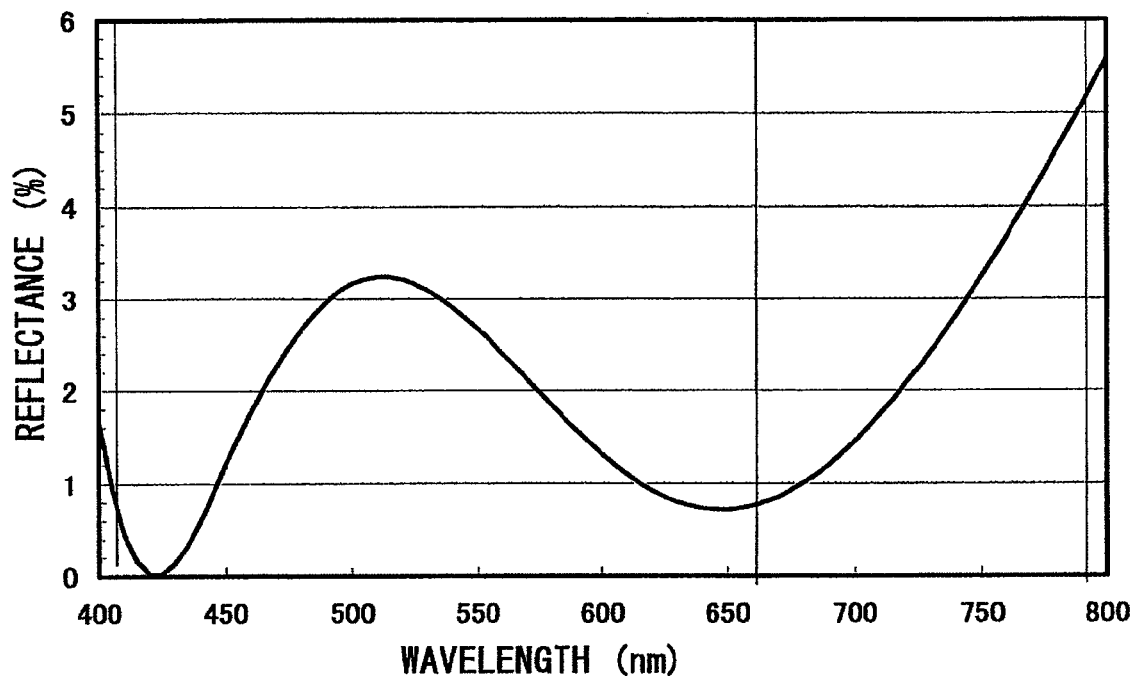
FIG. 56 is a graph showing a comparative example 2 of the invention.

FIG. 56 is Comparative Example 2 that uses ZEONEX for the objective lens 1 and $Ta_2O_5$ for the high refractive index layer 8, and $SiO_2$ for the low refractive index layer 7. In this case, $n_S$ is 1.525, $n_H$ is 2.14, $n_L$ is 1.46 and A is 1.818. Further, $n_H d_H$ is 242.2 nm and $n_L d_L$ is 137.0 nm. As shown in FIG. 56, the reflectance for each wavelength is lowest in the vicinity of $\lambda_1$ and $\lambda_2$. However, the reflectance is high at $\lambda_3$, exceeding 5%. Thus, the optical characteristics for $\lambda_3$, is unfavorable and it is not suitable as an antireflection coating compatible with three wavelengths.

Figure 57:
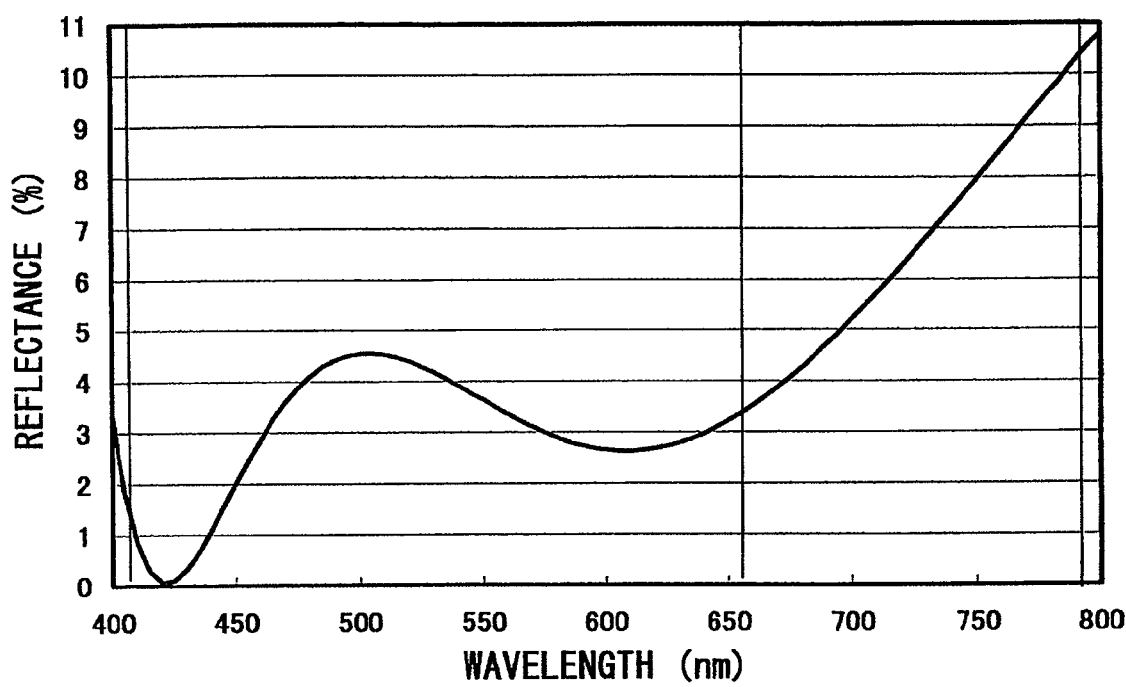
FIG. 57 is a graph showing a comparative example 3 of the invention.

FIG. 57 is Comparative Example 3 that uses BK7 for the objective lens 1 and $TIO_2$ for the high refractive index layer 8, and $SiO_2$ for the low refractive index layer 7. In this case, $n_S$ is 1.52, $n_H$ is 2.30, $n_L$ is 1.46 and A is 1.815. Further, $n_H d_H$ is 226.0 nm and $n_L d_L$ is 136.0 nm. As shown in FIG. 57, the reflectance for each wavelength is lowest in the vicinity of $\lambda_1$ and $\lambda_2$. However, the lowest value at $\lambda_2$ is 2.5% or more, and the value corresponding to $\lambda_2$ exceeds 3%. Further, the reflectance exceeds 10% at $\lambda_3$. Thus, it is not suitable not only as an antireflection coating compatible with three wavelengths but also as an antireflection coating compatible with two wavelengths.

FIGS. 58A and 58B show the table on the characteristics in Examples and Comparative Examples. FIGS. 58A and 58B show the values of $n_S$, $n_H$, and $n_L$ in Examples 4 to 8 and Comparative Examples 1 to 3, the value of parameter A, the ratio of $n_H$ and parameter A, the reflectance value in $\lambda_1$, $\lambda_2$, and $\lambda_3$ and each analysis value of the optical characteristics. The reflectance for each $\lambda$ indicates the average value of the reflectance in each region of $\lambda$. If the reflectance exceeds 3%, the cell is gray-colored.

As shown in FIG. 58A, the reflectance for each A in Examples 4 to 8 is 2.5% at the highest, which is a generally suitable value. In Comparative Examples 1 to 3, on the other hand, data shown by gray cell appears mainly for $\lambda_3$, and the optical characteristics are not suitable in terms of antireflection coating compatible with three wavelengths.

The optical characteristics of Examples and Comparative Examples are analyzed in further detail below. FIG. 58B shows analytic values calculated from $n_S$, $n_H$, and $n_L$ in each Example and Comparative Example. While the value of $n_H/A$ is within the range of 1±0.1 in Examples 4 to 8, it is 1.11 or higher in Comparative Examples 1 to 3. Thus, the condition of $0.9 \leq n_H/A \leq 1.1$ can be defined. Further, the value of $n_H - n_S$ is higher in Comparative Examples 1 to 3 than in Examples 4 to 8. Thus, the relationship of $n_H$ and $n_S$ satisfies preferably $0.1 \leq n_H - n_S \leq 0.4$ and more preferably $0.1 \leq n_H - n_S \leq 0.35$.

FIG. 58B also shows reflectance average values and standard deviations of the wavelengths $\lambda_1$, $\lambda_2$, and $\lambda_3$. The lower the average value is, the lower the reflectance in each $\lambda$. The lower the standard deviation is, the smaller the variation in reflectance in each $\lambda$. Therefore, if both the reflectance average and standard deviation are low, it means that the reflectance in each $\lambda$ is low and stable, which is a suitable example. FIG. 58B further shows an average of square sum of reflectance as a determination value. The determination value is 2.11 at the highest in Examples 4 to 8, and it is thus as low as 3.0 or below. On the other hand, the determination value is as high as 4.5 or greater in Comparative Examples 1 to 3. Therefore, the determination value is preferably 3.0 or below and more preferably 2.5 or below.

The reflectance in $\lambda_3$ mainly affects the standard deviation. As shown in the graphs of the reflectance corresponding to each wavelength in Examples 4 to 8 and Comparative Examples 1 to 3, the reflectance in $\lambda_1$, and $\lambda_2$ is relatively low in Comparative Example 1 and 2 as well. Thus, no problem occurs if it is used as an antireflection coating for two wavelengths. However, a change in reflectance is steep in the wavelength region of $\lambda_2$ and $\lambda_3$ in Comparative Examples 1 to 3, a reflectance in $\lambda_3$ is high. Thus, analysis of standard deviation of reflectance in $\lambda_1$ to $\lambda_3$ allows verification of suitability. Further, use of a square sum as a determination value enables to reflect the effect of $\lambda_3$ accurately.

The analytical result shown in FIG. 58B tells that, when forming a three-wavelength antireflection coating of two layers composed of the high refractive index layer 8 and the low refractive index layer 7 in the objective lens 1, it is possible to form a suitable a three-wavelength antireflection coating by defining a parameter A of $A=(1.21*n_S+0.84*n_L*n_L)/2$ and selecting each member so as to satisfy the condition of $0.1 \leq n_H - n_S \leq 0.4$.

As described in the foregoing, the present invention can provide an antireflection coating which is composed of two layers and which makes reflectance low in three kinds of wavelength regions, and an optical pickup component.

Since the antireflection coating of this invention has a two-layer structure, it is possible to reduce a coating deposition time compared to a coating having a three of more layer structure, thereby reducing harmful effects such as thermal deformation of a deposition surface.

Particularly, it is effective to use a low malting glass with a low melting point and thermal deformation temperature (Tg=288° C. such as K-PG325 manufactured by SUMITA optical glass for the antireflection coating of this invention in order to prevent deformation of a lens surface when depositing a coating. Further, the antireflection coating exerts its maximum effect when it is coated on both surfaces or one surface of a lens compatible with three wavelengths used in the first and the second embodiments of the invention.

By using the parameter A described in the above embodiments, it is possible to form a selection system of each member in a three wavelength antireflection coating compose of two layers. This system at least includes a condition input section, a calculation section, a result display section, a material storage section, and a control section. If the condition input section inputs one or two of $n_S$, $n_H$, $n_L$, the calculation section calculates a suitable value for the rest of values based on the parameter A and the condition of $n_H$–$n_S$, and selects a suitable material from the materials stored in the material storage section. The control section executes these processing.

It is normally difficult to calculate suitable values for the rest of variables by specifying only one of three variables. However, with addition of the condition of selecting one from the material stored in the material storage section, it is possible to select suitable values for the remaining two variables by specifying one of thee variables.

As described above, the present invention can focus all light beams on a desired position with possibly lowest aberration, with NA necessary for recording or reproducing by refraction without using a diffraction lens structure, for three or more kinds of optical disks that record or reproduce data with different wavelengths.

Further, the lens of this invention is applicable to a multi-wavelength optical system using a plurality of monochromatic light and an optical system using different wavelengths in optical communication or the like.

Optical Head Structure 1

Figure 59:
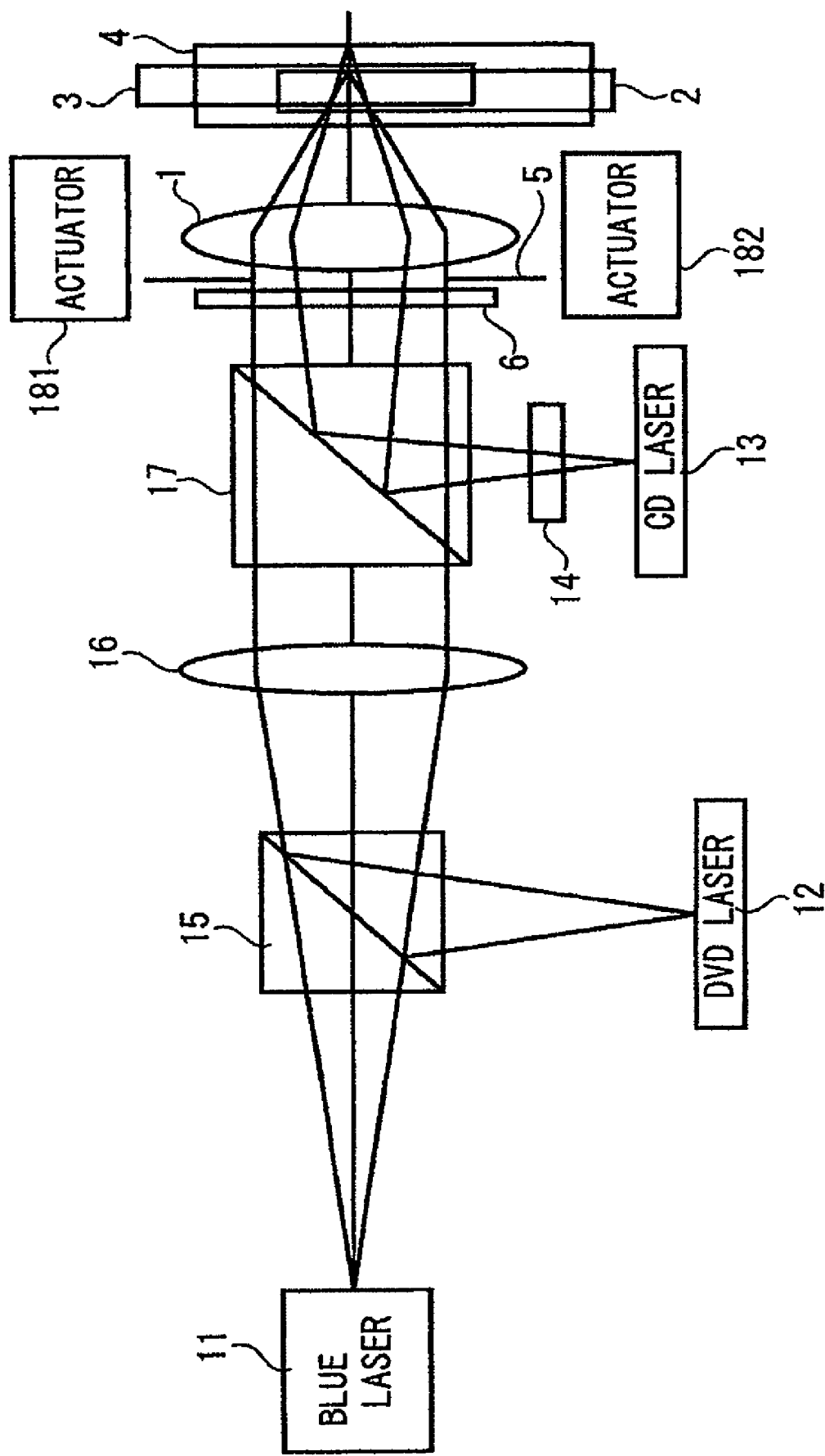
FIG. 59 is a pattern diagram showing an example of the structure of an optical head of the invention.

FIG. 59 shows an example of the structure of an optical head using the objective lens according to the present invention. FIG. 59 corresponds to the optical system for HDDVD (405 nm) disk shown in the first embodiment. As shown in FIG. 59, an optical head 10 of this embodiment has a Blue laser 11, a DVD laser 12, a CD laser 13, a linear diffraction grating 14 for 3 spots, a half prism 15, a collimator lens 16, a half prism 17, and actuators 181 and 182. In FIG. 59, the same elements as in FIG. 3 are denoted by the same reference symbols.

In FIG. 59, when recording or reproducing the DVD disk 2, the DVD laser 12 is driven. A laser beam of the 655 nm wavelength generated in the DVD laser 12 is reflected by the half-prism 15 and enters the collimator lens 16. The laser beam becomes parallel light after passing through the collimator lens 16. The laser beam transmits through the half prism 17, and then transmits through the wavelength selective filter 6. The transmitted light then enters the objective lens 1 and is focused at NA 0.63 to form an optical spot on an information recording surface of the DVD disk 3. Then, the light reflected by the DVD disk 3 becomes parallel light at the objective lens 1 and enters the collimator lens 16.

The parallel light becomes convergent light in the collimator lens 16 and then reaches a light detector (not shown). A detection output signal from the light detector is supplied to a signal processing circuit (not shown), thereby creating an information recording and reproducing signal, focus error signal, and tracking error signal. After that, a system control circuit (not shown) controls an actuator drive circuit (not shown) to drive the actuators 181 and 182 so as to place the objective lens 1 in an appropriate focus position and tracking position based on the obtained focus error signal and tracking error signal.

When recording or reproducing the HDDVD disk 1, the Blue laser 11 is driven. A laser beam of the 405 nm wavelength generated in the Blue laser 11 transmits through the half prism 15. The transmitted laser beam enters the collimator lens 16 and becomes parallel light after transmitting through the collimator lens 16. The parallel light is then focused on an information recording surface of the HDDVD disk 1 at NA 0.65 to form an optical spot as is the case with the DVD described above.

The focused light reaches a light detector (not shown) A detection output signal from the light detector is supplied to a signal processing circuit (not shown), thereby creating an information recording and reproducing signal, focus error signal, and tracking error signal. After that, a system control circuit (not shown) controls an actuator drive circuit (not shown) to drive the actuators 181 and 182 so as to place the objective lens 1 in an appropriate focus position and tracking position based on the obtained focus error signal and tracking error signal.

When recording or reproducing the CD disk 4, the CD laser 13 is driven. A laser beam of the 795 nm wavelength generated in the CD laser 13 transmits through the linear diffraction grating 14, is reflected by the half prism 17 and enters the wavelength selective filter 6. The inner side of the wavelength selective filter 6 is the entire light transmitting area 61, and the outer side lets the light passing through the inner side of the light shielding area 62 transmit through as shown in FIG. 4. The transmission light enters the objective lens 1 and is focused with NA0.47 to form an optical spot on the information recording surface of the CD disk 4.

The light reflected by the CD disk 4 becomes convergent light by the objective lens 1 and reaches a light detector (not shown). A detection output signal from the light detector is supplied to a signal processing circuit (not shown), thereby creating an information recording and reproducing signal, focus error signal, and tracking error signal. To obtain the tracking error signal for the CD disk 3, the laser beam from the CD laser 12 is separated into oth order light and $\pm 1^{st}$ order light by the diffraction grating 18, thus obtaining the tracking error signal from the $\pm 1^{st}$ order light Then, based on the focus error signal and tracking error signal thus obtained, the actuators 181 and 182 are driven so as to place the objective lens 1 in an appropriate focus position and tracking position.

Though the optical detector is not shown in FIG. 59, a laser and an optical detector may be placed in one package of a laser, for example. Alternatively, another half prism or the like may be placed so that the reflected light from the disc enters the optical detector placed in a different position from the laser. Further, since parallel light, which is infinite, is incident on the objective lens in HDDVD (405 nm) and DVD (655 nm) and the reflected light from the disk is both parallel light, it is possible to use the same optical detector, for example.

Further, since the CD light is finite, it is difficult to use the same detector as HDDVD and DVD in a normal optical arrangement and an optical detector for CD is required. Therefore, it is possible to place a diffraction grating that functions as a diffraction grating only for the wavelength of about 790 nm and allows the reflected light from the CD disk to enter the same optical detector as HDDVD and DVD, for example.

The collimator lens 16 is not always necessary, and the present invention is also applicable to an optical system of a so-called finite system. Further, it is possible to place a laser in a position farther away from a focal position of parallel light of the collimator lens 16 so as to makes incident light to the objective lens convergent light.

Optical Head Structure 2

Figure 60:
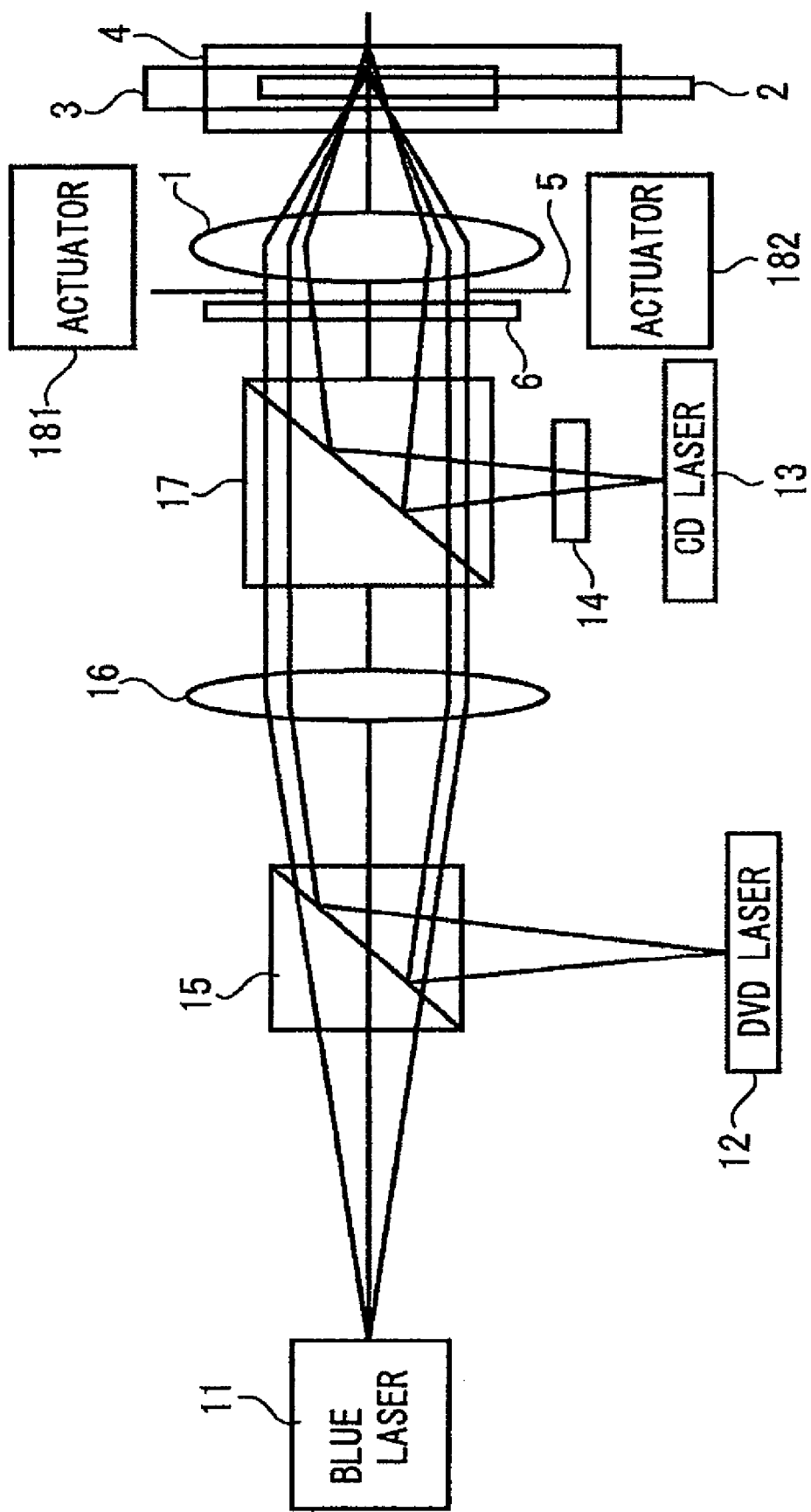
FIG. 60 is a pattern diagram showing another example of the structure of an optical head of the invention.

FIG. 60 shows an example of the structure of an optical head using the objective lens according to the present invention. FIG. 60 corresponds to the optical pickup system for Blu-ray shown in the second embodiment. The structure of the optical head shown in FIG. 60 is similar to the optical system arrangement of HDDVD shown in FIG. 59.

In FIG. 60, when recording or reproducing the DVD disk 3, the DVD laser 12 is driven. A laser beam of the 655 nm wavelength generated in the DVD laser 12 is reflected by the half-prism 15 and enters the collimator lens 16. The laser beam becomes parallel light after passing through the collimator lens 16. The laser beam transmits through the half prism 17, and then transmits through the wavelength selective filter 6. The transmitted light then enters the objective lens 1 and is focused at NA 0.60 to form an optical spot on an information recording surface of the DVD disk 3.

The parallel light entering the objective lens 1 is the light with NA0.8 or higher. As shown in the second embodiment, the Blu-ray exclusive area exists in the outer area of the objective lens 1 in the light source side. Therefore, if DVD light of 655 nm is incident, the light transmitting through the Blu-ray exclusive use area becomes DVD flare, which does not contribute to image formation nor optical spot formation on the DVD disk. Therefore, the optical spot substantially equal to NA 0.60 is formed on the DVD disk 3.

The light reflected by the DVD disk 3 becomes parallel light by the objective lens 1 and enters the collimator lens 16. The collimator lens 16 changes the parallel light into convergent light and the light reaches an optical detector (not shown). A detection output signal from the light detector is supplied to a signal processing circuit (not shown), thereby creating an information recording and reproducing signal, focus error signal, and tracking error signal. After that, a system control circuit (not shown) controls an actuator drive circuit (not shown) to drive the actuators 181 and 182 so as to place the objective lens 1 in an appropriate focus position and tracking position based on the obtained focus error signal and tracking error signal.

When recording or reproducing the Blu-ray disk 1, the Blue laser 11 is driven. A laser beam of the 405 nm wavelength generated in the Blue laser 11 transmits through the half prism 15. The transmitted laser beam enters the collimator lens 16 and becomes parallel light after transmitting through the collimator lens 16. The parallel light is then focused on an information recording surface of the Blu-ray disk 1 at NA 0.65 to form an optical spot as is the case with the DVD described above.

The focused light reaches a light detector (not shown) A detection output signal from the light detector is supplied to a signal processing circuit (not shown), thereby creating an information recording and reproducing signal, focus error signal, and tracking error signal. After that, a system control circuit (not shown) controls an actuator drive circuit (not shown) to drive the actuators 181 and 182 so as to place the objective lens 1 in an appropriate focus position and tracking position based on the obtained focus error signal and tracking error signal.

When recording or reproducing the CD disk 4, the CD laser 13 is driven. A laser beam of the 790 nm wavelength generated in the CD laser 13 transmits through the linear diffraction grating 14, is reflected by the half prism 17 and enters the wavelength selective filter 6. The inner side of the wavelength selective filter 6 is the entire light transmitting area 61, and the outer side lets the light passing through the inner side of the light shielding area 62 transmit through as shown in FIG. 4. The transmission light enters the objective lens 1 and is focused with NA0.47 to form an optical spot on the information recording surface of the CD disk 4.

The light reflected by the CD disk 4 becomes convergent light by the objective lens 1 and reaches a light detector (not shown). A detection output signal from the light detector is supplied to a signal processing circuit (not shown), thereby creating an information recording and reproducing signal, focus error signal, and tracking error signal. To obtain the tracking error signal for the CD disk 3, the laser beam from the CD laser 12 is separated into 0th order light and $\pm 1^{st}$ order light by the diffraction grating 18, thus obtaining the tracking error signal from the $\pm 1^{st}$ order light Then, based on the focus error signal and tracking error signal thus obtained, the actuators 181 and 182 are driven so as to place the objective lens 1 in an appropriate focus position and tracking position.

Though the optical detector is not shown in FIG. 60, a laser and an optical detector may be placed in one package of a laser, for example. Alternatively, another half prism or the like may be placed so that the reflected light from the disk enters the optical detector placed in a different position from the laser. Further, since parallel light, which is infinite, is incident on the objective lens in HDDVD (405 nm) and DVD (655 nm) and the reflected light from the disk is both parallel light, it is possible to use the same optical detector, for example.

Further, since the CD light is finite, it is difficult to use the same detector as HDDVD and DVD in a normal optical arrangement, and thus an optical detector for CD is required. It is possible to place a diffraction grating that functions as a diffraction grating only for the wavelength of about 790 nm and allows the reflected light from the CD disk to enter the same optical detector as HDDVD and DVD, for example.

The collimator lens 16 is not always necessary, and the present invention is also applicable to an optical system of a so-called finite system. Further, it is possible to place a laser in a position farther away from a focal position of parallel light of the collimator lens 16 so as to makes incident light to the objective lens convergent light.

Optical Head Structure 3

Figure 61:
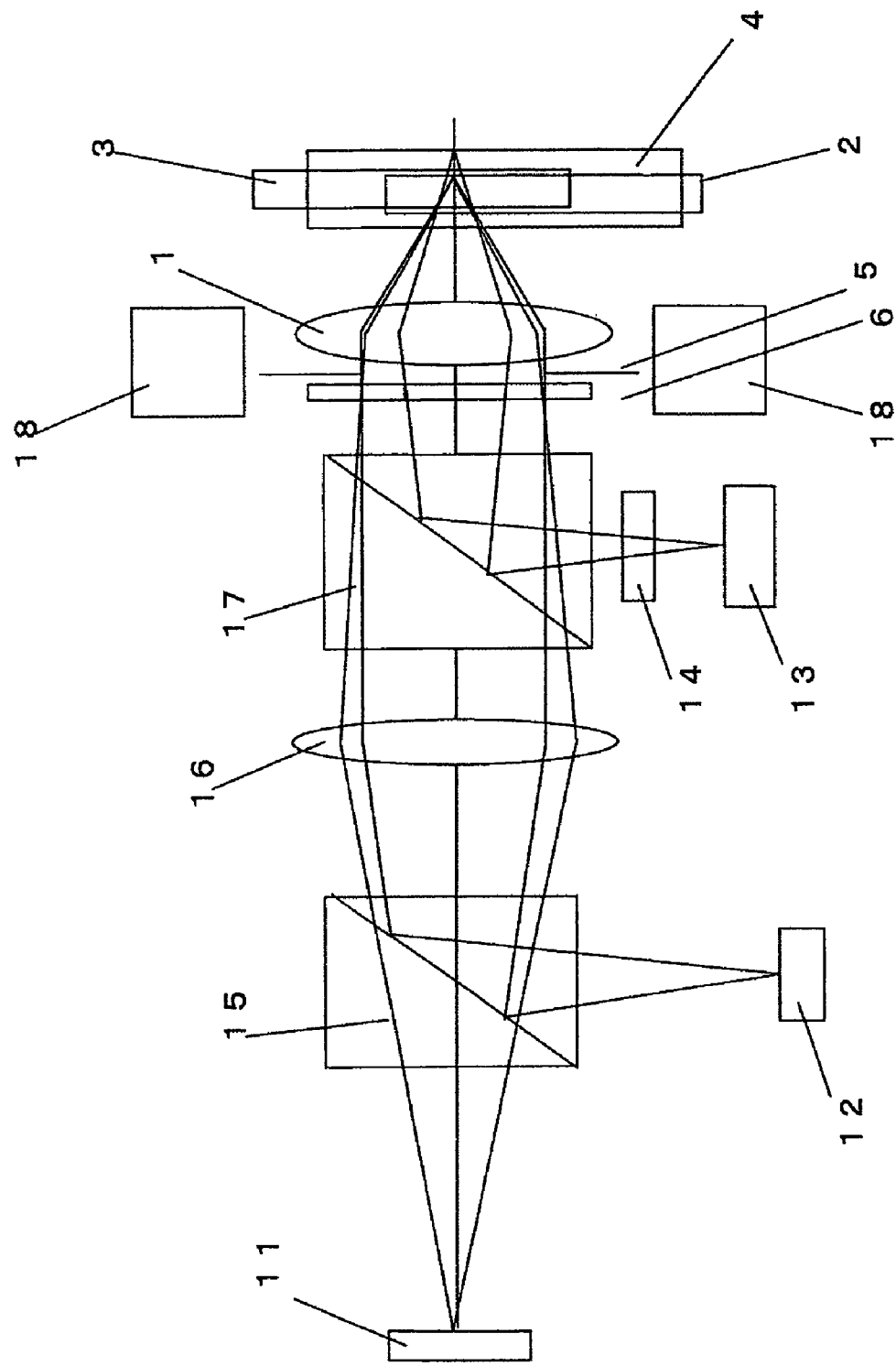
FIG. 61 is a pattern diagram showing another example of the structure of an optical head of the invention.

FIG. 61 shows an example of the structure of an optical head according to the present invention. FIG. 61 corresponds to the optical pickup system described in the third embodiment.

In FIG. 61, when recording or reproducing the HDDVD disk 2, the HDDVD laser 11 is driven. The laser beam of 408 nm wavelength generated by the HDDVD laser 11 is reflected by the half prism 15 and enters the collimator lens 16. The laser beam becomes convergent light after transmitting through the collimator lens 16, transmits through the half prism 17, and then transmits the wavelength selective filter 6. The transmitted light enters the objective lens 1 and is focused with NA0.65 to form an optical spot on the information recording surface of the HDDVD disk 2.

The light with NA=0.65 or higher is incident on the objective lens 1. As shown in the third embodiment, the DVD exclusive area exists in the outer area of the objective lens 1 in the light source side. Therefore, if HDDVD light of 408 nm is incident, the light transmitting through the DVD exclusive use area becomes flare, which does not contribute to image formation nor optical spot formation on the HDDVD disk. Therefore, the optical spot substantially equal to NA 0.65 is formed on the HDDVD disk 2.

The light reflected by the HDDVD disk 2 becomes divergent light by the objective lens 1 and enters the collimator lens 16. The collimator lens 16 changes the divergent light into convergent light and output it to an optical detector (not shown). A detection output signal from the light detector is supplied to a signal processing circuit (not shown), thereby creating an information recording and reproducing signal, focus error signal, and tracking error signal. After that, a system control circuit (not shown) controls an actuator drive circuit (not shown) to drive the actuators 181 and 182 so as to place the objective lens 1 in an appropriate focus position and tracking position based on the obtained focus error signal and tracking error signal.

When recording or reproducing the DVD disk 3, the DVD laser 12 is driven. A laser beam of the 658 nm wavelength generated in the DVD laser 12 transmits through the half prism 15. The transmitted laser beam then enters the collimator lens 16. The laser beam becomes parallel light after passing through the collimator lens 16. After that, the light is focused at NA 0.65 on the information recording surface of the DVD disk 3 to form an optical spot as is the case with HDDVD.

The light reflected by the DVD disk 3 becomes parallel light by the objective lens 1 and enters the collimator lens 16. The collimator lens 16 changes the parallel light into convergent light and outputs it to an optical detector (not shown). A detection output signal from the light detector is supplied to a signal processing circuit (not shown), thereby creating an information recording and reproducing signal, focus error signal, and tracking error signal. After that, a system control circuit (not shown) controls an actuator drive circuit (not shown) to drive the actuators 181 and 182 so as to place the objective lens 1 in an appropriate focus position and tracking position based on the obtained focus error signal and tracking error signal.

When recording or reproducing the CD disk 4, the CD laser 13 is driven. A laser beam of the 785 nm wavelength generated in the CD laser 13 transmits through the linear diffraction grating 14, is reflected by the half prism 17 and enters the wavelength selective filter 6. The inner side of the wavelength selective filter 6 is the entire light transmitting area 61. Thus, the outer side lets the light passing through the inner side of the light shielding area 62 transmit through as shown in FIG. 4. The transmission light enters the objective lens 1 and is focused with NA0.47 to form an optical spot on the information recording surface of the CD disk 4.

The light reflected by the CD disk 4 becomes convergent light by the objective lens 1 and reaches a light detector (not shown). A detection output signal from the light detector is supplied to a signal processing circuit (not shown), thereby creating an information recording and reproducing signal, focus error signal, and tracking error signal. To obtain the tracking error signal for the CD disk 3, the laser beam from the CD laser 12 is separated into $0^{th}$ order light and $\pm 1^{st}$ order light by the diffraction grating 18, thus obtaining the tracking error signal from the $\pm 1^{st}$ order light Then, based on the focus error signal and tracking error signal thus obtained, the actuators 181 and 182 are driven so as to place the objective lens 1 in an appropriate focus position and tracking position, as is the case with the DVD disk 3.

Though the optical detector is not shown in FIG. 61, a laser and an optical detector may be placed in one package of a laser, for example. Alternatively, another half prism or the like may be placed so that the reflected light from the disk enters the optical detector placed in a different position from the laser.

Further, the present invention is applicable to the lens structure where convergent light for HDDVD, convergent light for DVD, and divergent light for CD, are respectively incident. If the object distance of HDDVD and DVD is the same, it is possible to use the same optical detector for HDDVD and DVD.

Optical Disk Apparatus Structure

Figure 62:
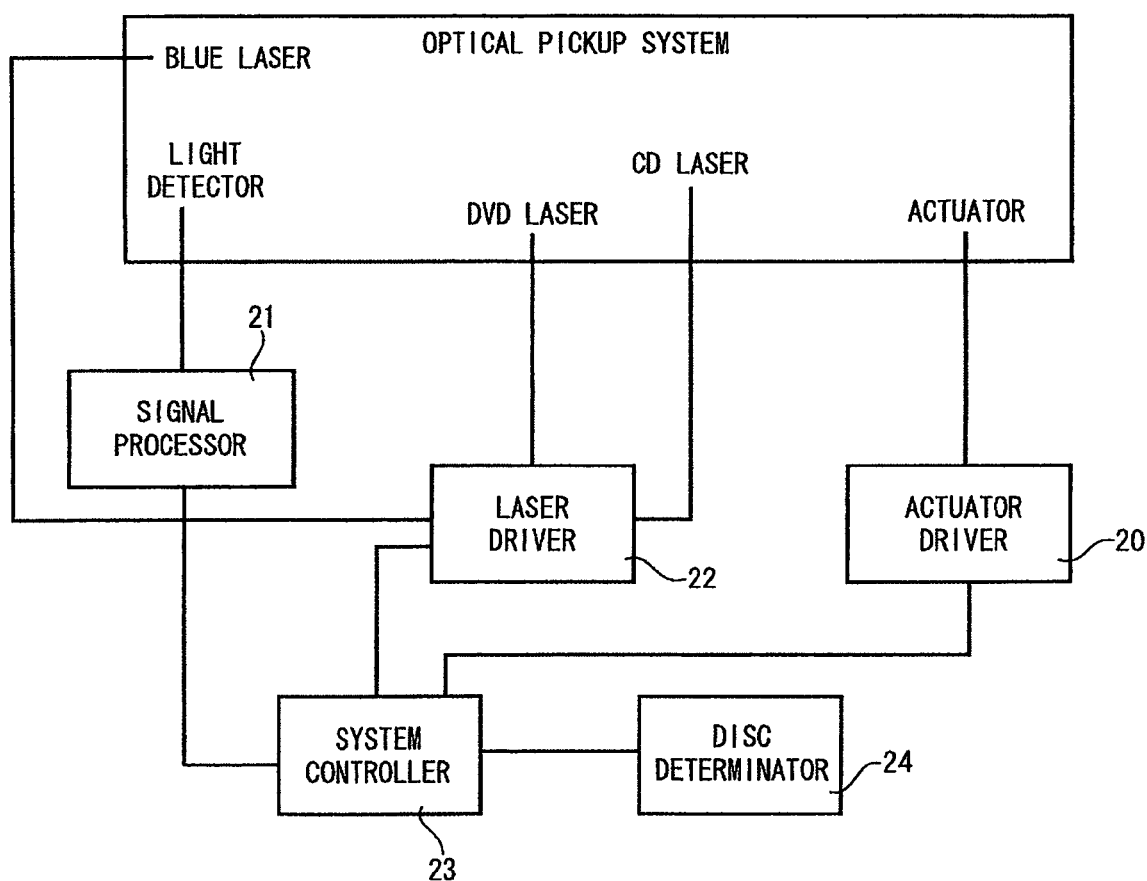
FIG. 62 is a pattern diagram showing an example of the structure of an optical disk apparatus of the invention.

FIG. 62 shows an embodiment of an optical disk apparatus using the objective lens according to the present invention. It includes an actuator drive circuit 20, a signal processing circuit 21, a laser drive circuit 22, a system control circuit, 23 and disk distinguishing means 24. The elements corresponding to those in FIGS. 59 and 60 have the same structure and thus omitted.

First, the disk distinguishing means 24 distinguishes a type of a disk loaded. Among methods for distinguishing the disk are a method detecting the thickness of the disk substrate optically or mechanically and a method detecting a reference mark preciously stored in the disk or a disk cartridge. Or, there is also a method reproducing disk signals with tentative disk thickness and type, and judging that it is a disk of another thickness and type if normal signals are not obtained. The disk distinguishing means 24 then transmits the result to the system control circuit 23.

When the result shows that the disk is a DVD disk, the system control circuit 23 transmits a signal for lighting the DVD laser 11 to the laser drive circuit 22, and the DVD laser 11 lights by the laser drive circuit 22. Thus, in an optical head, the laser beam having the 655 nm wavelength reaches the light detector 17, as is the embodiment shown in FIG. 59. The light detector 17 then transmits a detection signal to the signal processing circuit 21. and thereby an information recording and reproducing signal, focus error signal, and tracking error signal are generated and transmitted to the system control circuit 23.

The system control circuit 23 controls the actuator drive circuit 20 based on the focus error signal and tracking error signal. The actuator drive circuit 20 drives the actuator 19 by this control to move the objective lens 1 in the focus direction and tracking direction, which is called a servo circuit operation. By this operation, the focus control and tracking control are regularly processed, and the above circuits and the actuators 181 and 182 operate to arrange the object lens 1 in a right position to the DVD disk 3, thus suitably obtaining the information recording and reproducing signals.

On the other hand, when the result shows that the disk loaded is the CD disk 4, the system control circuit 23 transmits a signal for lighting the CD laser 13 to the laser drive circuit 22. The CD laser 13 thus generates the laser beam having a 790 nm wavelength. The subsequent operations are the same as the case of the optical head shown in FIGS. 59 and 60. The laser beam reaches the light detector 17, and the circuits and the actuator 19 process the servo operation to obtain the information recording and reproducing signal suitably, as is the case with the DVD disk 2.

When the result shows that the disk loaded is a Blue-ray or HDDVD disk, the system control circuit 23 transmits a signal for lighting the Blue laser 11 to the laser drive circuit 22. The Blue laser 11 thus generates the laser beam having a 405 nm wavelength. The subsequent operations are the same as the case of the optical head shown in FIGS. 59 and 60. The laser beam reaches the light detector 17, and the circuits and the actuator 19 process the servo operation to obtain the information recording and reproducing signal suitably, as is the case with the DVD disk 2.

Figure 63A:
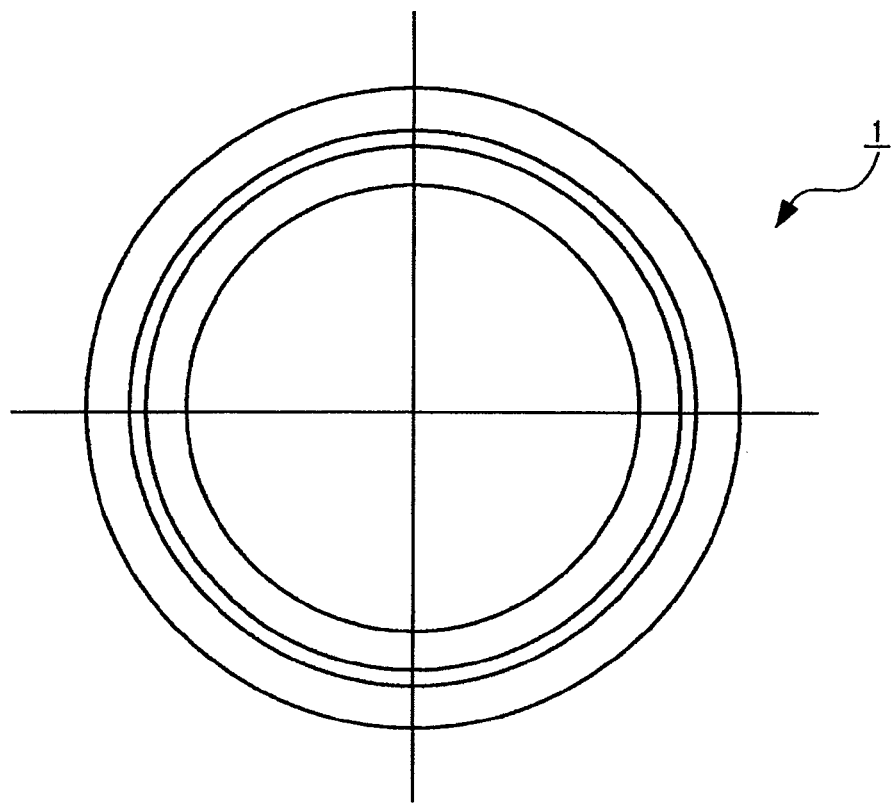
FIGS. 63A and 63B are a top view and a side view, respectively, showing an outer shape of an objective lens of the invention.
Figure 63B:
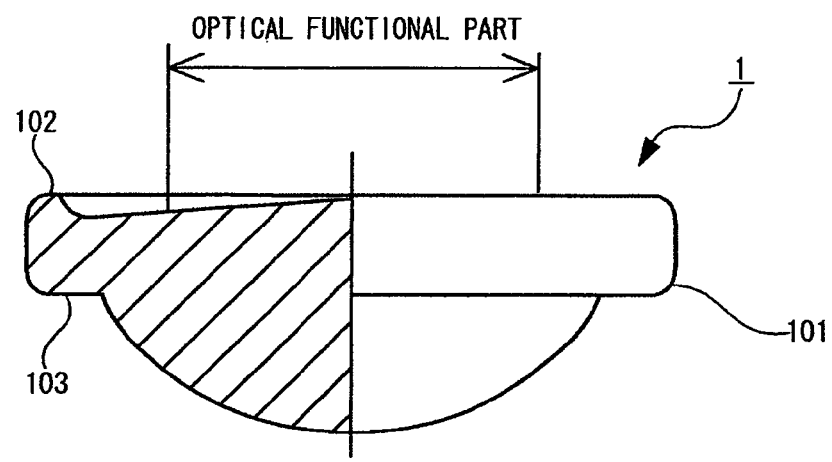

FIG. 63A is a top view when manufacturing an objective lens of the present invention industrially. FIG. 63B is a side view of the lens, and the left half shows the cross section. As shown in FIGS. 63A and 63B, a flange 101 is formed on the outer periphery of the lens 1. The flange 101 is formed so that a flange surface 102 comes an optical recording medium side when the lens 1 is mounted to the optical disk apparatus to read information from the optical recording medium. In the followings, the side to the optical recording medium is referred to as a upper side 102 and the other side is referred to as an under side 103. The flange 101 is placed in the periphery of an optical functional part of the lens 1 to surround the entire circumference. The flange 101 is not necessarily continuous in the circumference, and it may have a notch in a part of the circumference.

As shown in FIG. 63B, the flange surface 102 is partly higher than a top surface of the optical functional part when viewed along the optical axis. Thus, if the lens 1 is placed on a desk or the like with the flange surface 102 facing down, the flange surface 102, not the optical functional part, contacts the desk. It is thereby possible to prevent the optical functional part from being damaged due to contact with the disk or the like. It is also possible to avoid damage that occurs when an optical recording medium directly contacts the optical functional part after mounting the lens 1 to the optical disk apparatus.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An objective lens receiving light beams with different wavelengths $\lambda n$ ($n \geq 3$) for at least three kinds of optical recording media and having a positive power to focus each light beam on an information recording surface of a transparent substrate of each optical recording medium only by refraction, wherein, if distances between points Pn (n>3) where incident light beams or extension lines of incident light beams with wavelengths $\lambda n$ ($n \geq 3$) to the objective lens crosses an optical axis and a point Q where a lens surface of the objective lens located farther from each optical recording medium than another lens surface crosses the optical axis is expressed by Sn (n>3), and a sign of the distance Sn is defined as positive if a position of the point Pn is located in a different side from the optical recording medium with respect to the point Q, and defined as negative if the position of the point Pn is located in the same side as the optical recording medium with respect to the point Q, an incident light beam satisfying following expressions enters the objective lens:

$\lambda_1 < \lambda_3$ and $(1/S_1) < (1/S_3)$ $\lambda_2 < \lambda_3 (\lambda_2 > \lambda_1)$ and $(1/S_2) < (1/S_3)$ each light beam is focused on the information recording surface with RMS wavefront aberration of 0.035 $\lambda$RMS or below, at least one lens surface is radially sectioned into a plurality of zones, each aspherical surface shape of the plurality of zones is formed so that spherical aberration due to a difference in transparent substrate thickness and chromatic aberration due to a difference in refractive index of the objective lens, which result from a difference between light beam wavelengths, cancel each other, and an optical path length of a light beam passing through each zone of the objective lens is different from an optical path length passing through another zone by substantially 2 m$\lambda$ (m is an integral number) when the light beam is one of a first light beam, a second light beam, and a third light beam, and by substantially m$\lambda$ (m is an integral number) for a rest of the light beams.

2. The objective lens of claim 1, wherein the wavelength with a difference of substantially 2 m$\lambda$ is $\lambda_1$.

3. The objective lens of claim 1, wherein the wavelength $\lambda_1$ is approximately 405 nm, the wavelength $\lambda_2$ is approximately 655 nm, and the wavelength $\lambda_3$ is approximately 790 nm.

4. The objective lens of claim 1, wherein $S_1$ and $S_3$ respectively satisfy expressions: $S_1 < 0$, $S_3 > 0$.

5. An optical pickup system receiving a first light beam with a wavelength $\lambda_1$ corresponding to a first optical recording medium, a second light beam with a wavelength $\lambda_2$ corresponding to a second optical recording medium, and a third light beam with a wavelength $\lambda_3$ corresponding to a third optical recording medium, having an objective lens that focuses the first light beam on the first optical recording medium, the second light beam on the second optical recording medium, and the third light beam on the third optical recording medium, and being capable of reading information recorded in the first optical recording medium, the second optical recording medium, and the third optical recording medium, wherein the objective lens has a positive power to focus each light beam on an information recording surface of a transparent substrate of each optical recording medium only by refraction, if distances between points $P_1$, $P_2$, $P_3$ where incident light beams or extension lines of incident light beams with wavelengths $\lambda_1$, $\lambda_2$, $\lambda_3$ to the objective lens cross an optical axis and a point Q where a lens surface of the objective lens located farther from each optical recording medium than another lens surface crosses the optical axis are expressed as $S_1$, $S_2$, $S_3$, and signs of the distances $S_1$, $S_2$, $S_3$, are defined as positive if positions of the points $P_1$, $P_2$, $P_3$ are located in a different side from the optical recording medium with respect to the point Q, and defined as negative if the positions of the points $P_1$, $P_2$, $P_3$ are located in the same side as the optical recording medium with respect to the point Q, following expressions are satisfied:

$\lambda_1 < \lambda_3$ and $(1/S_1) < (1/S_3)$ $\lambda_2 < \lambda_3 (\lambda_2 > \lambda_1)$ and $(1/S_2) < (1/S_3)$ at least one lens surface of the objective lens is radially sectioned into a plurality of zones, each aspherical surface shape of the plurality of zones is formed so that spherical aberration due to a difference in transparent substrate thickness and chromatic aberration due to a difference in refractive index of the objective lens, which result from a difference between light beam wavelengths, cancel each other, and an optical path length of a light beam passing through each zone is different from an optical path length passing through another zone by substantially m$\lambda$ (m is an integral number) for a light beam when the light beam is one of the first light beam, the second light beam, and the third light beam, and by substantially 2 m$\lambda$ (m is an integral number) for a rest of the light beams.

6. The optical pickup system of claim 5, wherein each of the first, the second, and the third light beams is focused on each information recording surface with RMS wavefront aberration of 0.035 $\lambda$RMS or below.

7. The optical pickup system of claim 5, wherein the wavelength with a difference of substantially 2 m$\lambda$ is $\lambda_1$.

8. An optical head comprising the optical pickup system of claim 5.

9. An optical disk apparatus comprising the optical pickup system of claim 5.

10. The optical pickup system of claim 5, wherein the wavelength $\lambda_1$ is approximately 405 nm, the wavelength $\lambda_2$ is approximately 655 nm, and the wavelength $\lambda_3$ is approximately 790 nm.

11. The optical pickup system of claim 5, wherein each of the first light beam, the second light beam, and the third light beam is focused on each optical recording medium after passing through a wavelength selective filter having an outer area that allows the first light beam and the second light beam to pass through and shields the third light beam, and an inner area that allows the first light beam, the second light beam, and the third light beam to pass through.

12. The optical pickup system of claim 11, wherein a numerical aperture of a light beam after passing through the objective lens is largest in the first light beam, second-largest in the second light beam, and smallest in the third light beam.

13. The optical pickup system of claim 11, wherein the wavelength selective filter has a transmittance of 10% or below for the third light beam.

14. The optical pickup system of claim 11, wherein the wavelength selective filter has a transmittance of 90% or above for the first light beam and the second light beam.

15. The optical pickup system of claim 11, wherein $S_1$ and $S_3$ respectively satisfy expressions: $S_1<0, S_3>0$.

16. The optical pickup system of claim 15, wherein magnification m1 of the first light beam and magnification m3 of the third light beam respectively satisfy expressions: $0<m1\leq 1/10, -1/10<m3\leq 0$.

17. The optical pickup system of claim 16, wherein the magnification m1 of the first light beam and the magnification m3 of the third light beam respectively satisfy expressions: $0<m1\leq 1/20, -1/20<m3\leq 0$.

18. The optical pickup system of claim 11, wherein the wavelength selective filter is formed in a surface of the objective lens.

19. The optical pickup system of claim 11, wherein a refractive index of a layer of the wavelength selective filter is within a range of 0.9 to 1.1 with respect to a refractive index of the objective lens.

20. The optical pickup system of claim 5, wherein the objective lens is made of material mainly composed of glass with a refractive index of 1.49 to 1.70.

21. An objective lens receiving light beams with different wavelengths $\lambda n$ ($n\geq 3$) for at least three kinds of optical recording media and having a positive power to focus each light beam on an information recording surface of a transparent substrate of each optical recording medium only by refraction, wherein, if distances between points Pn ($n\geq 3$) where incident light beams or extension lines of incident light beams with wavelengths $\lambda n$ ($n\geq 3$) to the objective lens crosses an optical axis and a point Q where a lens surface of the objective lens located farther from each optical recording medium than another lens surface crosses the optical axis is expressed by Sn ($n\geq 3$), and a sign of the distance Sn is defined as positive if a position of the point Pn is located in a different side from the optical recording medium with respect to the point Q, and defined as negative if the position of the point Pn is located in the same side as the optical recording medium with respect to the point Q, an incident light beam satisfying following expressions enters the objective lens:

$$\lambda_1<\lambda_3 \text{ and } (1/S_1)<(1/S_3)$$

$$\lambda_2<\lambda_3(\lambda_2>\lambda_1) \text{ and } (1/S_2)<(1/S_3)$$

each light beam is focused on the information recording surface with RMS wavefront aberration of 0.050 $\lambda$RMS or below, at least one lens surface is radially sectioned into a plurality of zones, each aspherical surface shape of the plurality of zones is formed so that spherical aberration due to a difference in transparent substrate thickness and chromatic aberration due to a difference in refractive index of the objective lens, which result from a difference between light beam wavelengths, cancel each other, and an optical path length of a light beam passing through each zone of the objective lens is different from an optical path length passing through another zone by substantially 2 m$\lambda$ (m is an integral number) when the light beam is one of a first light beam, a second light beam, and a third light beam, and by substantially m$\lambda$ (m is an integral number) for a rest of the light beams, and the objective lens is made of material mainly composed of glass with a refractive index of 1.49 to 1.70 and a thermal deformation temperature of 300° C. or below.

* * * * *